US008143554B2

(12) United States Patent
Lofy

(10) Patent No.: US 8,143,554 B2
(45) Date of Patent: Mar. 27, 2012

(54) AIR WARMER

(75) Inventor: John Lofy, Claremont, CA (US)

(73) Assignee: Amerigon Incorporated, Northville, MI (US)

( * ) Notice: Subject to any disclaimer, the term of this patent is extended or adjusted under 35 U.S.C. 154(b) by 806 days.

(21) Appl. No.: 12/049,120

(22) Filed: Mar. 14, 2008

(65) Prior Publication Data

US 2008/0223841 A1 Sep. 18, 2008

Related U.S. Application Data

(60) Provisional application No. 60/895,398, filed on Mar. 16, 2007, provisional application No. 60/941,936, filed on Jun. 4, 2007.

(51) Int. Cl.
*B60L 1/02* (2006.01)
*H05B 3/10* (2006.01)
(52) U.S. Cl. ........ 219/202; 219/217; 219/528; 219/529; 219/211; 219/212; 219/544; 219/494; 219/441
(58) Field of Classification Search .................. 219/202, 219/217, 528–9, 211–2, 544, 494, 441
See application file for complete search history.

(56) References Cited

U.S. PATENT DOCUMENTS

| | | |
|---|---|---|
| 1,839,156 A | 12/1931 | Lumpkin |
| 3,136,577 A | 6/1964 | Richard |
| 3,137,523 A | 6/1964 | Karner |
| 3,627,299 A | 12/1971 | Schwartze et al. |
| 3,640,456 A | 2/1972 | Sturgis |
| 3,786,230 A | 1/1974 | Brandenburg, Jr. |
| 3,876,860 A | 4/1975 | Nomura et al. |
| 3,916,151 A | 10/1975 | Reix |
| 3,927,299 A | 12/1975 | Sturgis |
| 4,044,824 A | 8/1977 | Eskeli |
| 4,124,794 A | 11/1978 | Eder |
| 4,195,687 A | 4/1980 | Taziker |
| 4,223,205 A | 9/1980 | Sturgis |
| 4,336,444 A | 6/1982 | Bice et al. |
| 4,413,857 A | 11/1983 | Hayashi |

(Continued)

FOREIGN PATENT DOCUMENTS

DE 10238552 8/2001

(Continued)

OTHER PUBLICATIONS

International Search Report for Application No. PCT/US2008/057136 mailed Jun. 30, 2008. PCT/US2008/057136 claims priority from the same U.S. provisional applications as U.S. Appl. No. 12/049,120.

(Continued)

*Primary Examiner* — Shawntina Fuqua
(74) *Attorney, Agent, or Firm* — Knobbe, Martens, Olson & Bear, LLP

(57) ABSTRACT

A heating element includes a plurality of folded surfaces which can be resistively heating using electrical current. The heating element can advantageously function both as a heating source and a heat transfer device, as the need for separate fins or other heat dissipation members is eliminated. In some embodiments, the heating element can be included in a fluid heating system. The fluid heating system can include a fluid transfer device configured to deliver a volume or ambient air or other fluid through the heating element. As air moves past the heated folded surface of the heating element, it is heated. Heated air can then be discharged to one or more desired locations.

19 Claims, 44 Drawing Sheets

U.S. PATENT DOCUMENTS

| | | | |
|---|---|---|---|
| 4,518,847 A | | 5/1985 | Horst, Sr. et al. |
| 4,567,351 A | | 1/1986 | Kitagawa et al. |
| 4,671,567 A | | 6/1987 | Frobose |
| 4,685,727 A | | 8/1987 | Cremer et al. |
| 4,791,274 A | | 12/1988 | Horst |
| 5,002,336 A | | 3/1991 | Feher |
| 5,106,161 A | | 4/1992 | Meiller |
| 5,111,025 A | | 5/1992 | Barma et al. |
| 5,117,638 A | | 6/1992 | Feher |
| 5,187,349 A | * | 2/1993 | Curhan et al. ............... 219/202 |
| 5,278,936 A | | 1/1994 | Shao |
| 5,385,382 A | | 1/1995 | Single, II et al. |
| 5,597,200 A | | 1/1997 | Gregory et al. |
| 5,626,021 A | | 5/1997 | Karunasiri et al. |
| 5,721,804 A | | 2/1998 | Greene, III |
| 5,902,014 A | | 5/1999 | Dinkel et al. |
| 5,921,314 A | | 7/1999 | Schuller et al. |
| 5,924,766 A | | 7/1999 | Esaki et al. |
| 5,927,817 A | | 7/1999 | Ekman et al. |
| 5,934,748 A | | 8/1999 | Faust et al. |
| 5,995,711 A | | 11/1999 | Fukuoka et al. |
| 6,003,950 A | | 12/1999 | Larsson |
| 6,019,420 A | | 2/2000 | Faust et al. |
| 6,059,018 A | | 5/2000 | Yoshinori et al. |
| 6,062,641 A | | 5/2000 | Suzuki et al. |
| 6,072,938 A | | 6/2000 | Peterson et al. |
| 6,073,998 A | * | 6/2000 | Siarkowski et al. ..... 297/180.12 |
| 6,079,485 A | | 6/2000 | Esaki et al. |
| 6,087,638 A | | 7/2000 | Silverbrook |
| 6,119,463 A | | 9/2000 | Bell |
| 6,145,925 A | | 11/2000 | Eksin et al. |
| 6,178,292 B1 | | 1/2001 | Fukuoka et al. |
| 6,186,592 B1 | | 2/2001 | Orizaris et al. |
| 6,189,966 B1 | | 2/2001 | Faust et al. |
| 6,196,627 B1 | | 3/2001 | Faust et al. |
| 6,206,465 B1 | | 3/2001 | Faust et al. |
| 6,223,539 B1 | | 5/2001 | Bell |
| 6,541,743 B2 | | 4/2003 | Chen |
| RE38,128 E | | 6/2003 | Gallup et al. |
| 6,571,564 B2 | | 6/2003 | Upadhye et al. |
| 6,598,251 B2 | | 7/2003 | Habboub et al. |
| 6,604,576 B2 | | 8/2003 | Noda et al. |
| 6,604,785 B2 | | 8/2003 | Bargheer et al. |
| 6,606,866 B2 | | 8/2003 | Bell |
| 6,619,736 B2 | | 9/2003 | Stowe et al. |
| 6,626,488 B2 | | 9/2003 | Pfahler |
| 6,644,735 B2 | | 11/2003 | Bargheer et al. |
| 6,676,207 B2 | | 1/2004 | Rauh et al. |
| 6,700,052 B2 | | 3/2004 | Bell |
| 6,761,399 B2 | | 7/2004 | Bargheer et al. |
| 6,772,829 B2 | | 8/2004 | Lebrun |
| 6,786,541 B2 | | 9/2004 | Haupt et al. |
| 6,786,545 B2 | | 9/2004 | Bargheer et al. |
| 6,790,481 B2 | | 9/2004 | Bishop et al. |
| 6,808,230 B2 | | 10/2004 | Buss et al. |
| 6,817,675 B2 | | 11/2004 | Buss et al. |
| 6,828,528 B2 | | 12/2004 | Stowe et al. |
| 6,857,697 B2 | | 2/2005 | Brennan et al. |
| 6,893,086 B2 | | 5/2005 | Bajic et al. |
| 6,907,739 B2 | | 6/2005 | Bell |
| 6,963,053 B2 | | 11/2005 | Lutz |
| 6,976,734 B2 | | 12/2005 | Stoewe |
| 6,977,360 B2 | | 12/2005 | Weiss |
| 7,040,710 B2 | | 5/2006 | White et al. |
| 7,070,232 B2 | | 7/2006 | Minegishi et al. |
| 7,075,034 B2 | | 7/2006 | Bargheer et al. |
| 7,108,319 B2 | | 9/2006 | Hartwich et al. |
| 7,114,771 B2 | | 10/2006 | Lofy et al. |
| 7,178,344 B2 | | 2/2007 | Bell |
| 7,201,441 B2 | | 4/2007 | Stoewe et al. |
| 7,220,048 B2 | | 5/2007 | Kohlgrüber et al. |
| 7,231,772 B2 | | 6/2007 | Bell |
| 7,475,464 B2 | | 1/2009 | Lofy et al. |
| 7,506,924 B2 | | 3/2009 | Bargheer et al. |
| 7,581,785 B2 | | 9/2009 | Heckmann et al. |
| 7,587,901 B2 | | 9/2009 | Petrovski |
| 7,591,507 B2 | | 9/2009 | Giffin et al. |
| 7,621,594 B2 | | 11/2009 | Hartmann et al. |
| 7,640,754 B2 | | 1/2010 | Wolas |
| 7,665,803 B2 | | 2/2010 | Wolas |
| 7,708,338 B2 | | 5/2010 | Wolas |
| RE41,765 E | | 9/2010 | Gregory et al. |
| 7,827,805 B2 | | 11/2010 | Comiskey et al. |
| 7,877,827 B2 | | 2/2011 | Marquette et al. |
| 7,963,594 B2 | | 6/2011 | Wolas |
| 2001/0014212 A1 | * | 8/2001 | Rutherford ................... 392/503 |
| 2002/0017102 A1 | | 2/2002 | Bell |
| 2004/0090093 A1 | | 5/2004 | Kamiya et al. |
| 2005/0067862 A1 | * | 3/2005 | Iqbal et al. ............... 297/180.11 |
| 2005/0285438 A1 | | 12/2005 | Ishima et al. |
| 2006/0078319 A1 | | 4/2006 | Maran |
| 2006/0087160 A1 | | 4/2006 | Dong et al. |
| 2006/0214480 A1 | | 9/2006 | Terech |
| 2006/0219699 A1 | | 10/2006 | Geisel et al. |
| 2006/0273646 A1 | | 12/2006 | Comiskey et al. |
| 2007/0145808 A1 | | 6/2007 | Minuth et al. |
| 2007/0200398 A1 | | 8/2007 | Wolas et al. |
| 2007/0204629 A1 | | 9/2007 | Lofy |
| 2007/0262621 A1 | | 11/2007 | Dong et al. |
| 2007/0277313 A1 | | 12/2007 | Terech |
| 2008/0047598 A1 | | 2/2008 | Lofy |
| 2008/0087316 A1 | | 4/2008 | Inaba et al. |
| 2008/0148481 A1 | | 6/2008 | Brykalski et al. |
| 2008/0164733 A1 | | 7/2008 | Giffin et al. |
| 2008/0166224 A1 | | 7/2008 | Giffin et al. |
| 2008/0173022 A1 | | 7/2008 | Petrovski |
| 2008/0223841 A1 | | 9/2008 | Lofy |
| 2009/0025770 A1 | | 1/2009 | Lofy |
| 2009/0026813 A1 | | 1/2009 | Lofy |
| 2009/0033130 A1 | | 2/2009 | Marquette et al. |
| 2009/0193814 A1 | | 8/2009 | Lofy |
| 2009/0218855 A1 | | 9/2009 | Wolas |
| 2010/0011502 A1 | | 1/2010 | Brykalski et al. |
| 2010/0193498 A1 | | 8/2010 | Walsh |
| 2011/0048033 A1 | | 3/2011 | Comiskey et al. |

FOREIGN PATENT DOCUMENTS

| DE | 10115242 | 10/2002 |
|---|---|---|
| WO | WO 2002/011968 | 2/2002 |
| WO | WO 2003/051666 | 6/2003 |

OTHER PUBLICATIONS

Feher, Steve, Thermoelectric Air Conditioned Variable Temperature Seat (VTS) & Effect Upon Vehicle Occupant Comfort, Vehicle Energy Efficiency, and Vehicle Environment Compatibility, SAE Technical Paper, Apr. 1993, pp. 341-349.

Lofy, J. et al., Thermoelectrics for Environmental Control in Automobiles, Proceeding of Twenty-First International Conference on Thermoelectrics (ICT 2002), published 2002, pp. 471-476.

* cited by examiner

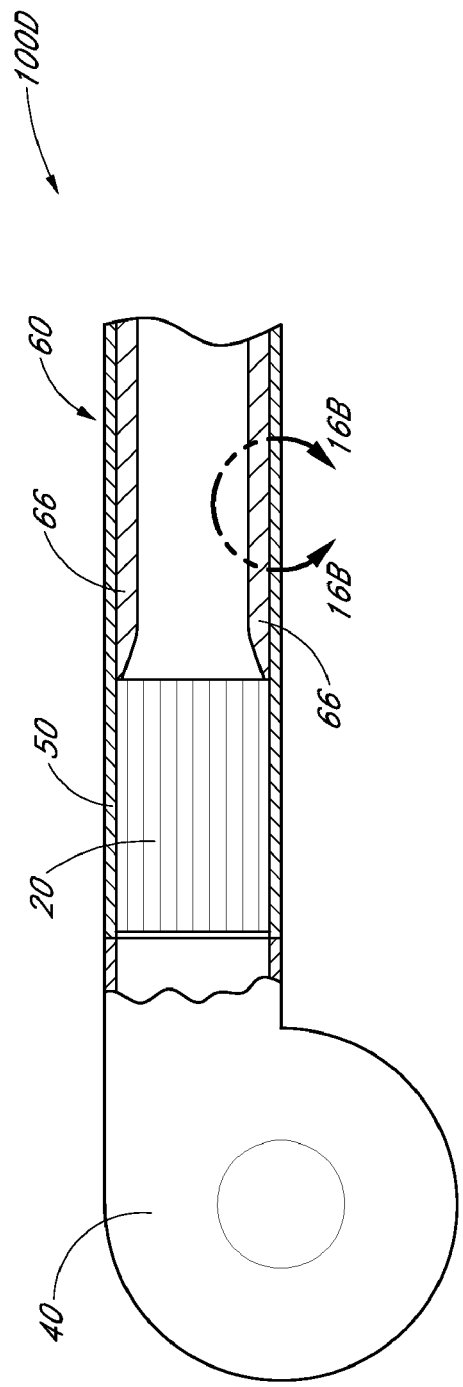
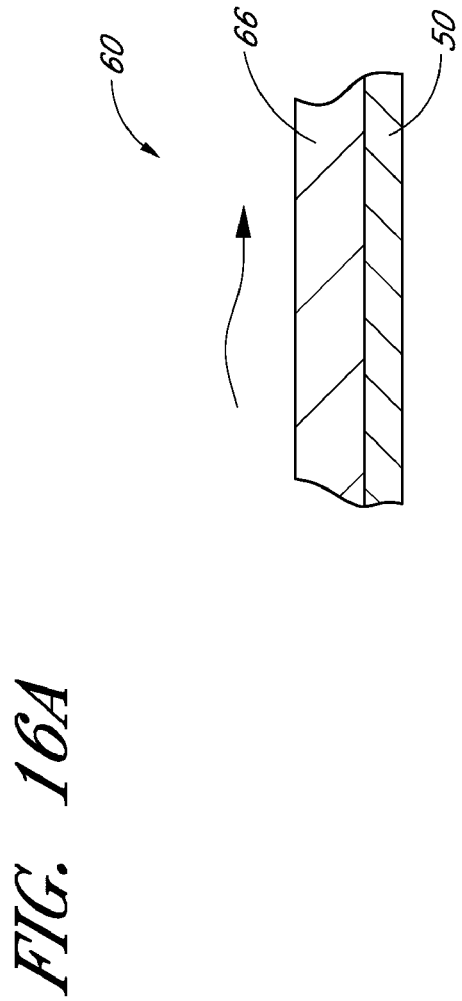
FIG. 16A
FIG. 16B

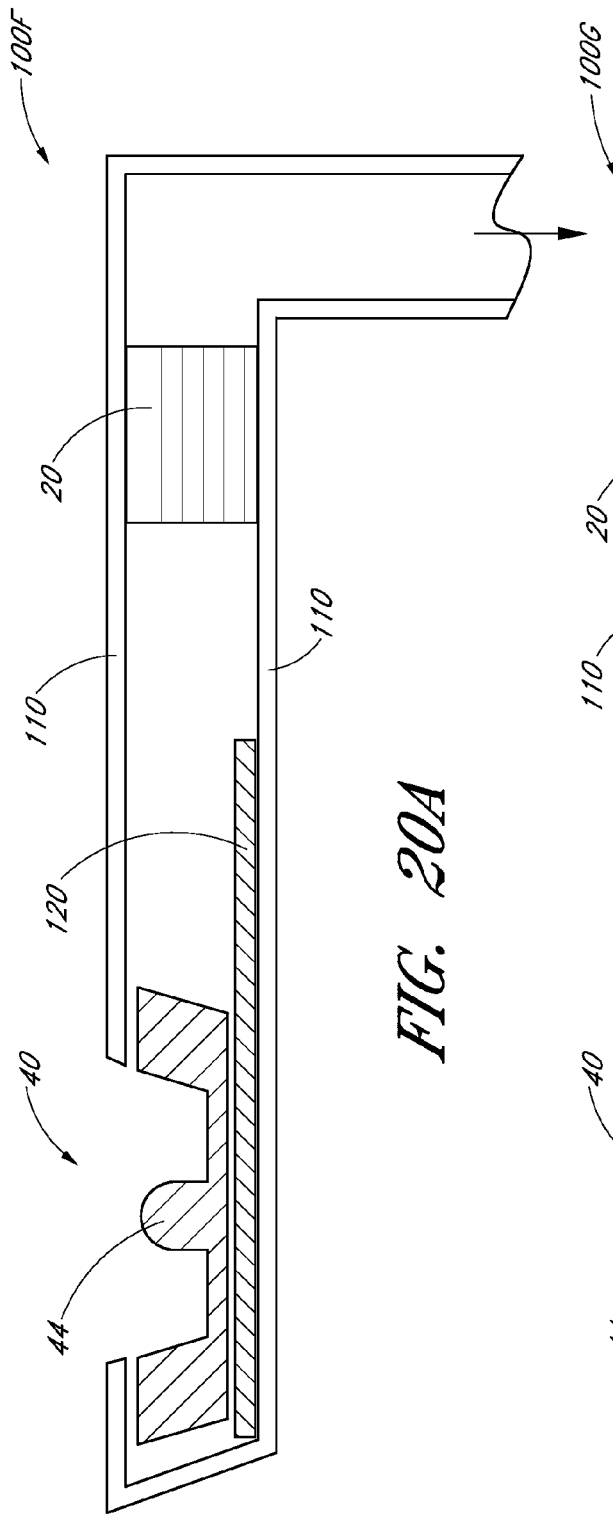
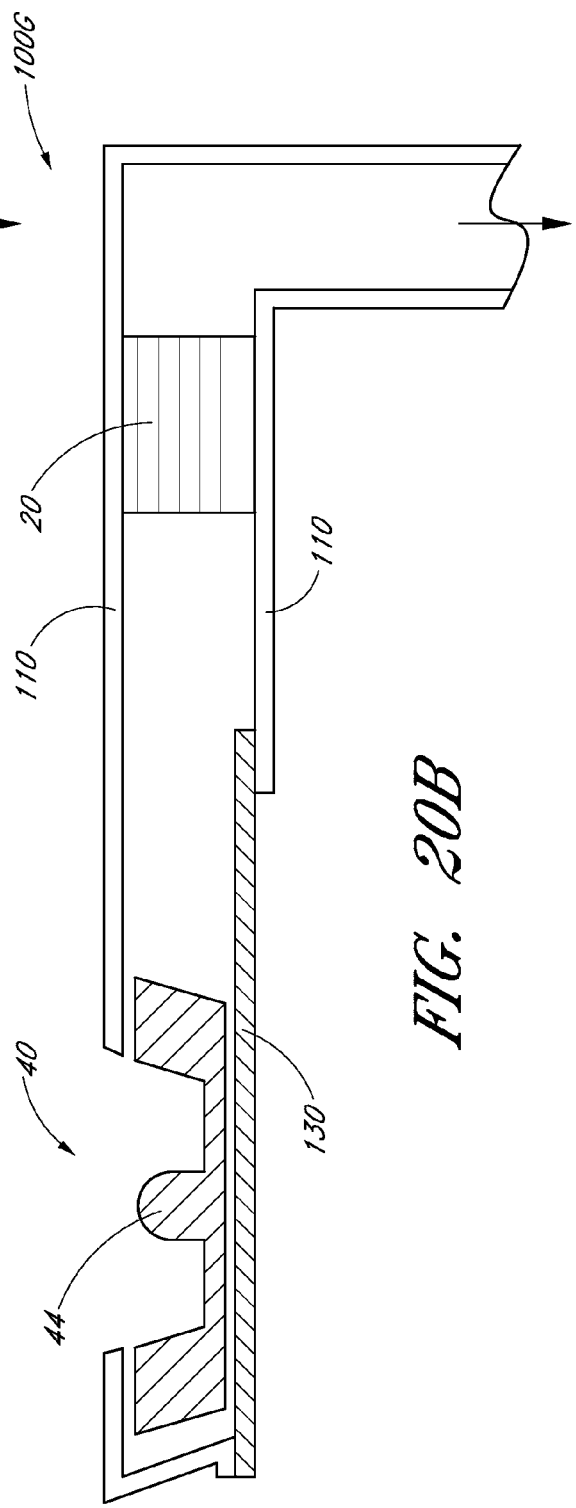

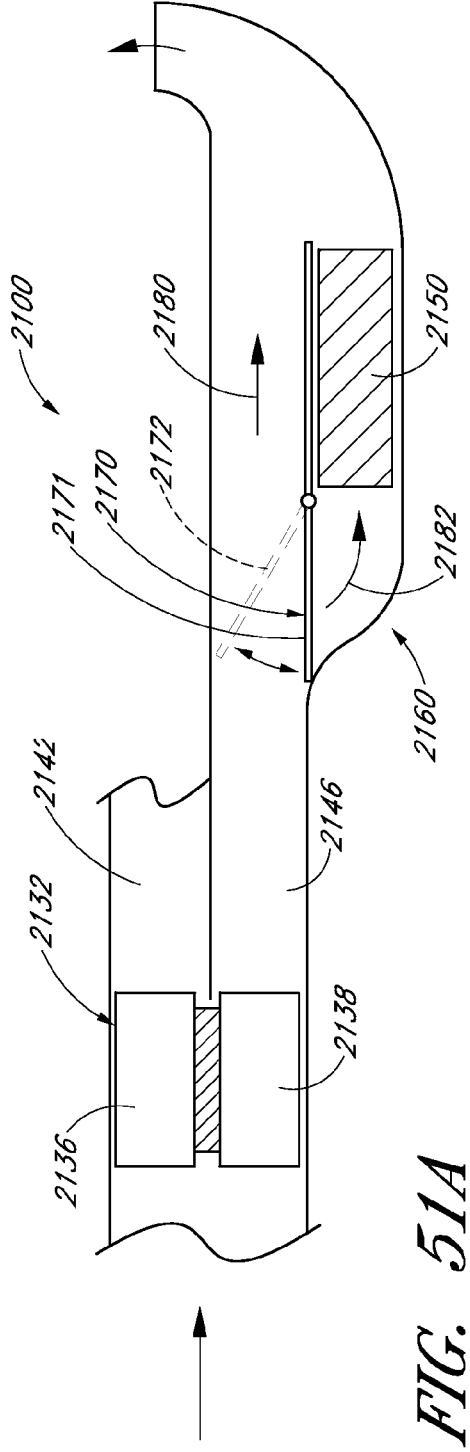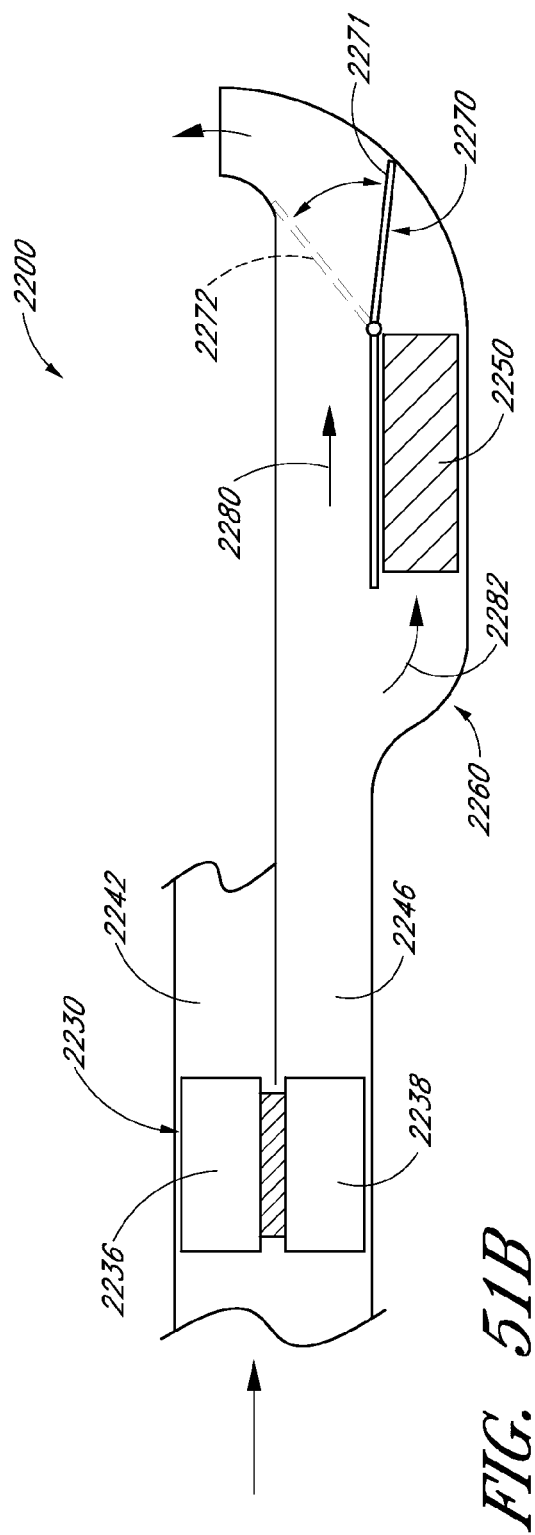
FIG. 51A
FIG. 51B

AIR WARMER

CROSS-REFERENCE TO RELATED APPLICATIONS

This application claims the priority benefit under 35 U.S.C. §119(e) of U.S. Provisional Application No. 60/895,398, filed Mar. 16, 2007 and U.S. Provisional Application No. 60/941,936, filed Jun. 4, 2007, the entireties of which are hereby incorporated by reference herein.

BACKGROUND

1. Field of the Inventions

This application generally relates to heating systems, and more specifically, to resistive heating elements and their use in the climate control of seat assemblies.

2. Description of the Related Art

Temperature modified air for environmental control of an automobile or any other living or working space is typically provided to relatively extensive areas, such as an entire automobile interior, selected offices or suites of rooms within a building and the like. In the case of enclosed areas, such as automobiles, homes, offices, libraries and the like, the interior space is typically heated and/or cooled as a unit. There are many situations, however, in which more selective or restrictive air temperature modification is desirable. For example, it is often desirable to provide an individualized climate control for a seat assembly so that substantially instantaneous heating or cooling can be achieved. For example, a vehicle seat, chair or other seat assembly situated in a cold environment can be uncomfortable to the occupant. Furthermore, even in conjunction with other heating methods, it may be desirable to quickly warm the seat to enhance the occupant's comfort, especially where other heating units (e.g., automobile's temperature control system, home's central heater, etc.) take a relatively long time to warm the ambient air. Therefore, a need exists to provide a climate-controlled vehicle seat, bed, other seat assembly and/or other item which may be adapted for spot cooling and/or heating for use in various indoor and/or outdoor environments.

SUMMARY OF THE INVENTIONS

According to some embodiments of the present inventions, a folded heating element includes a resistive material and at least one substrate, such that the combination of the resistive material and the substrate are folded into a plurality of folds. The resistive material is disposed on the substrate, and the folded heating element is configured to produce heat when an electrical current is delivered through the resistive material. The folded heating element is configured to transfer heat to a fluid present or passing between or near the plurality of folds.

In one embodiment, a climate controlled seat assembly includes a support structure configured to support an occupant and a fluid distribution system for providing fluid through the support structure toward the occupant. The fluid distribution system includes one or more passages. The seat assembly additionally includes a fluid transfer device configured to move fluid through the passage and a folded heating element in fluid communication with the fluid transfer device. The folded heating element includes a resistive material generally disposed on one or more substrates. The resistive material and the substrate are folded into a plurality of folds, and the fluid transfer device is configured to move fluid through the folded heating element and the fluid distribution system in order to provide heated fluid toward the occupant.

According to some embodiments, a method of constructing a folded heating element includes coupling a resistive element to a substrate and folding the combination of the substrate and the resistive element into a plurality of folds in which adjacent folds are folded in opposite directions to each other.

In some embodiments, the heating element comprises first and second conductive members and a conductive layer electrically connecting the first and second conductive members, the heating element is generally positioned on a base member that includes first and second electrical buses, with the first electrical bus being in electrical communication with the first conductive member of the heating element and the second electrical bus being in electrical communication with the second conductive member of the heating element. An electrical voltage difference applied across the first and second electrical buses causes current to flow from the first conductive member to the second conductive member through the conductive layer. Further, such current flow is configured to generate heat along a surface of the heating element to selectively heat a volume of fluid passing thereby.

In other embodiments, a heating element includes a chamber having and an inlet and an outlet and defining a flow direction that extends from the inlet to the outlet and a resistive material positioned within the chamber, such that the resistive material is generally folded into a plurality of folds that extend substantially parallel to the flow direction. The heating element further comprises one or more electrical leads operatively coupled to the resistive material such that an electrical current can be delivered through the resistive material. The resistive material is configured to heat when electrical current is delivered therethrough, and at least a portion of the heat generated by the resistive material can be transferred to a fluid passing through the chamber.

In some embodiments, a climate controlled seat assembly includes a heating element comprising a resistive material configured to receive an electrical current. The heating element is generally folded into a plurality of folds and is configured to produce heat when an electrical current is delivered through the resistive material. The assembly further includes a fluid transfer device configured to selectively transfer fluids through and/or in the vicinity of the plurality of folds of the heating element and a control system configured to control the operation the heating element or the fluid transfer device. Fluids transferred toward the heating element are heated before being directed to an occupant of the seating assembly.

According to some embodiments of the present inventions, a folded heating element includes a resistive material and at least one substrate, wherein a combination of the resistive material and the at least one substrate are folded into a plurality of folds.

According to other embodiments of the present invention, a climate controlled support system includes a cushion configured to support a user, a ventilation system for providing conditioned air through the cushion, a fluid transfer device configured to move a volume of fluid through the passage and a folded heating element comprising a resistive material and at least one substrate. The ventilation system includes at least one passage. In some embodiments, the resistive material and at least one substrate are folded into a plurality of folds. In some embodiments, the ventilation system comprises a channel and/or passage formed in the cushion. In certain embodiments, the channel and/or passage can be formed in part from a channel liner, spacer foam, and/or a conduit.

According to some embodiments of the present invention, a method of constructing a folded heating element includes forming a heating element comprising a resistive element coupled to a substrate and folding the heating element into a plurality of folds in which adjacent folds are folded in opposite directions to each other.

According to some embodiments of the present invention, a heating element comprises a generally folded surface which includes a plurality of folded portions. As least some of the folded portions are configured to generate heat. The heating element is configured for placement upstream and/or downstream of a fluid transfer device so that at least a portion of heat generated by the heating element can be transferred away from the heating element. According to other embodiments, the folded surface comprises a resistive material which is configured to produce heat when electrical current is routed through it. In one embodiment, the resistive material comprises Positive Temperature Coefficient (PTC) material. In other embodiments, one or more portions of the resistive material are oriented in a coiled or serpentine manner. In some embodiments, one or more portions of the resistive material comprise a coiled resistance wire.

In some embodiments, at least some of the adjacently positioned folded portions form an angle relative to each other, the angle being between 0 and 180 degrees. According to other arrangements, such an angle is between 0 and 90 degrees. In some embodiments, the heating element further includes one or more spacers positioned between at least two adjacent folded portions. According to other embodiments, the heating element generally comprises an accordion-like pattern.

In some embodiments, a system for heating a fluid includes a heating element comprising a generally folded surface and a fluid transfer device configured to move a volume of fluid relative to the heating element. In one embodiment, at least a portion of the folded surface is configured to generate heat. In other embodiments, the fluid transfer device comprises a blower or fan. In yet other embodiments, the blower or fan comprises a radial blower or fan. In still other embodiments, the fluid transfer device is situated upstream and/or downstream of the heating element.

In one embodiment, the heating element comprises a resistive material which is configured to generate heat when electrical current is routed through it. According to some arrangements, the heating element is situated within a housing which includes one or more insulating materials. In other embodiments, the system further comprises a discharge conduit which is positioned downstream of the heating element and is configured to receive a heated fluid exiting the heating element.

According to some embodiments, the discharge conduit is configured to deliver the heated fluid to at least one location of a seating assembly. In one embodiment, the discharge conduit is configured to deliver the heated fluid to a neck warmer, a seat back and/or bottom portion of a seating assembly. In other embodiments, a discharge conduit is configured to deliver heated air or other fluid to one or more portions of a bed, sofa, wheel chair or the like. In some embodiments, the devices, systems and methods disclosed herein provide spot heating and/or cooling to one or more locations of an automobile interior, an office environment or the like. In some embodiments, the discharge conduit comprises an insulating material. In other embodiments, the system additionally includes one or more temperature sensors (e.g., thermistors) which are configured to measure a temperature of the heating element or a fluid in the vicinity of the temperature sensors. In other embodiments, the system includes one or more other types of temperature sensors. In still other embodiments, in which the heating element comprises a plurality of folded portions, the heating element includes a plurality of spacers between adjacent folded portions.

In some embodiments, a method of heating a volume of fluid includes providing a heating element which comprises a generally folded surface, providing a fluid transfer device configured to transfer a volume of fluid to or from the heating element, activating the heating element to generate heat on at least a portion of the folded surface and activating the fluid transfer device to transfer a volume of fluid to or from the heating element. In other embodiments, activating the heating element comprises directing an electrical current through a resistive material positioned on a surface of the heating element.

BRIEF DESCRIPTION OF THE DRAWINGS

These and other features, aspects and advantages of the present invention are described with reference to drawings of certain preferred embodiments, which are intended to illustrate, but not to limit, the present invention. The drawings include ninety-seven (97) figures. It is to be understood that the attached drawings are for the purpose of illustrating concepts of the present invention and may not be to scale.

FIG. 16A illustrates a blower system which includes a folded heating element and an insulated downstream discharge passage according to one embodiment;

FIG. 16B illustrates a detailed view of a wall and an adjacent thermal insulation layer of the discharge passage of FIG. 16A;

FIG. 20A schematically illustrates a blower system which includes a folded heating element and a combined PCBA according to one embodiment;

FIG. 20B schematically illustrates a blower system which includes a folded heating element and a combined PCBA according to another embodiment;

FIG. 51A schematically illustrates a heating system comprising a folded heating element and a fluid transfer device according to another embodiment;

FIG. 51B schematically illustrates a heating system comprising a folded heating element and a fluid transfer device according to yet another embodiment;

DETAILED DESCRIPTION OF THE PREFERRED EMBODIMENTS

Figure 1:
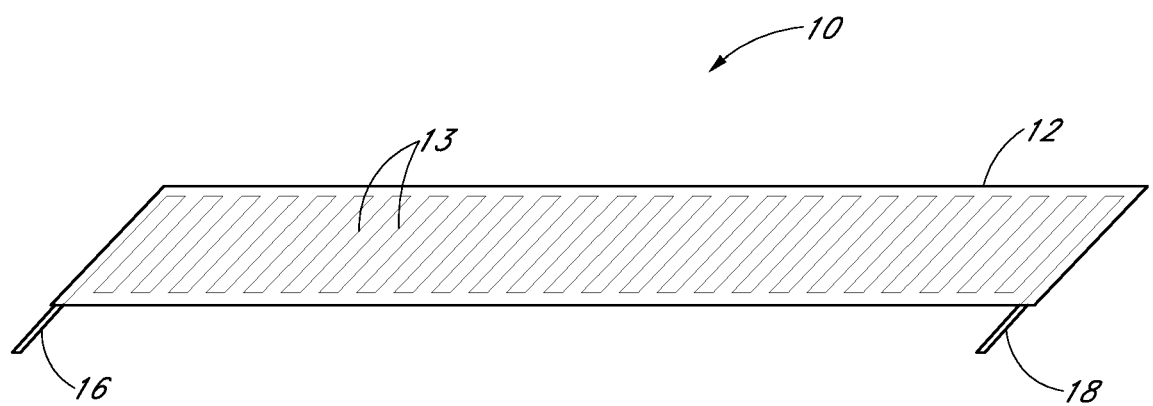
FIG. 1 illustrates a perspective view of a heating element having a generally flat shape.

The discussion below and the figures referenced herein describe various embodiments of a folded heating element. A number of these embodiments of a folded heating element are particularly well suited to provide heated air or other fluid to one or more portions of automobile seats (e.g., neck portion, headrest region, etc.). As used herein, the term "fluid" is a broad term and is used in accordance with its ordinary meaning, and may include, without limitation, gases, liquids, non-Newtonian fluids, any other flowable materials, combinations thereof and/or the like. However, it will be appreciated that the folded heating element, fluid transfer systems making use of such folded heating elements (e.g., blowers, fans, etc.) and other air conditioning features described herein may be incorporated into other types of seat assemblies, including recliner chairs, sofas, beds, office chairs, airplane seats, stadium seats, benches, wheelchairs, outdoor furniture, massage chairs and the like. In addition, a folded heating element can be used for spot heating or otherwise delivering a volume of heated air to a desired location in a car (A, B and/or C pillars, dashboard, visor, headliner, etc.), office or the like.

As discussed in greater detail herein, this application discloses a heating element which is shaped (e.g., folded, creased, etc.) and/or otherwise configured to simultaneously function both as a heat source and a heat exchanger. Therefore, the need for separate heat exchange members (e.g., fins, etc.) can be advantageously reduced or eliminated. In some embodiments, such a heating element can be positioned downstream and/or upstream of an air transfer device (e.g., fan, blower, etc.). The resulting heat transfer occurring at or near the heating element can increase the temperature of the transferred air or other fluid. In some embodiments, the heating element can be used in conjunction with an air transfer device to deliver heated air to the neck portion, back portion and/or other area of a seating assembly.

The various embodiments of the heating elements and heating systems disclosed herein offer a number of advantages over currently available heaters for seat assemblies. For example, heater mats and other existing systems currently being used in heated seat assemblies are susceptible to overheating and fire danger. Such heater mats require the placement of resistive wires and other electrical connections within a seating assembly, sometimes directly underneath a seating assembly surface. These wires and other electrical connections are subject to breaking, tearing and/or otherwise becoming damaged, especially with the passage of time and excessive use. Further, heater mats and similar heating systems can suffer from durability, occupant detection and other comfort-related problems. In addition, such components can short out, exposing the user to potentially dangerous conditions and relatively expensive and complex repairs and maintenance procedures.

In addition, when conventional heater mats are used to provide heat to a climate control seat assembly, a supplier and/or assembler may be required to install two separate items into the seat assembly, a heater mat for heating purposes and a fluid module configured to provide conditioned and/or ambient air for cooling or venting purposes. In the various embodiments of heating systems disclosed herein or variations thereof, the need for a separate heating mat or other type of conductive heater is eliminated. Thus, as discussed in greater detail herein, a single heating system can be used to provide both heat and/or venting (e.g., unheated air delivered into a seat assembly by the heating system's fluid transfer device). Accordingly, the complexity of the climate control system and/or its cost can be advantageously reduced. In addition, repairing, servicing or performing other maintenance tasks is facilitated by the embodiments of heating systems disclosed herein.

FIG. 1 illustrates a generally flat heating element 10 which is configured to convert electricity into heat through resistive heating. By way of example, in some embodiments, heat can be generated by passing an electrical current through the heating element 10. As illustrated in FIG. 1, an electrical current can be delivered to the heating element 10 via the terminals 16, 18 positioned at opposite ends of the element body 12. The element body 12 can comprise one or more high resistance materials 13 (e.g., nickel-chromium, other metals or alloys, etc.) which preferably have a relatively high electrical resistivity. Consequently, as electrical current flows through the resistive materials 13 of the element body 12, such materials 13 are heated, thereby converting electrical energy into thermal energy.

As illustrated in FIG. 1, resistive materials 13 can be oriented on the surface of the heating element 10 in a generally coiled or serpentine fashion. This can facilitate the conversion of electrical current into heat as the overall electrical resistance through the heating element 10 is increased. In other embodiments, one or more other materials and/or methods of increasing the electrical resistance through a heating element can be used.

In some embodiments, the electrical resistance generates a sufficient amount of heat to affect the temperature of the resistive materials 13, the element body 12, the terminals 16, 18 and/or the ambient air in the vicinity of the heating element 10. Thus, the resistive materials 13, the element body 12, the terminals 16, 18 and/or other components of the heating element 10 are preferably configured to withstand the heat generated by the electrical resistance. In some embodiments, the resistive materials 13 comprise one or more Positive Temperature Coefficient (PTC) materials or the like that are configured to act as their own thermostats. Such materials can significantly reduce the current when a threshold temperature is attained.

Figure 2:
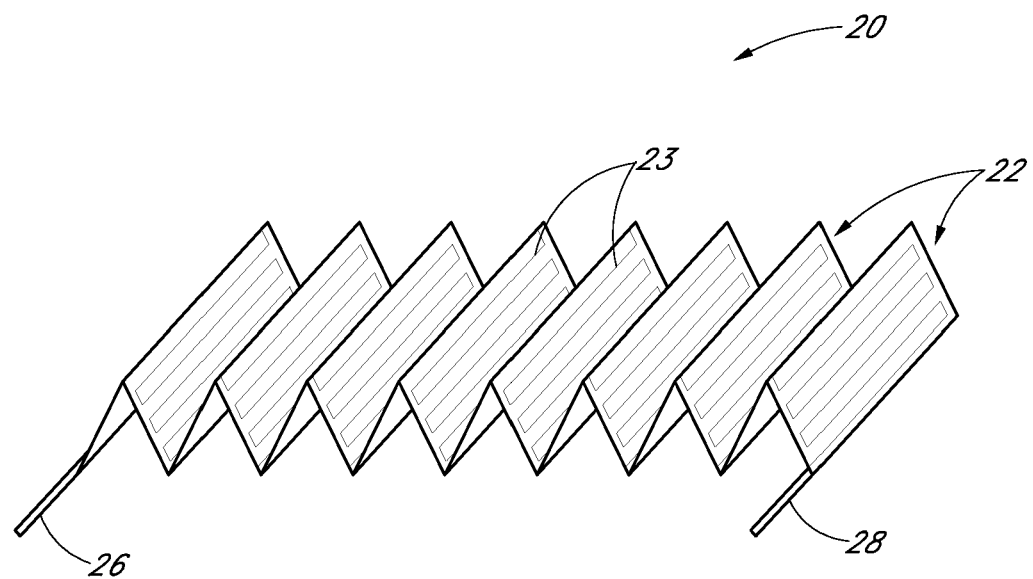
FIG. 2 illustrates a perspective side view of a folded heating element according to one embodiment.

FIG. 2 illustrates a heating element 20 which includes a plurality of folds or creases along its element body 12. The element body 22 can be initially manufactured into such a folded or corrugated shape. Alternatively, the heating element 20 can be shaped into a desired folded configuration after it has been manufactured using one or more shaping methods.

With continued reference to the embodiment illustrated in FIG. 2, the heating element 20 can include one or more resistive materials 23 along its element body 22, which, as described above in relation to FIG. 1, are configured to convert electricity into heat via electrical resistance. As shown, the resistive materials 23 can be arranged in a coiled or serpentine fashion to further enhance the resistance to electrical current. However, in other embodiments, the resistive materials are configured in a less or more intricate pattern or design.

Figure 3:
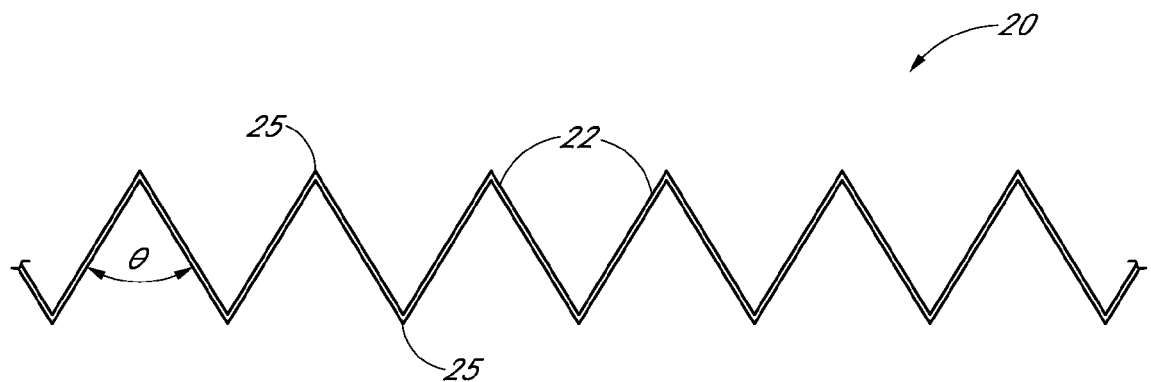
FIG. 3 illustrates a front elevation view of the folded heating element of FIG. 1.

FIG. 3 illustrates an elevation or side view of the heating element 20 of FIG. 2. In the depicted embodiment, the element body 22 is folded in a symmetrical and regular manner so that the angle (θ) between adjacent folds remains generally consistent throughout the entire length of the heating element 20. In some embodiments, the angle (θ) between adjacent folds is approximately between 1 and 175 degrees. In other embodiments, this angle (θ) varies between 20 and 70 degrees. However, the angle (θ) between adjacent folds can be greater or smaller than illustrated in FIG. 3 or discussed herein. Further, the manner in which the element body 22 is folded can be non-regular and/or non-symmetrical. In one embodiment, the bend radius of the fold can range from a sharp bend with a substantially 0 mm radius to a large bend with a 10 mm radius.

With continued reference to FIGS. 2 and 3, the element body 22 includes generally sharp corners 25 between adjacent folds. In other embodiments, however, the adjacent folds are separated by smoother transitions, such as, for example, rounded or curved portions (see FIGS. 5A, 6, 7 and 8A). The heating element 20 can be configured to prevent adjacent folds from getting too close to or collapsing upon each other. This ensures that a desired gap is maintained between adjacent folds, allowing air or other fluid to flow therethrough. In addition, maintaining a minimum distance between folds helps eliminate the creation of potentially damaging and undesirable hot spots along the heating element surfaces. Therefore, maintaining a minimum distance between adjacent folds ensures that the heating element 20 will properly function as a heat exchanger, while simultaneously maintaining a generally consistent operating temperature along the surface of the element body 22.

In some embodiments, a desired spacing between folds is achieved by designing the element body 22 to adequately withstand the anticipated loads, moments and other stresses to which it may be exposed. For example, the dimensions, thickness, materials of construction and other properties of the element body can be adjusted according to a particular application. Alternatively, as discussed in greater detail herein, a desired spacing between adjacent folds can be accomplished using spacers or other devices.

Regardless of how the heating element 20 is folded, shaped or otherwise configured, the resistive materials 23 which are responsible for generating heat can be situated on one or more surfaces of the element body 22. For example, in the embodiment illustrated in FIGS. 2 and 3, the resistive materials 23 can be positioned on the top surface and/or the bottom surface of the element body 22. It will be appreciated that if the resistive materials 23 are placed on both the top and bottom surfaces of the element body 22, heat will be generated between each fold of the heating element 20. However, if resistive materials 23 are placed only on one side of the element body 22, heat will be generated at every other fold. Thus, depending on the amount of heating desired, the location, spacing, shape, resistive properties and/or other characteristics of the resistive materials utilized can be altered or customized.

Figure 4:
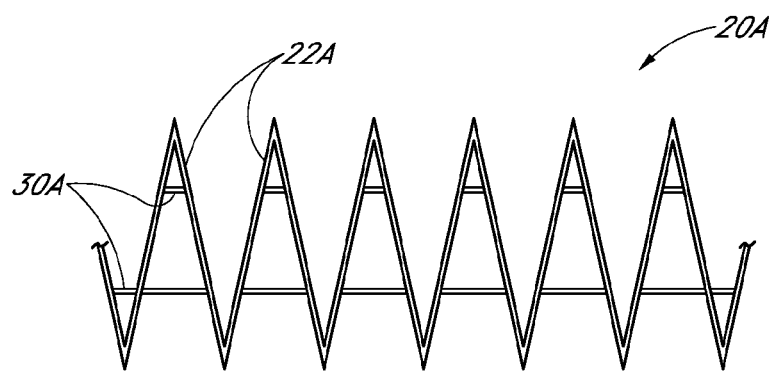
FIG. 4 illustrates a front elevation view of a folded heating element comprising a plurality of spacers according to one embodiment.

With reference to FIG. 4, the heating element 20A includes one or more spacers 30A or other separation devices between adjacent folds. The spacers 30A can be sized, shaped, located, spaced and otherwise configured to maintain a desired distance between adjacent folds. In some embodiments, the spacers 30A comprise one or more rigid, semi-rigid and/or elastic materials which are configured to resist forces that tend to urge the folded portions toward one another. The spacers 30A can be attached to the element body 22A using one or more connection devices, materials and/or methods, such as, for example, adhesives, fasteners, welds and the like.

In some embodiments, the spacers are configured to minimize or reduce the contact between the spacers and the surface of the heating element 20A to which they attach and/or abut. This may ensure that the spacers or other separation devices do not interfere with the heating properties of the heating element 20A. In addition, for heat transfer purposes, the spacers can be sized, shaped, spaced, positioned and otherwise configured to minimize the impact on air or other fluid that is directed past and/or in the vicinity of the heating element 20A.

With continued reference to FIG. 4, the heating element 20A can include spacers 30A along both its upper and lower portions. As illustrated, the spacers 30A can alternate between upper and lower ends, depending on which end the fold bend is situated. In other embodiments, however, the heating element 20A includes upper, lower and/or intermediate spacers between each fold. Further, the spacers can be located at positions higher and/or lower than illustrated herein. The spacers or other separation devices can be continuous or intermittent along the depth of the folds (into the page as shown FIG. 4). For example, the spacers 30A can extend substantially along the entire depth of the heating element 20A. In other arrangements, one, some or all of the spacers 30A are configured to intermittently extend along the depth of the heating element 20A.

Figure 5A:
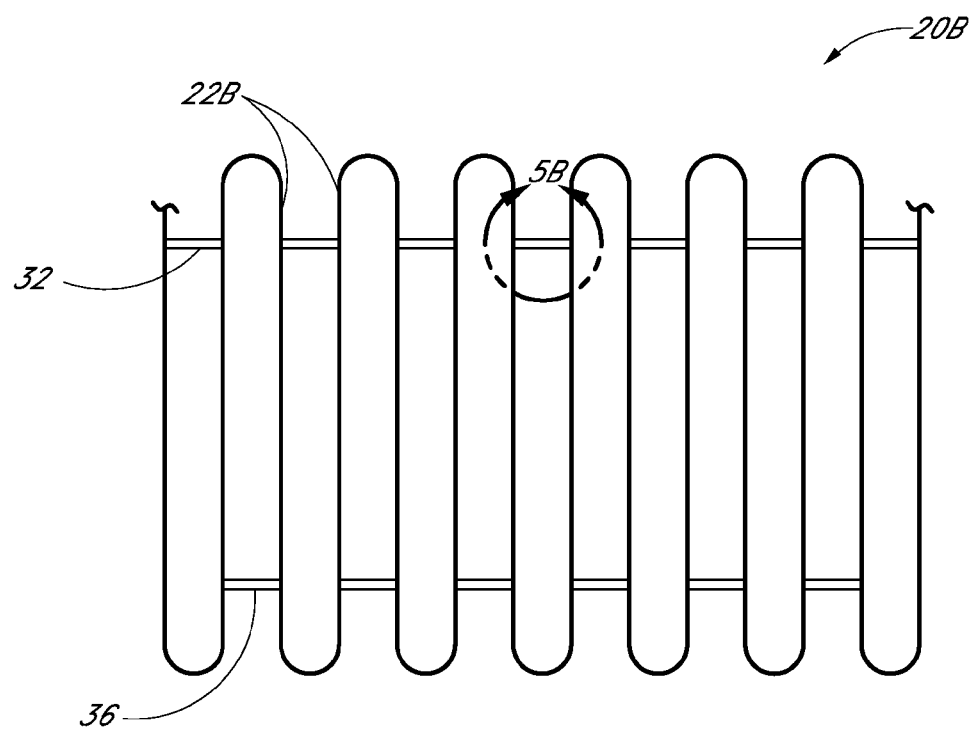
FIG. 5A illustrates a front elevation view of a folded heating element comprising a plurality of spacers according to another embodiment.

FIG. 5A illustrates another embodiment of a folded heating element 20B. As shown, the depicted heating element 20B includes an element body 22B which is arranged in a folded design using smoother, rounded transitions between adjacent folds. The heating element 20B includes a plurality of upper spacers 32 and lower spacers 36 positioned near each vertical end. Like in other embodiments disclosed herein, the spacers 32, 36 alternate position with each fold. However, as discussed, additional spacers 32 can be positioned between one or more of the interfold cavities.

Figure 5B:
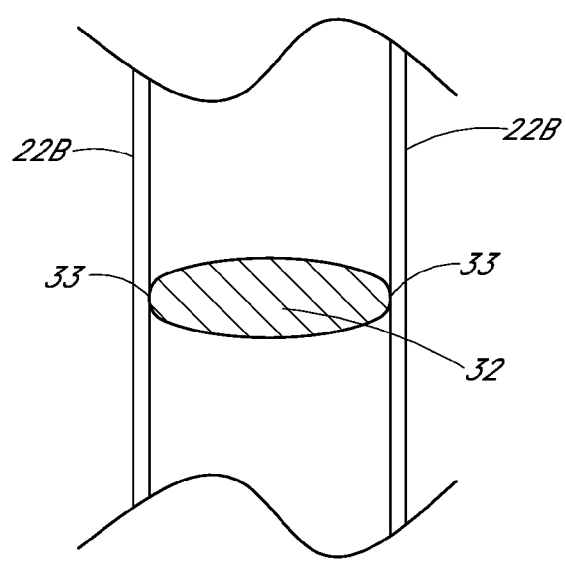
FIG. 5B illustrates a detailed view of the circled area of FIG. 5A.

The embodiment of the spacer 32 illustrated in FIG. 5B comprises a generally disc-like or oval shape. As shown, the ends 33 of the spacer 32 that contact the heating element 20B are generally pointed or sharp so as to minimize or reduce the contact area between the spacer 32 and the adjacent surfaces of the element body 22B. In alternative embodiments, the spacer 32 includes one or more other shapes than illustrated herein. For example, the spacer 32 can comprise a circular, ellipsoidal, rectangular or any other shape. Consequently, the total contact area between the spacers 32, 36 and the adjacent element body 22B may vary as desired or required. As discussed, the spacers 32, 36 can be attached to or maintained in proximity with the element body 22B or any other portion of the heating element 20B using a variety of connection methods and/or devices. For instance, the relative position of the spacers 32, 36 and the element body 22B can be maintained through the use of adhesives, fasteners, welds, other snap fittings, other mechanical connections and/or the like.

Figure 6:
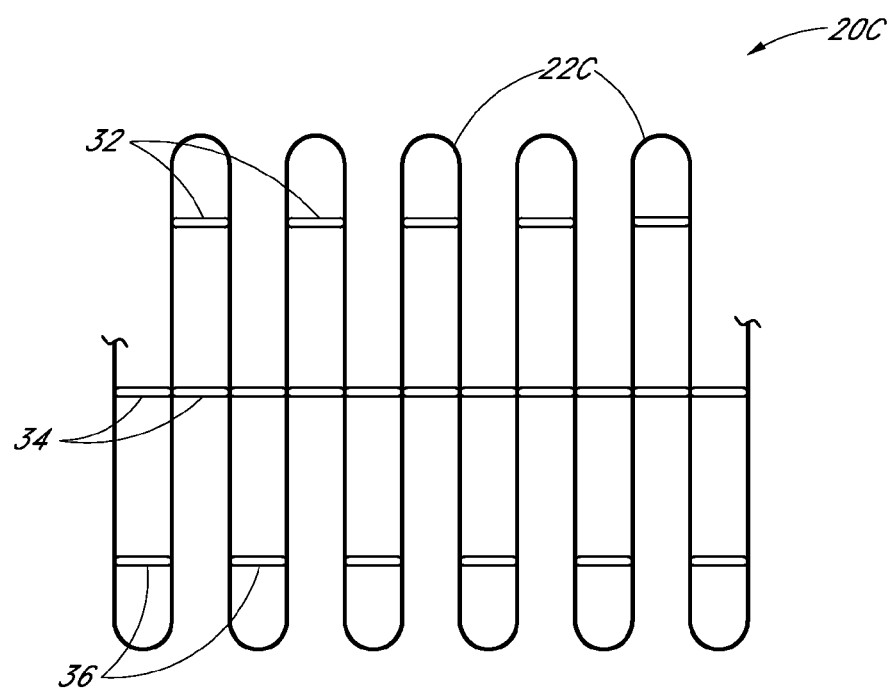
FIG. 6 illustrates a front elevation view of a folded heating element comprising a plurality of spacers according to still another embodiment.

FIG. 6 illustrates an embodiment of a folded heating element 20C similar to that described above in relation to FIGS. 5A and 5B. The depicted heating element 20C includes a plurality of upper spacers 32 and lower spacers 36 which alternate position in successive interfold cavities. In addition, the heating element 20C can comprise a plurality of intermediate spacers 34, which, in the illustrated embodiment, are located near the vertical center of each interfold cavity. In other embodiments, however, the heating element 20C can include more or fewer intermediate spacers 34 along one or more portions of the element body 22B. The number, size, spacing, dimensions, thickness, rigidity, structural integrity, location and other details of the spacers used in a heating element can be customized for a particular application as required or desired.

Figure 7:
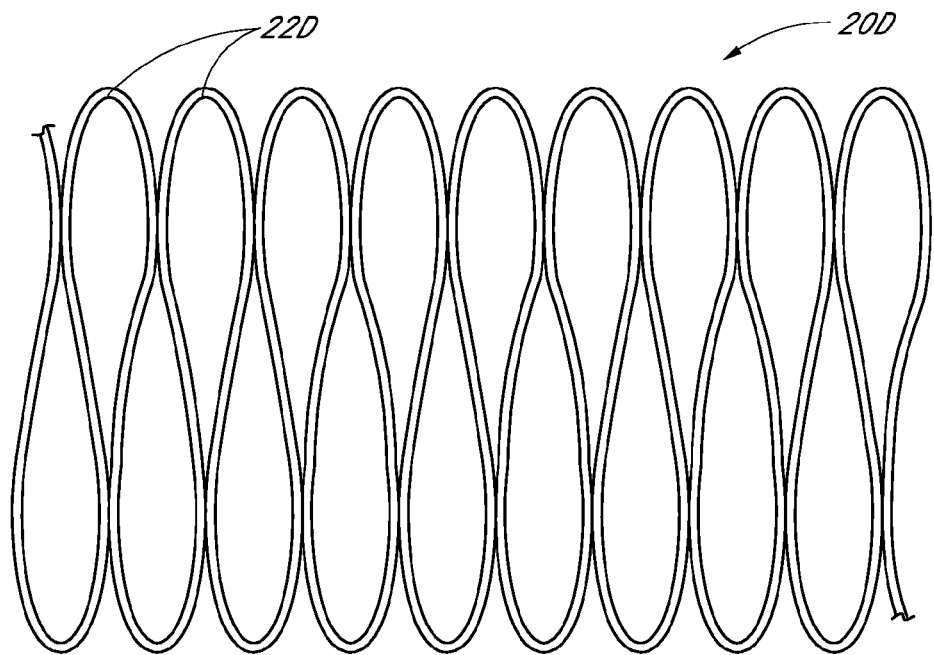
FIG. 7 illustrates a front elevation view of another embodiment of a folded heating element.

With reference to FIG. 7, the illustrated embodiment of a folded heating element 20D includes alternating curved portions which contact adjacent surfaces of the element body 22D. Despite the contact between adjacent element body surfaces, the heating element 20D is configured to prevent the folds from collapsing onto each other without the use of spacers or other separation devices. Consequently, as is discussed in greater detail herein, the heating element 20D can maintain a desired interfold cavity space through which air or other fluid can pass for heat transfer purposes.

Figure 8A:
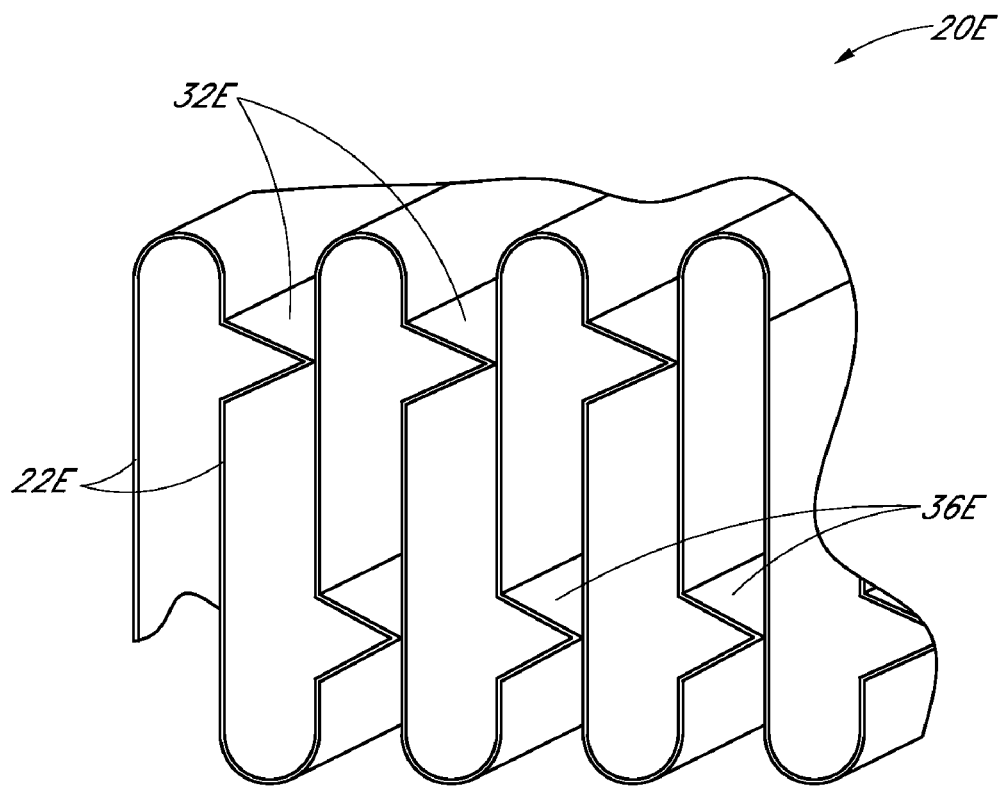
FIG. 8A illustrates a perspective view of a folded heating element which is shaped to include a plurality of spacers according to one embodiment.
Figure 8B:
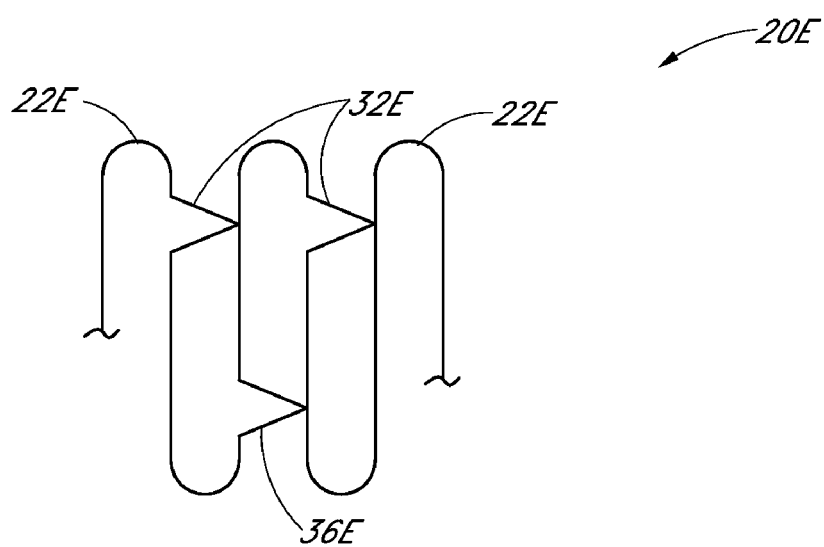
FIG. 8B illustrates a front elevation view of the heating element of FIG. 8A.

FIGS. 8A and 8B illustrate another embodiment of a folded heating element 20E that does not require separate spacers or other isolating members to maintain a desired interfold separation distance. As shown, the heating element 20E comprises a plurality of bumps or other protrusions 32E, 36E that are integrally formed in the element body 22E. In some embodiments, the element body 22E includes upper bumps 32E and lower bumps 36E that alternate with each sequential fold. In other embodiments, the heating element 20E includes more or fewer internally formed bumps or protrusions 32E, 36E than illustrated and discussed herein. As discussed herein with relation to arrangements that utilize separate spacers, the tip of the internally formed bumps 32E, 36E can be configured to minimize or reduce the contact surface with the adjacent fold. For example, in FIGS. 8A and 8B, the bumps 32E, 36E have a generally triangular shape with a relatively sharp tip extending in the direction of the adjacent surface of the element body 22E. Thus, the bumps 32E, 36E are configured to contact the adjacent surface of the element body 22E generally in a single spot, at least in the vertical direction.

Figure 8C:
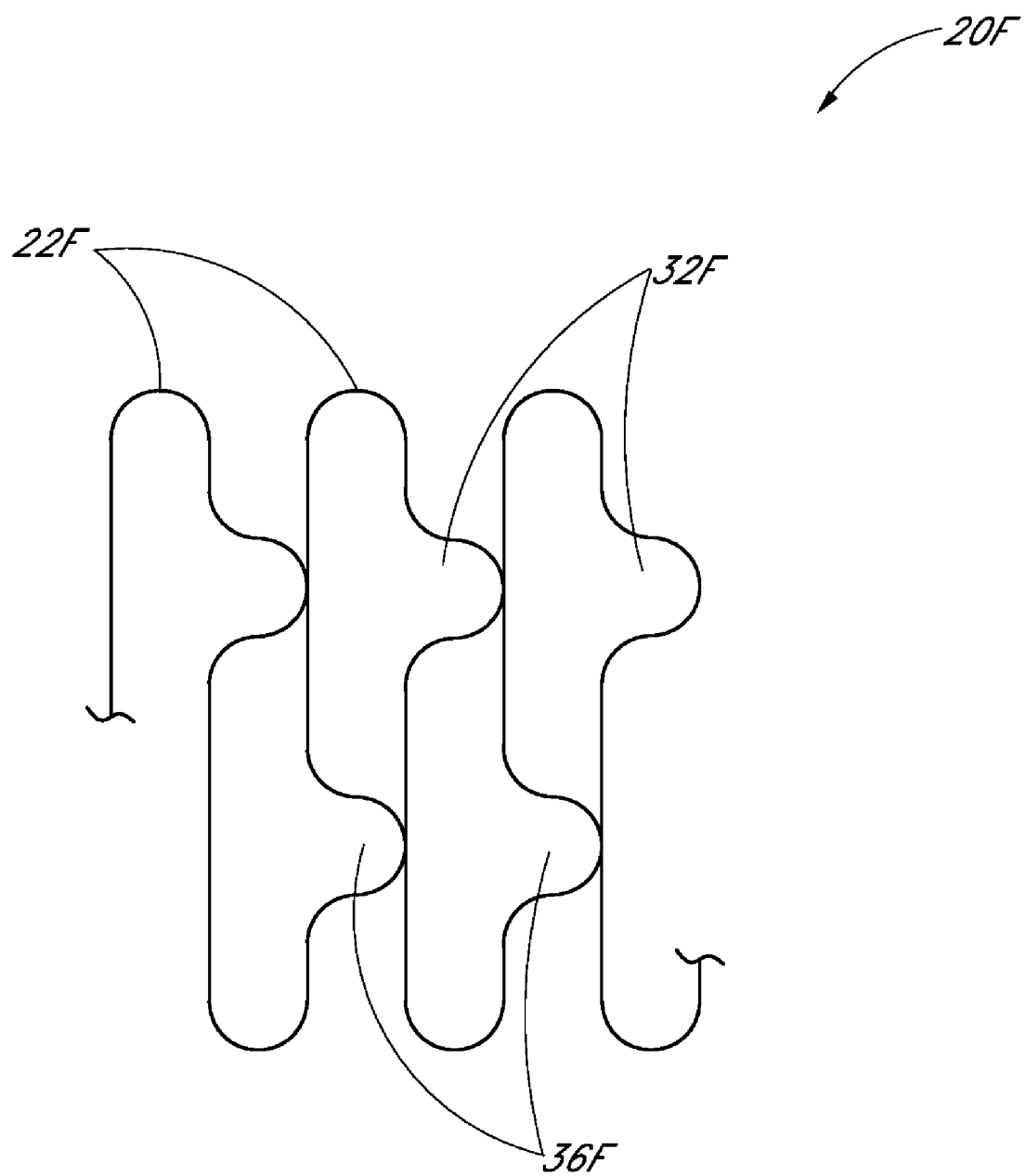
FIG. 8C illustrates a front elevation view of a heating element according to another embodiment.

With reference to FIG. 8C, the bumps or protrusions 32F, 36F of the heating element 20F can have a generally rounded shape. This can help prevent or reduce the likelihood of damage to the heating element 20F as relatively sharp bend radii can potentially damage the heater.

Figure 9A:
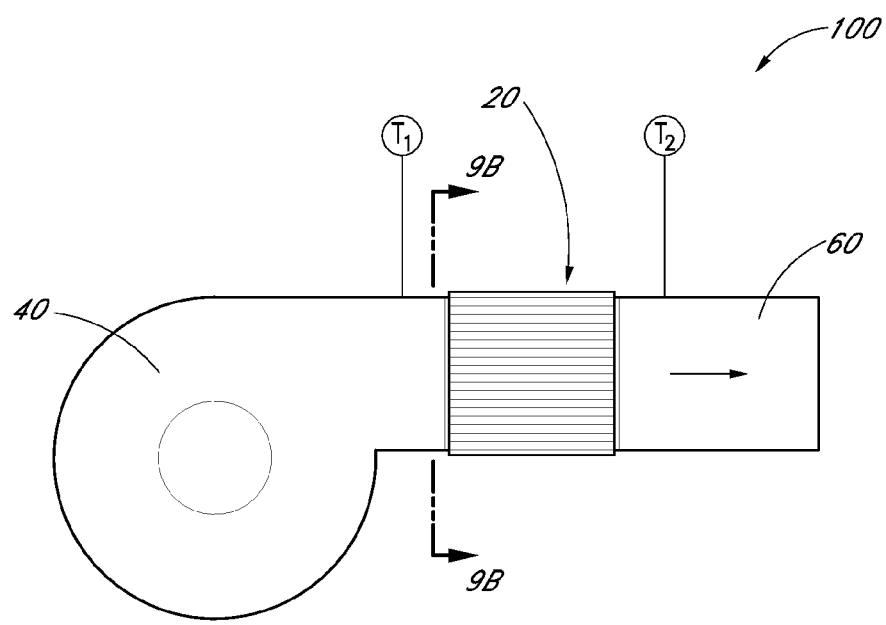
FIG. 9A schematically illustrates a blower system configured to deliver air past a folded heating element according to one embodiment.

FIG. 9A illustrates one embodiment of a fluid heating system 100 that includes a heating element 20 similar to the embodiments discussed herein. As shown, the fluid heating system 100 can include a fluid transfer device 40 (e.g., fan, blower, etc.) that is configured to deliver a volume of air or other fluid past and/or in the vicinity of a heating element 20 and into a downstream conduit 60. Consequently, as fluid travels between the folds of the heating element 20, the transfer of heat from the heating element 20 to the fluid can occur. Therefore, the heating system 100 can be used to desirably heat ambient air drawn into the fluid transfer device 40 so that $T_2$ is greater than $T_1$.

Figure 9B:
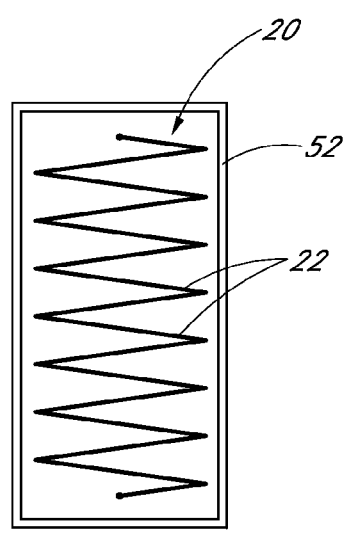
FIG. 9B illustrates a cross-sectional view through the folded heating element of FIG. 9A.

A cross-sectional view through a portion of the fluid heating system 100 that comprises the heating element 20 is illustrated in FIG. 9B. The heating element 20 can be advantageously enclosed within an outer housing 52 of the fluid heating system 100. In the depicted embodiment, the heating element 20 is configured to encompass a majority of the internal space defined by the housing 52. However, in other arrangements, the heating element 20 can occupy less or more of the housing's internal space. Further, depending on the size of the housing 52, the heating demand of the system and one or more other considerations, the housing 52 can be configured to receive two or more separate heating elements 20.

Figure 10A:
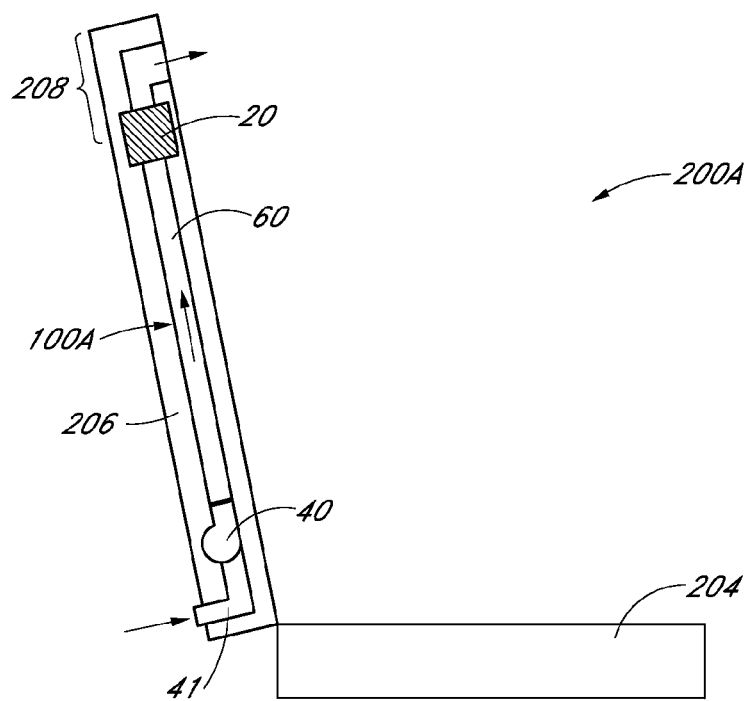
FIG. 10A schematically illustrates a blower system similar to the one depicted in FIG. 9A and configured to deliver heated air to the neck portion of a seating assembly in accordance with one embodiment.

FIG. 10A schematically illustrates one embodiment of a fluid heating system 100A positioned within a portion of a seating assembly 200A (e.g., an automotive seat, chair, sofa, bed, wheelchair, stadium seat, etc.). In the illustrated embodiment, the heating system 100A is situated in the backrest portion 206 of the seating assembly 200A. As shown, a fluid transfer device 40 can be used to draw air or other fluid into an inlet duct 41. The air is then transferred by energy imparted on it by the fluid transfer device 40 to a discharge conduit 60. Air delivered into the discharge conduit 60 can then be channeled through one or more heating elements 20 where it is selectively heated as desired. The heated air or other fluid exiting the heating system 100A can be directed to one or more portions of the seating assembly 200A. For example, in the illustrated embodiment, the heated air is directed to the headrest region 208 of the backrest portion 206 of the seat. In some arrangements, the heated air is incorporated into a neck or head warmer. In some arrangements, the heating system does not include an inlet duct or other similar member. Thus, air or other fluid can be drawn directly into an inlet of a fluid transfer device (e.g., blower, fan, etc.).

In other embodiments, a heating system can be configured to provide spot heating to one or more other locations of an automobile interior (e.g., leg area, feet area, headliner, visor, A, B or C pillars, etc.), building interior (e.g., ottoman, leg rest) and/or the like.

In other embodiments, the heated air can be delivered to and distributed through a larger portion of the backrest portion 206 and/or bottom portion 204 of the seating assembly 200A. Therefore, a fluid heating system 100A can be incorporated into a seat warming system. For example, a distribution system (not shown) positioned downstream of the heating element 20 can be configured to deliver heated air through one or more cushioned areas of the backrest portion 206 and/or the seat bottom portion 204. Further, such fluid heating systems 100A can be used to "spot warm" particular regions of a seating assembly. For example, in some embodiments, a seating assembly comprising such a heating system 100A can be configured to selectively deliver heated air to one or more locations. Such seating assemblies are preferably equipped with a control system to allow a user to choose where he or she would like the heated air and/or the warming effect delivered.

As discussed, various embodiments of the fluid heating system 100A described herein can be adapted for use in different types of seating assemblies and related items. For instance, the heating system 100A can be used to deliver warm air and/or a heating effect to automobile seats, airplane seats, office chairs, stadium seats, sofas, recliners, beds and the like. Although the various embodiments illustrated and/or discussed herein include only a single heating system 100A, it will be appreciated that two or more heating systems 100A can be used in a single seating assembly or other device. For example, the depicted seating assembly 200A can include separate fluid heating systems 100A for the backrest portion 206 and the seat bottom portion 204. In other embodiments, in order to satisfy a particular air heating demand, a backrest portion 206 or a seat bottom portion 204 each includes two or more separate fluid heating systems 100A.

Figure 10B:
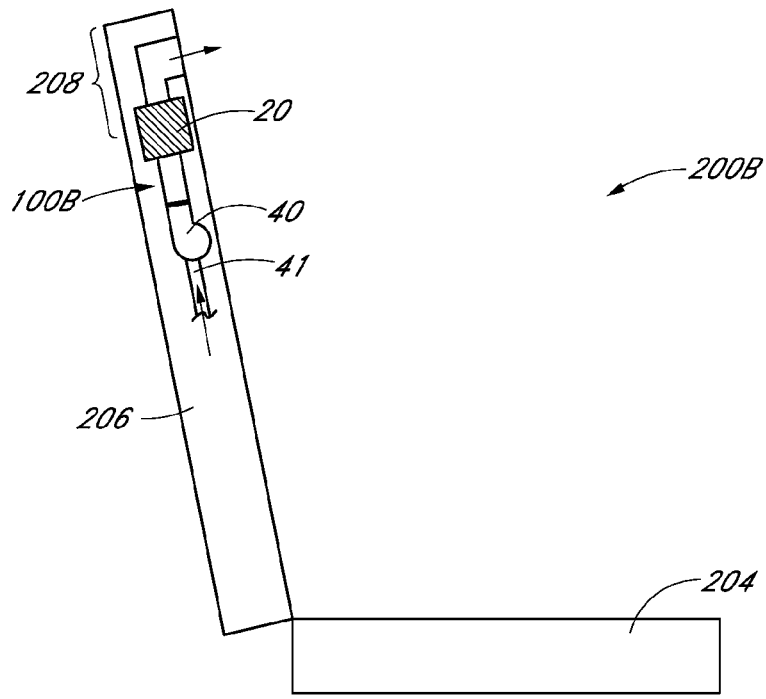
FIG. 10B schematically illustrates a blower system configured to deliver heated air to the neck portion of a seating assembly according to another embodiment.

FIG. 10B illustrates another embodiment of a seating assembly 200B comprising a heating system 100B within its seat back portion 206. In the depicted embodiment, the distance between the fluid transfer device 40 (e.g., blower, fan, etc.) and the heating element 20 is relatively short, thereby eliminating some, most or all of the discharge conduit. It will be appreciated that the distance between the fluid transfer device 40, the heating element 20 and one or more other components of the heating system 100B can vary, as desired or required by a particular application.

Figure 11:
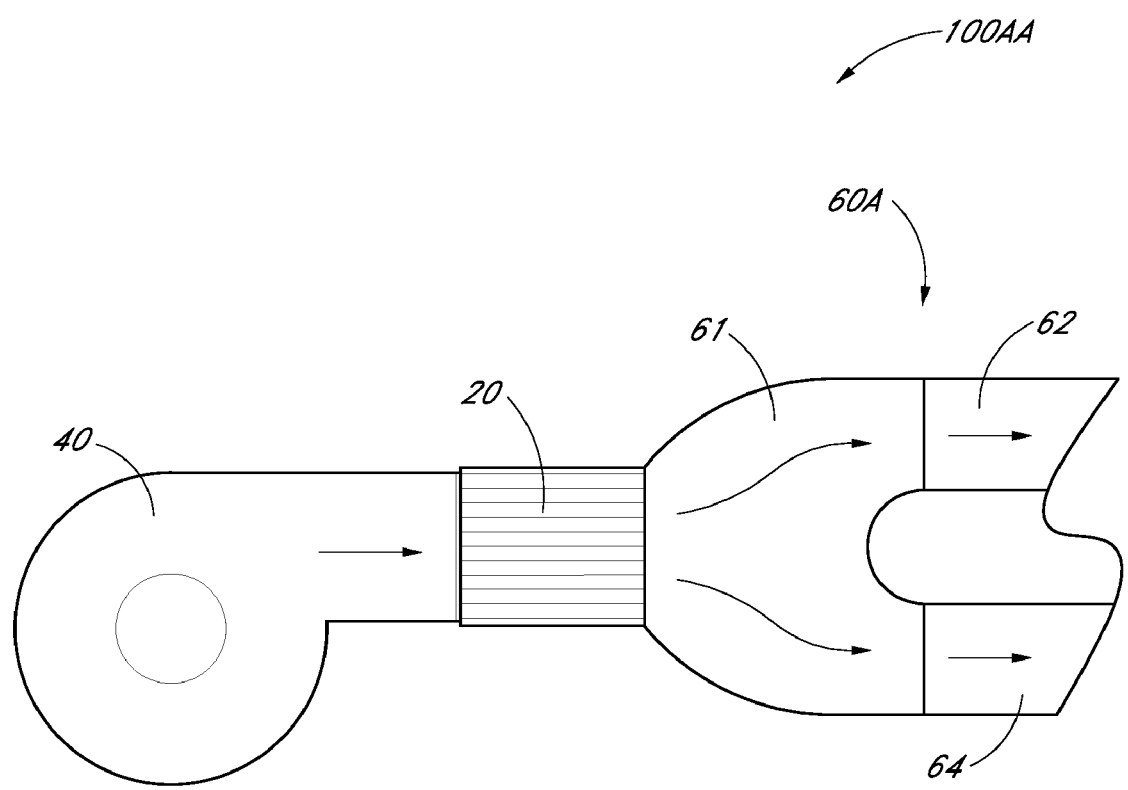
FIG. 11 schematically illustrates a blower system which includes a folded heating element and which is configured to deliver heated air through two downstream passages according to one embodiment.

FIG. 11 schematically illustrates one embodiment of a fluid heating system 100AA which is configured to deliver heated air or other fluid through two different outlet conduits 62, 64. As a volume of heated air or other fluid exits the heating element 20, it enters a discharge conduit 60A. As shown, the discharge conduit 60A can include a flow splitting portion 61 which is configured to divide the fluid flow into two directions. In the illustrated embodiment, the flow splitting portion 61 splits the air flow generally evenly between the two downstream outlet conduits 62, 64. However, the heating system 100A can be differently configured so that flow is unevenly divided between two or more downstream outlets. Heated air or other fluid directed into the outlet conduits 62, 64 can be directed to one or more portions of a seating assembly or other device. As discussed, the heated air can be delivered directly to a user (e.g., neck warmer) and/or can be delivered indirectly to a user (e.g., to heat a seat cushion).

Figure 12:
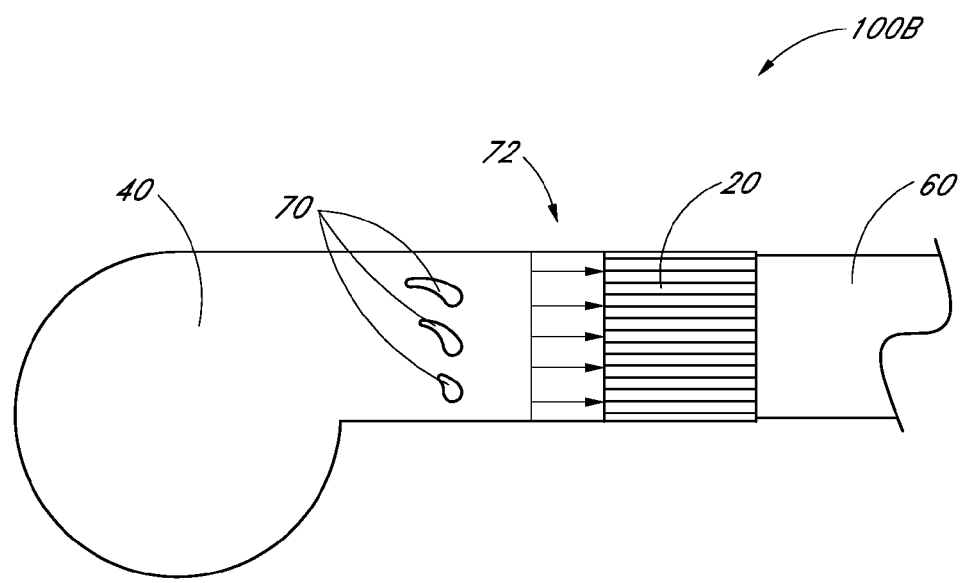
FIG. 12 illustrates a blower system which includes a folded heating element and a plurality of flow vanes positioned downstream of a fan according to one embodiment.

With reference to FIG. 12, a heating system 100B can comprise one or more flow-conditioning vanes 70 downstream of the fluid transfer device 40 and upstream of the heating element 20. This can help create a more uniform flow distribution of air or other fluid exiting the fluid transfer device 40 and approaching the heating element 20. FIG. 12 schematically illustrates one embodiment of a fluid flow distribution pattern 72 resulting from the use of flow-conditioning vanes 70. The use of such vanes 70 or similar devices can be especially desirable in arrangements where the fluid transfer device 40 is relatively close to the heating element 20, as the fluid discharged by the fluid transfer device 40 is not given sufficient distance in which to become more uniform. Thus, flow-conditioning vanes 70 can reduce or eliminate the uneven distribution of fluid through the folds of a heating element 20. Consequently, the efficiency of thermal transfer from the heating element 20 to the fluid passing therethrough can be advantageously improved. In addition, this can help avoid or reduce the likelihood of localized hot spots on the surface of the heating element.

As discussed, a more even fluid flow distribution pattern in the discharge conduit can be created if sufficient distance is provided between the fluid transfer device 40 and the heating element 20. Therefore, with reference to the embodiment schematically illustrated in FIG. 10A, the flow distribution pattern of the fluid approaching the heating element 20 may be generally uniform without the use of conditioning vanes. In addition, in such embodiments, positioning the fluid transfer device away from the heating element can provide additional benefits as the fluid transfer device 40 can be distanced from a user's head or other sensory-sensitive area. This can help reduce the noise and/or vibration that a user feels and/or otherwise senses.

Figure 13:
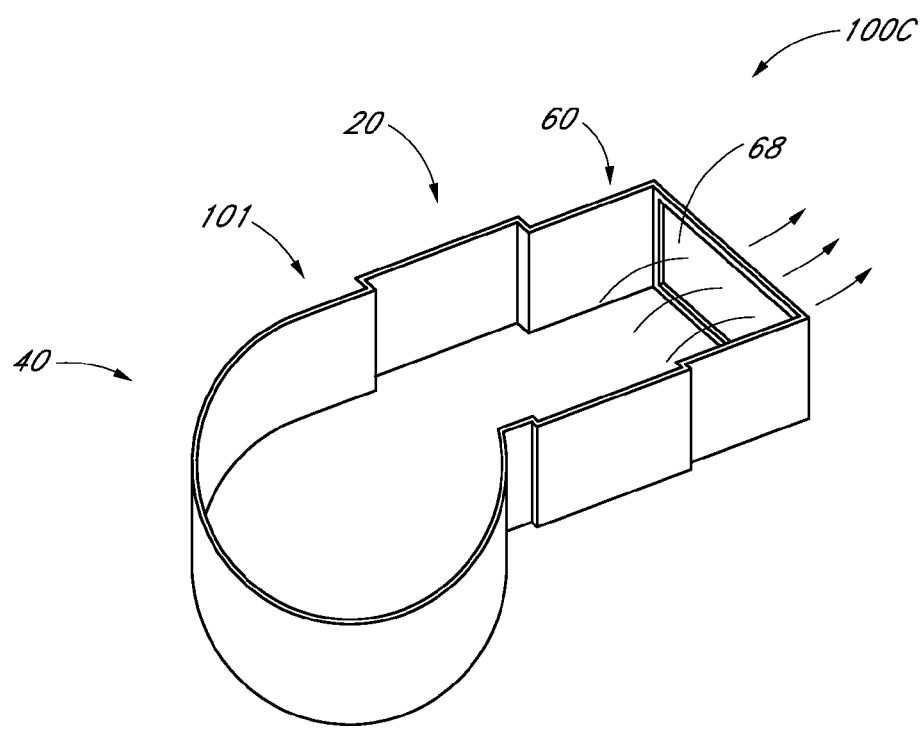
FIG. 13 illustrates a perspective view of a housing configured to receive a fan and a folded heating element according to one embodiment.

FIG. 13 illustrates a housing 101 adapted for use in a fluid heating system 100C. In the depicted embodiment, the fluid heating system 100C conveniently includes a single housing 101 which is configured to house a fluid transfer device 40, a heating element 20 and the discharge conduit 60. An outlet opening 68 is provided at the downstream end of the discharge conduit 60. In the illustrated arrangement, the portion of the housing 101 that is configured to receive the heating element 20 includes an enlarged area. This permits a heating element 20 to be securely placed within the area provided for it. In alternative embodiments, the housing 101 can comprise two or more portions that are joined to one another using one or more attachment methods (e.g., adhesives, fasteners, etc.).

Figure 14:
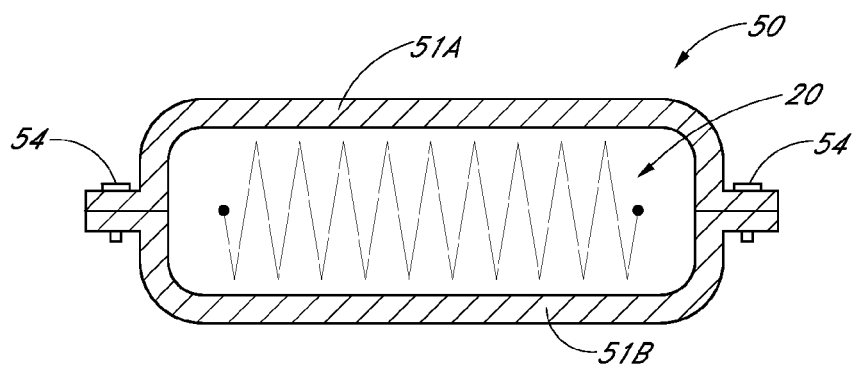
FIG. 14 illustrates a cross-sectional view of a folded heating element positioned within a housing according to one embodiment.
Figure 15A:
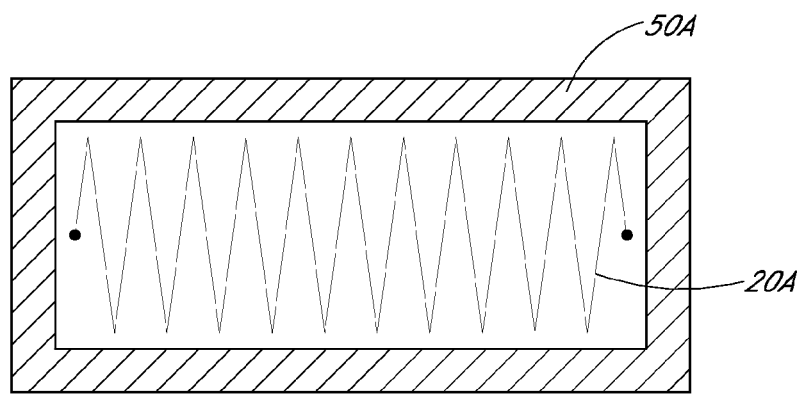
FIG. 15A illustrates a cross-sectional view of a folded heating element positioned within a housing according to another embodiment.
Figure 15B:
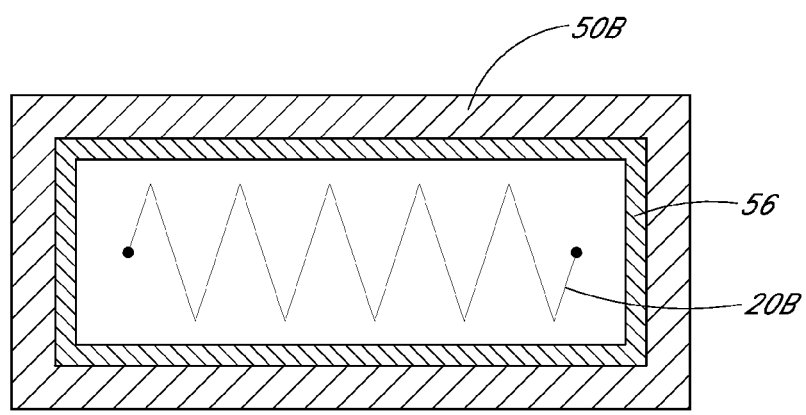
FIG. 15B illustrates a cross-sectional view of a folded heating element which is positioned within a housing and is surrounded by thermal insulation according to one embodiment.

With reference to the cross-sectional view illustrated in FIG. 14, a housing 50 can be configured to include two separate halves 51A, 51B. As shown, the two halves 51A, 51B can be connected using bolts 54 or other fasteners. Such a split design for the housing 50 can facilitate the placement of a heating element into and removal from a heating system for replacement, maintenance, service or any other purpose. However, as illustrated in the embodiments of FIGS. 15A and 15B, the housing need not have a split design. The heating element 20 can be maintained within a desired portion of a housing one or more securement devices or methods, such as, for example, adhesives, fasteners, clips, welds, appropriately shaped housings and/or the like.

With continued reference to FIG. 15A, the heating element 20A can be positioned within a single continuous housing 50A. The illustrated heating element 20A is sized and shaped to substantially fill the entire void defined by the housing 50A. In other arrangements, the heating element can have a different size and shape relative to the housing 50A. As discussed, the heating element can be advantageously sized, shaped and otherwise configured to provide a desired level of heat transfer to air or other fluid passing near its surfaces.

In some embodiments, it is possible to reduce the size of the heating element 20B and/or the amount of electrical current delivered to the heating element 20B by providing thermal insulation to one or more locations of the heating system. For example, in FIG. 15B, an inner surface of the housing 50B is lined with one or more layers of insulating material 56. The insulating material 56 is configured to reduce or eliminate parasitic heat losses through the wall of the housing 50B. Consequently, the overall thermal efficiency of the heating system can be improved. In some embodiments, such insulating materials also permit the heating element to operate at higher temperatures, thereby allowing the heating element to be generally smaller in size. Further, the use of insulating materials can help prevent damage to the housing caused by elevated temperatures.

In some embodiments, the insulation material 56 comprises foam, fiberglass or any other material. In other embodiments, the housing 50B comprises one or more materials or features that improve its thermal insulation properties. For example, gas assist injection molding and/or structural foam molding methods can be utilized in the manufacture of the housing wall. In other embodiments, the housing is provided with an interior barrier layer (e.g., air, foam, etc.) that enhances its thermal insulation properties. It will be appreciated that any other device or method of improving the thermal insulating properties of the housing 50B and/or other portions of the overall heating system can be used. In addition, the thermal insulation can be placed, either continuously or intermittently, along one or more portions of the system.

As illustrated in FIGS. 16A and 16B, the thermal insulation properties of the system can be further improved by insulating all or a portion of the discharge conduit 60 positioned downstream of the heating element 20. In the depicted embodiment, the wall 50 of the discharge conduit 60 is lined with one or more layers 66 of thermal insulation. The thermal insulation layers 66 can be attached to the interior surface of the discharge conduit wall 50 and/or the heating element housing 50B (FIG. 15B) using one or more adhesives, fasteners or any other connection method or device. However, in other embodiments, thermal insulation can be positioned on the outside of the discharge conduit wall 50, either in lieu of or in addition to placing insulation on the interior wall.

In some embodiments of a fluid heating system, a device or method of measuring the temperature of the heater, the housing and/or the heated fluid is provided. This can help ensure that the heating element 20 is properly operated and controlled. In addition, such temperature sensing features can assist in operating the heating system more safely and/or efficiently, as dangerous or damaging high heating levels and unnecessary heating are avoided.

Figure 17A:
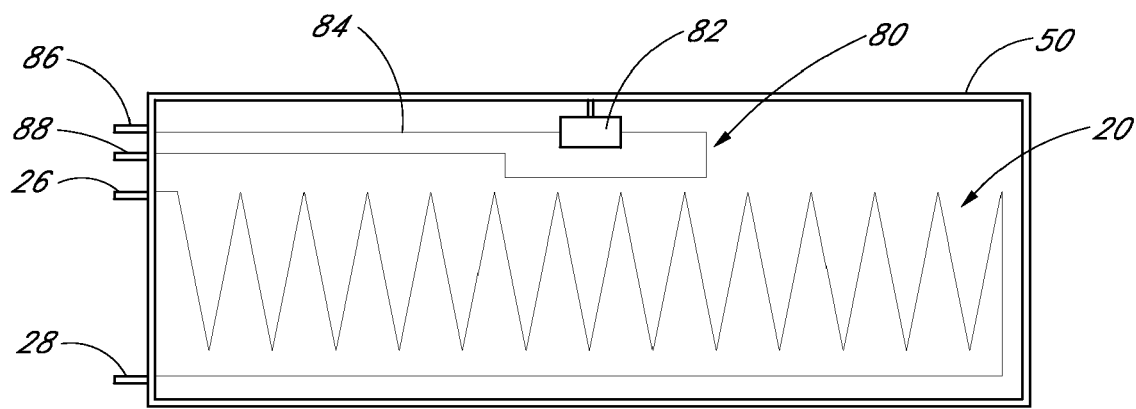
FIG. 17A schematically illustrates a temperature sensor positioned in proximity to the folded heating element according to one embodiment.

FIG. 17A illustrates one arrangement of a temperature sensing device 80 adapted for use in a fluid heating system as disclosed herein. In the depicted embodiment, a folded heating element 20 is included within a housing 50 or other enclosure. The terminal ends 26, 28 of the heating element 20 can be advantageously routed to the outside of the housing 50. The housing 50 can be sized, shaped, designed and otherwise configured to receive a temperature sensor 82 (e.g., thermistor, thermostat, any other type of sensor or temperature detection device, etc.) or other thermal sensor. In FIG. 17A, the temperature sensor 82 is attached to the interior wall of the housing one or more connection methods or devices (e.g., adhesives, soldering, fasteners, etc.). As shown, the temperature sensor 82 includes wiring 84 and one or more electrical connections 86, 88 that may be needed for the proper operation of the temperature sensing system 80. It will be appreciated that one or more other methods or devices can be utilized to measure the temperature of the heating element, heated fluid or any other portion of the fluid heating system. In other embodiments, the temperature sensor 82 is directly or indirectly mounted to the heating element 20 and/or some other component or portion of the heating system.

Figure 17B:
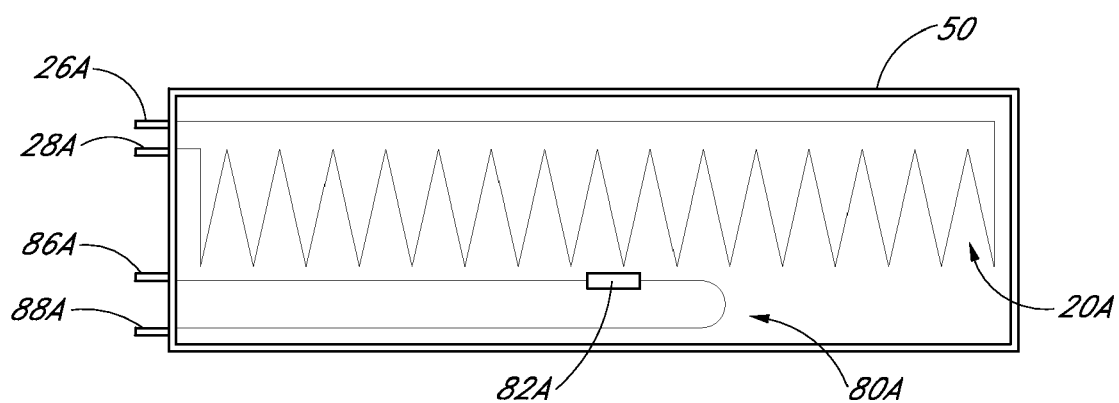
FIG. 17B schematically illustrates a temperature sensor positioned in proximity to the folded heating element according to another embodiment.

As illustrated in FIG. 17B, a temperature sensing device 80A can be configured so that the temperature sensor 82A is located in a more central portion of the housing 50. In some embodiments, such a configuration could be used to measure the temperature of air upstream and/or downstream of the heating element 20A. The temperature sensor 82A can be attached to the housing 50, the heating element 20A or any other portion of the heating system. Alternatively, the temperature sensor 82A can be configured to be suspended within an internal portion of the housing 50 without physically contacting or attached to the housing 50 or the heating element 20A.

In some embodiments discussed herein, the heating element is provided downstream of a fluid transfer device. However, one or more heating elements can be provided upstream of and/or within a fluid transfer device, either in lieu of or in addition to any downstream heating elements.

Figure 18:
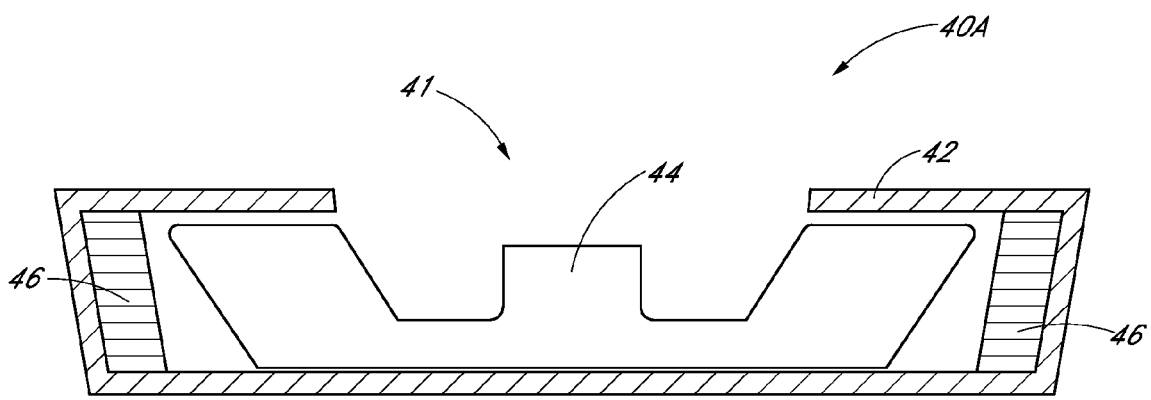
FIG. 18 illustrates a cross-sectional view of a blower which includes an annular folded heating element along its radial periphery in accordance with one embodiment.

With reference to the cross-sectional view of FIG. 18, a heating element 46 can be positioned within the housing 42 of the fluid transfer device 40A. In the illustrated embodiment, the heating element 46 includes a generally annular shape whose outer surface is sized to substantially match the interior surface of the fluid transfer device housing 42. Like with other embodiments discussed herein, the heating element 46 can include a plurality of folds allowing air passing therebetween to be heated. The heating element 46 can be attached to the housing 42 using one or more connection methods or devices (e.g., adhesives, fasteners, welds, etc.).

With continued reference to the embodiment illustrated in FIG. 18, ambient air or other fluid entering the fluid transfer device 40A through its inlet 41 is moved by an impeller 44 or other energy-imparting member in a generally radial direction. Thus, air or other fluid can be directed towards the heating element 46 where it is routed between the folded portions of the heated surface of the element body. As air travels between the folds, heat transfer from the heating element to the fluid can occur. Thus, the fluid is heated within the fluid transfer device 40A. This can assist in providing a fluid heating system where space is limited. The heated air is then discharged from the fluid transfer device 40A and is routed into a discharge conduit, where in some embodiments, it may pass through one or more additional heating elements.

Figure 19A:
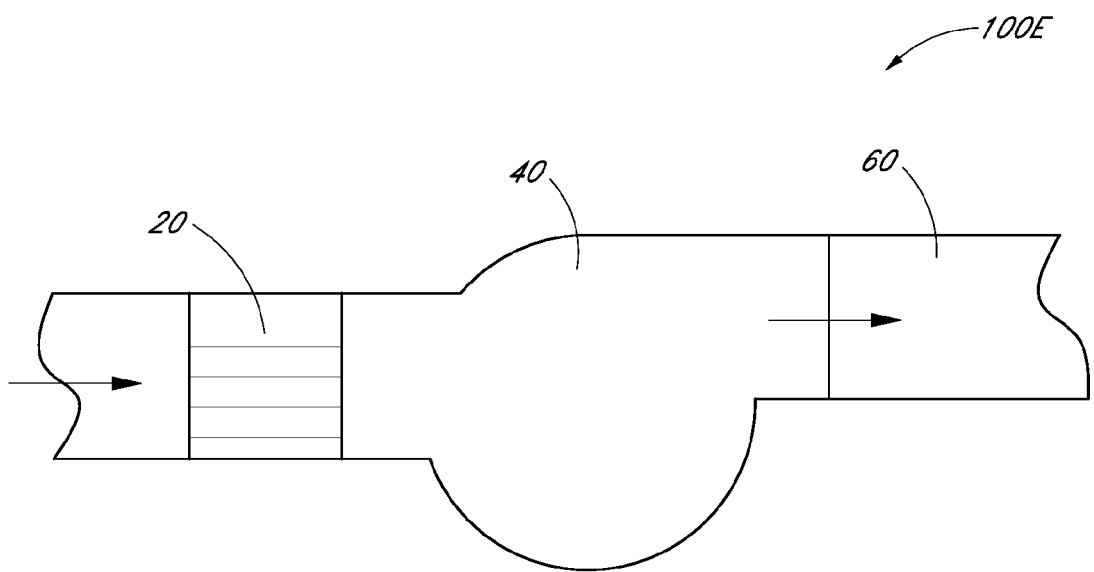
FIG. 19A schematically illustrates a blower system which includes a folded heating element positioned upstream of the blower inlet according to one embodiment.

As illustrated schematically in FIG. 19A, in other embodiments, the heating element 20 is situated upstream of the fluid transfer device 40. Thus, the air or other fluid is heated prior to entering the fluid transfer device 40. In such arrangements, it may be desirable to insulate the fluid transfer device and/or any upstream conduit to further protect against parasitic heat losses. In other arrangements, a heating element 20 is positioned within one or more portions of a blower or other fluid transfer device, either in lieu of or in addition to being located upstream and/or downstream of the blower or other fluid transfer device. For example, one or more heating elements can be positioned within the scroll and/or other interior location of the housing.

Figure 19B:
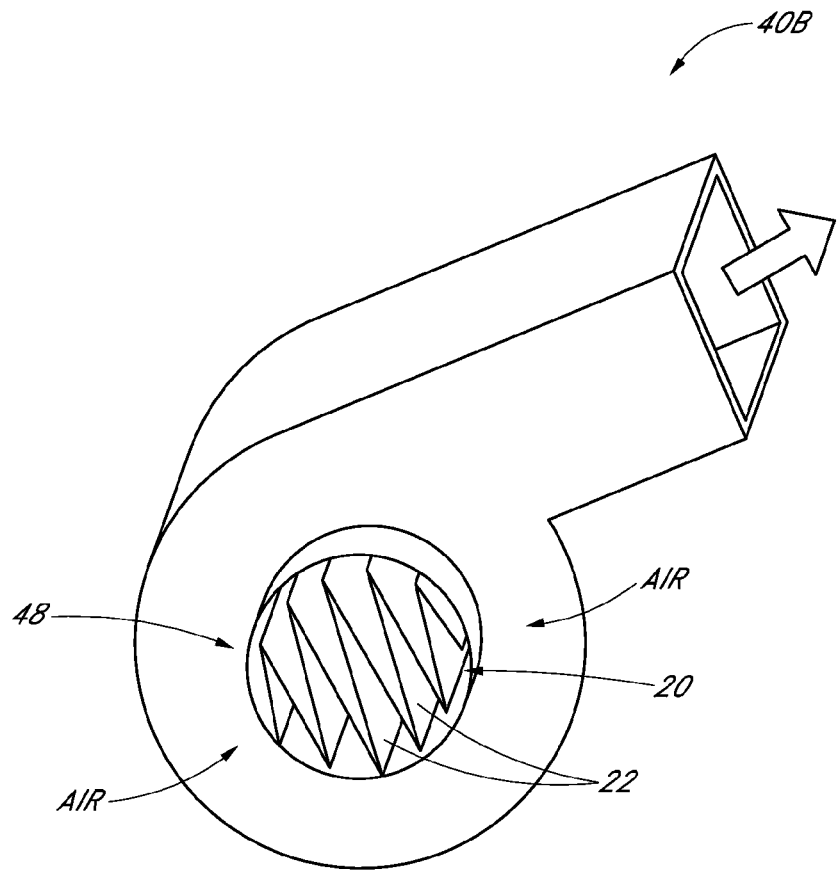
FIG. 19B illustrates a perspective view of a blower system which includes a folded heating element at its inlet according to one embodiment.

FIG. 19B illustrates one embodiment of a heating element 20 positioned at the inlet end of a fluid transfer device 40B. As shown, the heating element 20 can include a folded design that is configured to heat air passing therethrough. In the depicted embodiment, the heating element 20 is sized to generally match the shape of the inlet to the fluid transfer device 40B. However, the heating element 20 can have any size, shape and/or configuration. For example, in some embodiments, the heating device 20 is positioned in an upstream conduit (not shown) which is in fluid communication with the fluid transfer device 40B. As air is directed into the inlet of the fluid transfer device 40B, it can be heated by the heat transfer occurring at or near the surfaces of the folded heating element 20.

According to some embodiments, the function of the fluid heating system can be advantageously controlled by a user. FIGS. 20A and 20B illustrate two embodiments in which a printed circuit board assembly (PCBA) used in controlling the function of the heating element is included in the heating system 100F, 100G. In FIG. 20A, the PCBA 120 is a separate member which is placed inside the housing 110 of the heating system 100F. Alternatively, as illustrated in FIG. 20B, the PCBA 130 can be directly incorporated into the housing design so that it actually forms a portion of the heating system housing. Thus, the heating system can be advantageously configured to perform two different electrical or control functions, such as, for example, providing electrical power to the fluid transfer device and controlling the heating element.

In some embodiments, one or more controllers, motor drivers and/or other electrical components can be incorporated into a single heating system assembly or enclosure. Thus, a single PCBA can be used to control the function or operation of two or more components of a heating system, such as, for example, motor drivers (e.g., for the fluid transfer device), controllers and/or the like. In one embodiment, such a combination PCBA is positioned within a housing, box or other enclosure. In other arrangements, where the fluid transfer device and the warmer are situated within a single housing or enclosure, a combination PCBA can be positioned within the same housing or enclosure. Alternatively, however, one or more PCBAs for motor drivers, controllers and/or other electrical devices can be included in separate boxes or enclosures.

Figure 21:
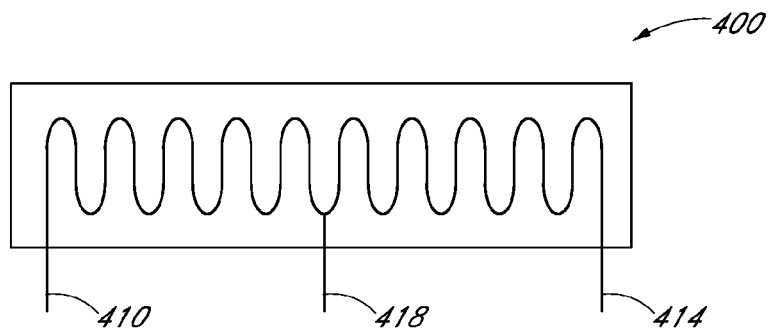
FIG. 21 schematically illustrates a folded heating element according to another embodiment.

FIG. 21 schematically illustrates another embodiment of a folded heating element 400. As shown, the heating element 400 can comprise generally rounded folds. Alternatively, the heating element 400 can include one or more other types of folds as disclosed herein. In the depicted embodiment, the folded heating element 400 includes multiple electrical connections 410, 414, 418. For example, the heating element 400 can include electrical connections 410, 414 at or near its edges. In addition, the heating element 400 can include one or more intermediate electrical connections 418.

With continued reference to FIG. 21, a current can be selectively passed through only a portion of the heating element 400 or through the entire heating element 400. For example, in the illustrated embodiment, under one operating scenario, electrical current can be directed from one end electrical connection 414 to another end electrical connection 410. However, under a different operating scenario, current can be directed through only a portion of the heating element 400 (e.g., between an intermediate electrical connection 418 and an end electrical connection 410, 414). In other arrangements, the heating element 400 can comprise additional electrical connections, as desired or required by a particular application. In addition, the location and other details of the electrical connections can vary.

Such configurations provide the heating element 400 with additional operational flexibility by allowing it to operate at different power levels. For instance, depending on the desired or required heating demand, only a portion of the heating element 400 can be used to convert electrical current to heat. In some arrangements, the portion of the heating element 400 through which electrical current may pass is determined by a controller or other automated or manual control device.

Figure 22A:
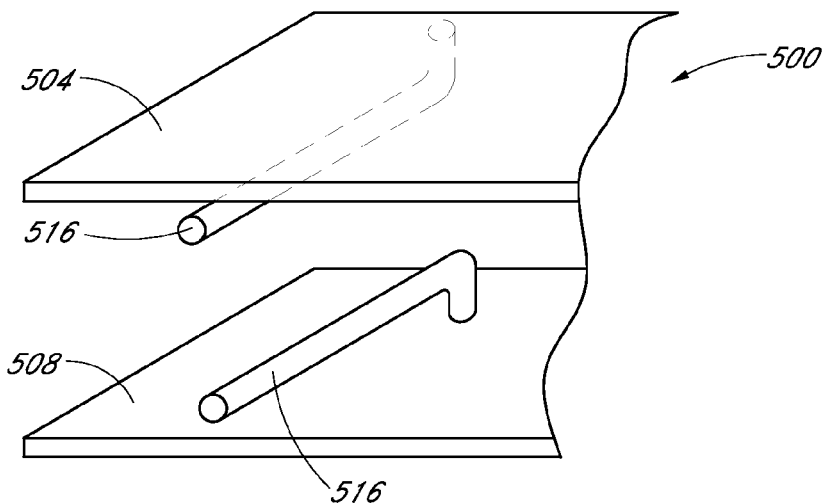
FIG. 22A illustrates a perspective view of a housing configured to receive a folded heating element according to one embodiment.
Figure 22B:
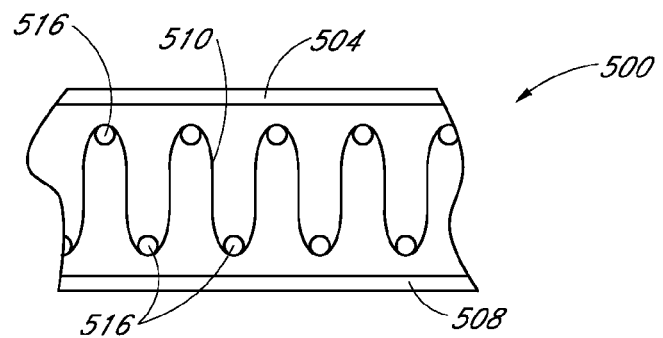
FIG. 22B illustrates a side view of the housing of FIG. 22A comprising a folded heating element according to one embodiment.

FIGS. 22A and 22B illustrate another embodiment of a heating system 500 configured for use in a climate controlled seat assembly. The heating system 500 can include a folded heating element 510 as described and illustrated herein. The folded heating element 510 can be positioned within an outer housing, which in the depicted arrangement, comprises an upper portion 504 and a lower portion 508.

As shown and illustrated by other embodiments herein (e.g., FIGS. 8A-8C), the adjacent folded portions of the heating element 510 can be separated by elongated rods 516, fingers or other members. Such rods or other members 516 can be attached or otherwise secured to the upper and lower portions 504, 508 of the housing. With reference to FIG. 22A, the rods or other members 516 can comprise an L-shape. However, in other arrangements, the rods or other members 516 can have any other shape, size or other properties as desired or required. In the illustrated embodiment, the elongated rods or fingers 516 are inserted at the bends of the heater element to maintain a desired spacing.

Figure 23:
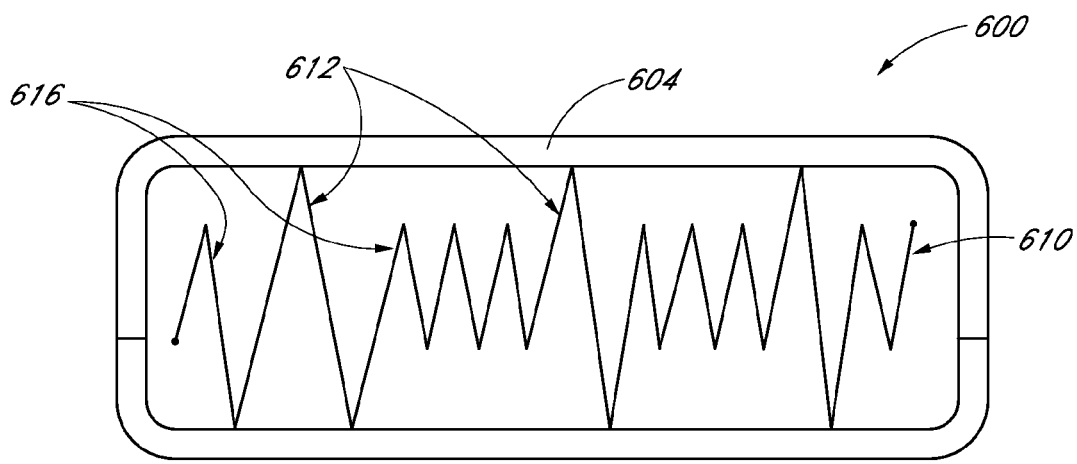
FIG. 23 schematically illustrates a side view of one embodiment of a folded heating element positioned within a housing.

FIG. 23 illustrates another embodiment of a heating system 600. As shown, the heating system 600 can include an outer housing 604 and a folded heating element 610 generally contained therein. In the depicted embodiment, the folded heating element 610 is arranged such that one or more of the bends 612 extend further (e.g., vertically as illustrated) than one or more other bends 616. In this manner, only select portions of the heating element 610 are sized, shaped and otherwise configured to contact the housing 604. Accordingly, an air gap can be advantageously provided between the remaining or shorter bends and the housing. This type of configuration can reduce the incidence of heat spots by allowing fluid flow through additional portions of the heating element 610 (e.g., on both vertical sides of the shorter folds 616 of the heating element 610). In addition, such a configuration can facilitate securement of the heating element 610 relative to the housing 604. For example, the longer bends 612 can be sized and otherwise designed to contact an inner portion of the housing 604 to prevent the heating element 610 from moving when in use.

Figure 24A:
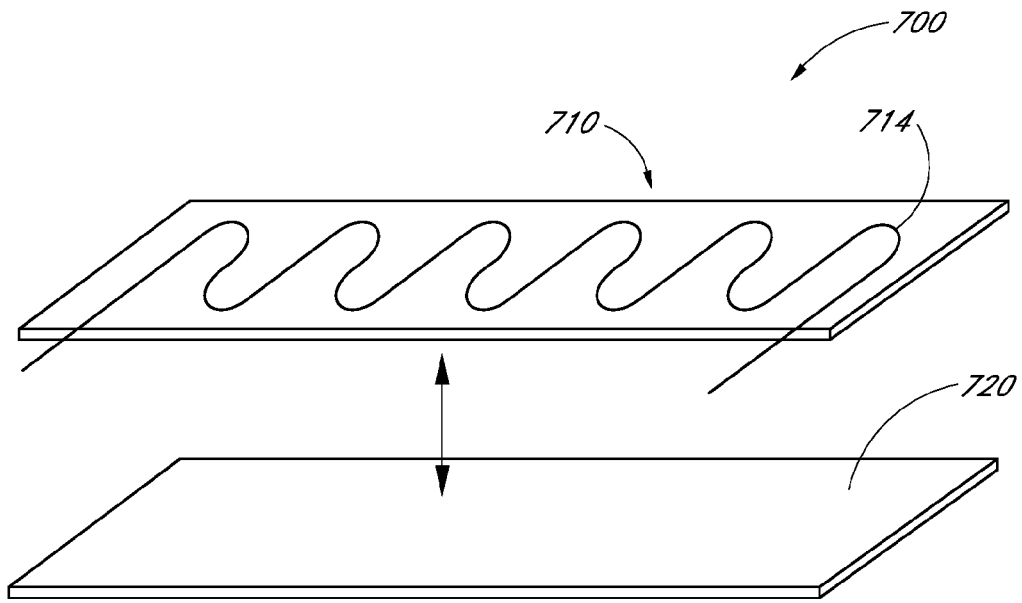
FIG. 24A illustrates an exploded view of a heating element according to one embodiment.
Figure 24B:
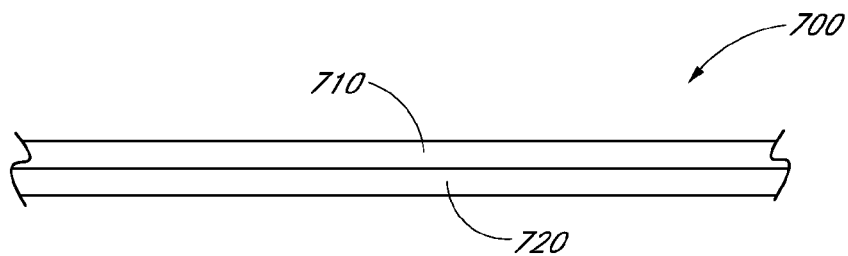
FIG. 24B illustrates a side view of the heating element of FIG. 24A.

FIGS. 24A and 24B illustrate another embodiment of a heating element 700 configured to be folded as described herein. In this embodiment, the body 710 of the heating element comprises a resistive material or component 714. The body 710 of the heating element 700 can be attached to a backing member 720 by adhesives, a binding layer or any other attachment method or device. In some embodiments, the backing member 720 includes a metal, such as, for example, aluminum, copper, steel, another thin metal and/or the like. Further, according to some arrangements, a pressure sensitive adhesive is used to secure the body 710 to the backing member 720. In other embodiments, however, the type of the backing member 720 and/or adhesive can vary. In other embodiments, the resistive or conductive material comprises a carbon-filled binder layer, carbon positioned on top of a binder, conductive plastics and/or the like.

In a modified embodiment, the backing member 720, the body 710 and other portions of the heating assembly 700 are laminated to form a generally uniform structure. For example, an overall lamination can comprise an electrically insulating film (e.g., a polyimide layer or film, such as, for example, Kapton®), heater material (e.g., resistance materials, such as, for example, copper, nickel-chromium, other metals or alloys, etc.), insulating film, a metal backer, another electrically insulating film and/or any other component. In other embodiments, the resistive or conductive material comprises a carbon-filled binder layer, carbon positioned on top of a binder, conductive plastics and/or the like. Such a combination can then be folded or otherwise shaped as described herein.

Figure 25A:
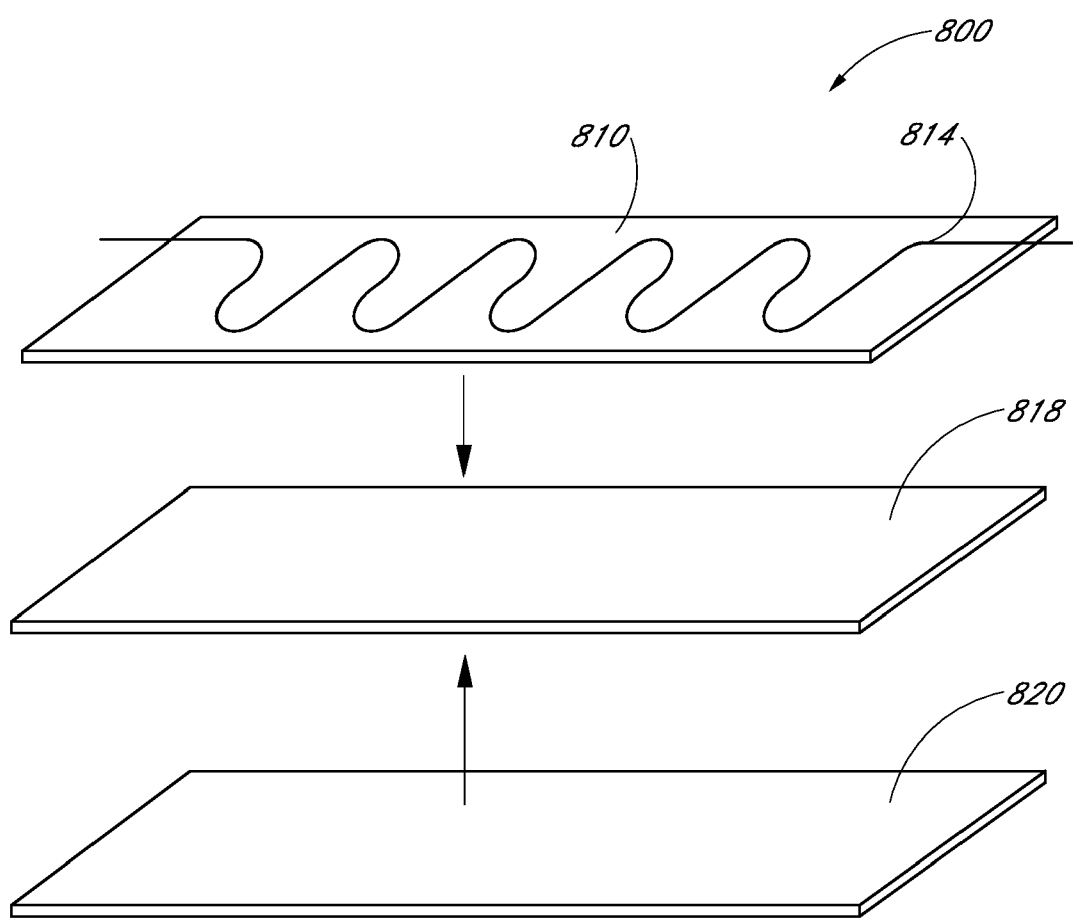
FIG. 25A illustrates an exploded view of a heating element according to another embodiment.
Figure 25B:
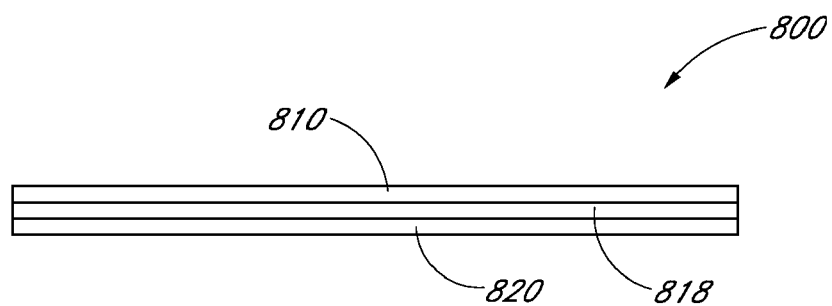
FIG. 25B illustrates a side view of the heating element of FIG. 25A.

FIGS. 25A and 25B illustrate another embodiment of a folded heating assembly 800 which is similar to the one depicted in FIGS. 24A and 24B and discussed herein. As shown, a heating element 800 can include a backing member 820 that is attached to a body 810 having a carrier material (e.g., Kapton®, another polyimide layer or film, etc.) and a resistance material (copper, nickel-chromium, etc.). In the illustrated embodiment, a separate adhesive layer, such as, for example, a pressure-sensitive adhesive, can be used to secure the backing member 820 to the body 810, either in lieu of or in addition to one or more other adhesives or other attachment methods or devices.

Figure 26A:
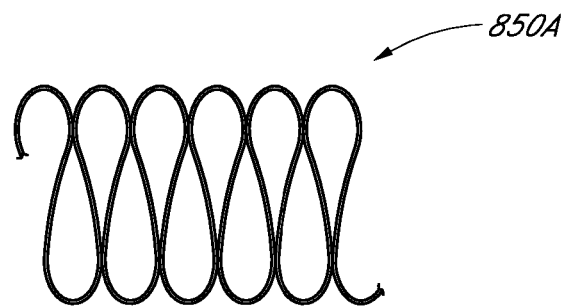
FIG. 26A schematically illustrates one embodiment of a folded heating element.
Figure 26B:
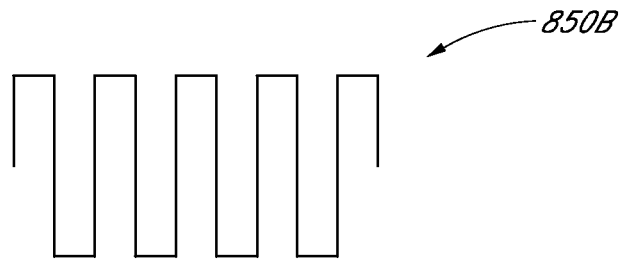
FIG. 26B schematically illustrates another embodiment of a folded heating element.

As discussed, providing a thin metal sheet or other backing member to the heating element can provide certain benefits. For instance, when folded, the backing member can help maintain the formed shape of the heating element. In addition, the backing member can enhance the structural characteristics of the heating element. For example, FIG. 26A illustrates one embodiment of a folded heating element 850A that does not comprise a thin metal sheet or similar backing member. As shown, the heating element 850A may not be capable of maintaining a required or desired folded shape on its own. In contrast, the folded heating element 850B schematically illustrated in FIG. 26B comprises a thin metal sheet or other backing member to help it maintain the desired formed shape.

As discussed, a metal sheet or other backing member can be applied to any of the embodiments of folded heating elements discussed and/or illustrated herein. According to some embodiments, such backing members comprise aluminum, steel, copper, other metals or alloys, combinations thereof and/or the like. Further, the thickness of the backing member can vary as desired or required by a particular application or use. In some arrangements, the thickness of the backing member can be between 0.05 to 0.5 mm. However, in other embodiments, the thickness of the backing member can be less than 0.05 mm and/or greater than 0.5 mm. In other embodiments, a heating element need not be attached to a metal sheet or other backing member at all. In other embodiments, the resistive or conductive material comprises a carbon-filled binder layer, carbon positioned on top of a binder, conductive plastics and/or the like.

Figure 27A:
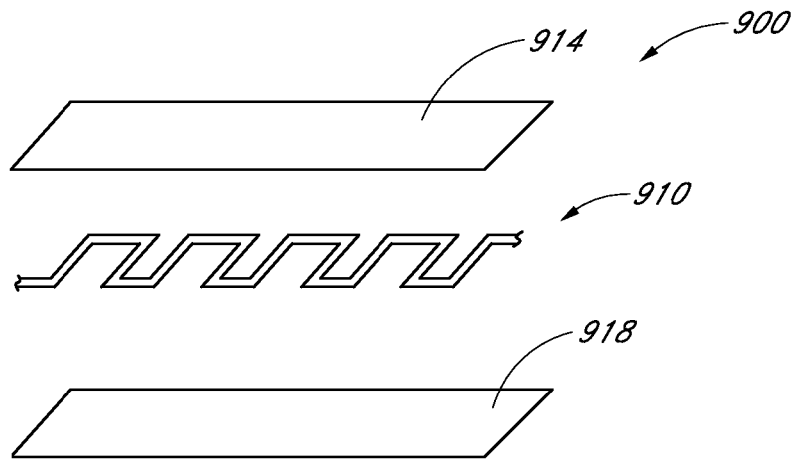
FIG. 27A illustrates an exploded view of a heating element according to one embodiment.
Figure 27B:
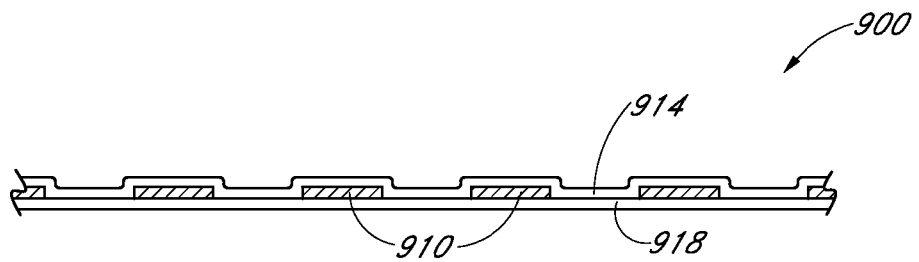
FIG. 27B illustrates a cross-sectional view of the heating element of FIG. 27A.

FIGS. 27A and 27B illustrate another embodiment of a heating element 900 that is configured to be folded as described herein. As depicted, the heating element 900 can comprise an electrical resistance material 910 (e.g., copper) or other heater element that is generally positioned between two adjacent layers 914, 918 of a carrier material (e.g., Kapton®, another polyimide layer or film, etc.). With continued reference to the cross-sectional view of FIG. 27B, such a heating element 900 can be configured to form a unitary structure (e.g., the layers 914, 918 of carrier material can be bonded to each other using heat bonding, adhesives, other attachment methods, substances or devices, etc.). Consequently, such a heating element 900 can be attached to one or more metal sheets or other backing members to enhance the structural integrity of the heating element 900.

Figure 28A:
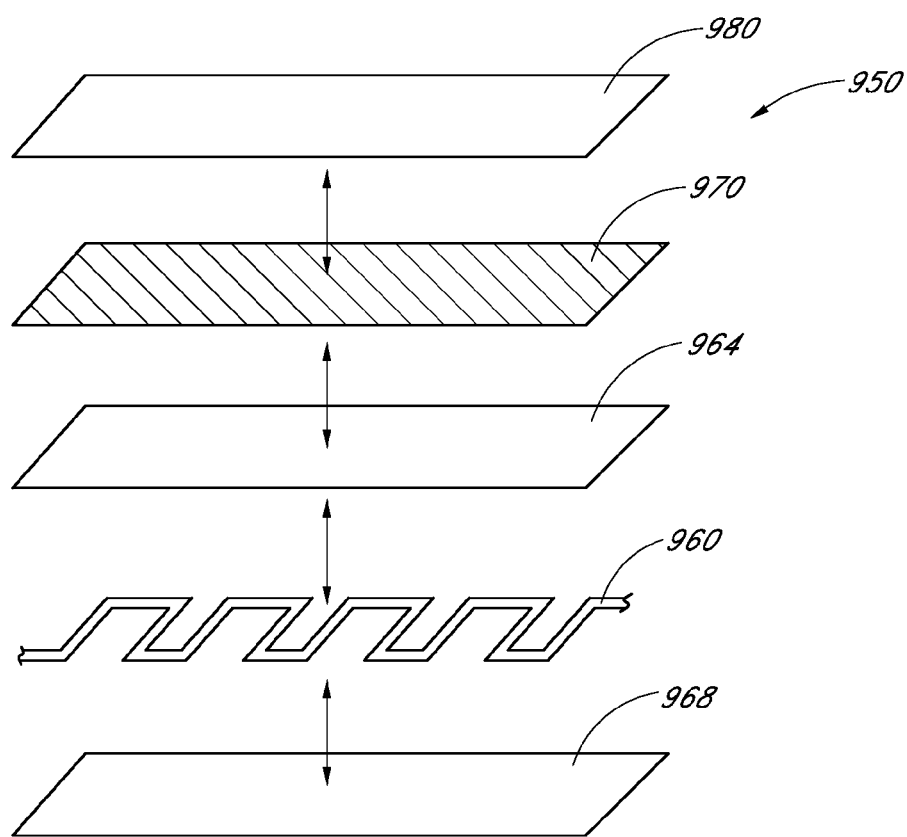
FIG. 28A illustrates an exploded view of a heating element according to another embodiment.
Figure 28B:
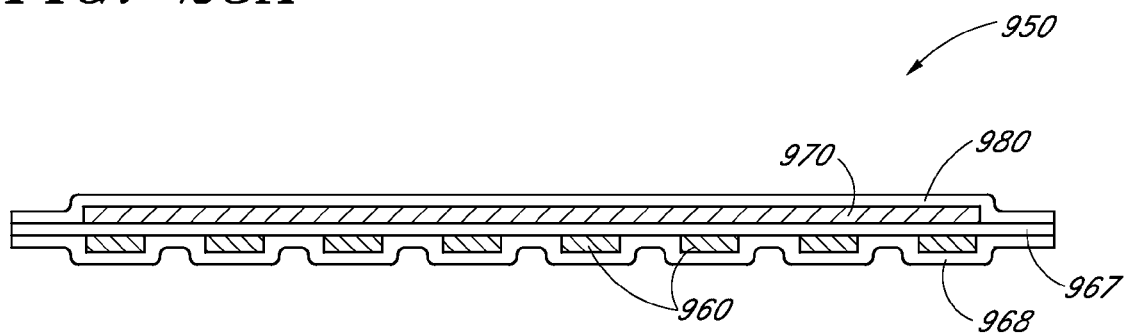
FIG. 28B illustrates a cross-sectional view of the heating element of FIG. 28A.

FIGS. 28A and 28B illustrate an embodiment of a heating element 950 similar to the one depicted and discussed herein with reference to FIGS. 27A and 27B. As shown in the exploded view of FIG. 28A, the heating element 950 can comprise a resistance member 960 generally positioned between adjacent layers 964, 968 of a carrier material. In addition, as discussed herein, the heating element 950 comprises a backing member 970 (e.g., thin metal sheet). In some embodiments, the backing member 970 forms a unitary structure with the resistance member 960 and the layers 964, 968 of carrier material using one or more additional layers 980 (e.g., another layer of Kapton®, polyimide layer or film or the like). The heating element 950 or variations thereof, can be folded into a desired shape in accordance with any of the embodiments disclosed herein.

Figure 28C:
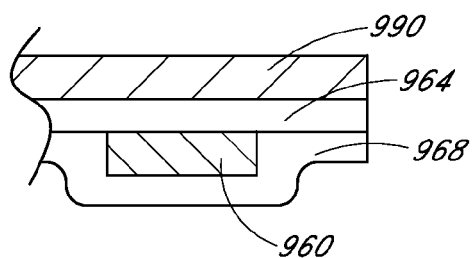
FIG. 28C illustrates a detailed view of a portion of the heating element in FIG. 28B.

In alternative embodiments, a metal sheet or other backing member can be attached to a heating element without the use of adhesives, adhesive layers and/or other types of materials or layers. For example, one or more of the layers of carrier material discussed herein can be adapted to adhere to one or more backing members without the use of separate bonding materials (e.g., adhesives) or layers (e.g., pressure sensitive adhesive). For example, as shown in the cross-sectional view of FIG. 28C, a backing member 990 can be joined directly to an adjacent layer 964 of carrier material (Kapton®, another polyimide layer or film, etc.). In other embodiments, a heating element can include additional backing members and/or other components, as desired or required. As discussed, in some arrangements, two or more layers or components of a heating element can be joined to one another using adhesives, thermal bonding, mechanical fasteners and/or any other type of attachment method or device, either alone or in combination with another method or device. Regardless of the exact configuration, assembly, design details and the like, such heating elements can be relatively simple and inexpensive.

Figure 48A:
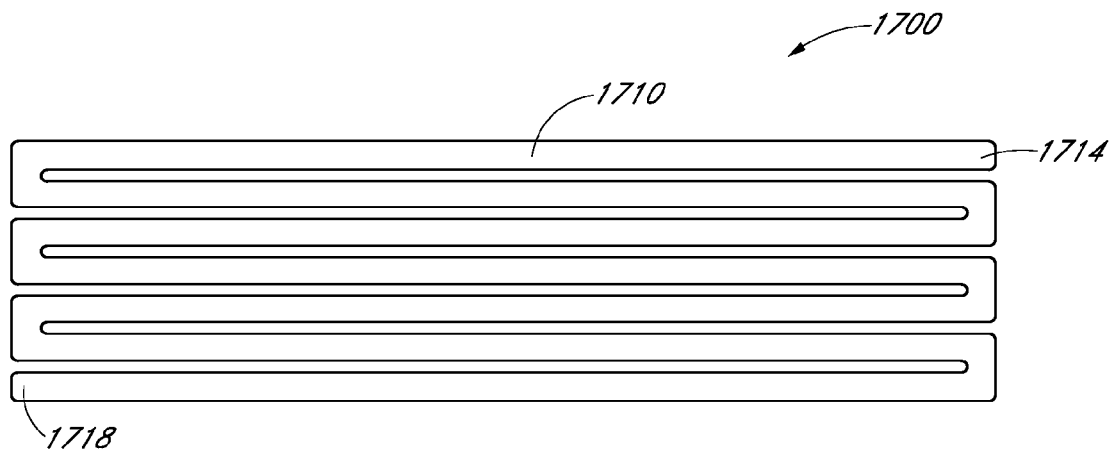
FIG. 48A illustrates a top view of a heating element according to another embodiment.
Figure 48B:
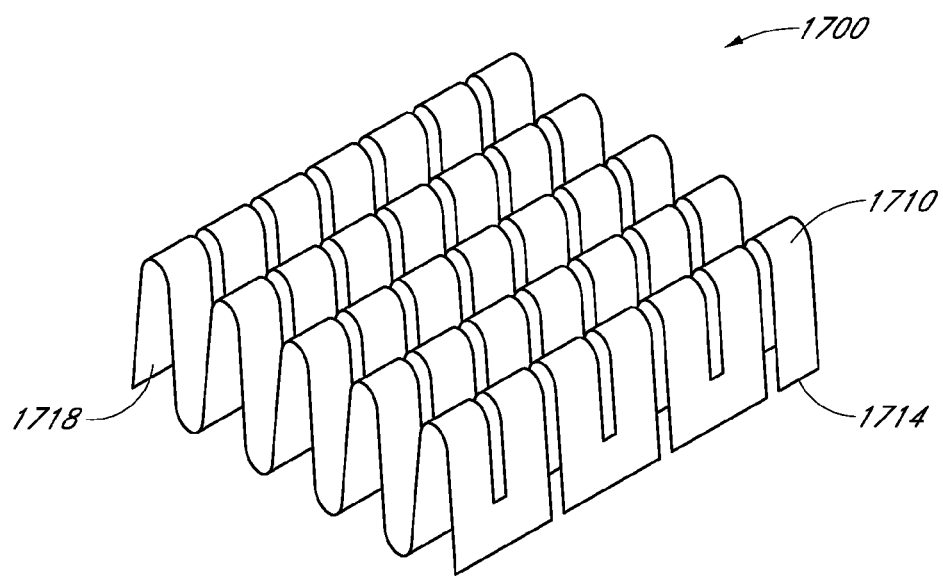
FIG. 48B illustrates a perspective view of the heating element of FIG. 48A in a generally folded orientation.

In yet other embodiments, as illustrated, for example, in FIGS. 48A and 48B, a heater element does not include a backing member, a laminate, an electrically insulating film and/or the like. In such arrangements, a heating element is simply folded or otherwise formed into a desired shape. Alternatively, the heating element can include one or more other components or features as desired or required by a particular application or use.

Figure 29A:
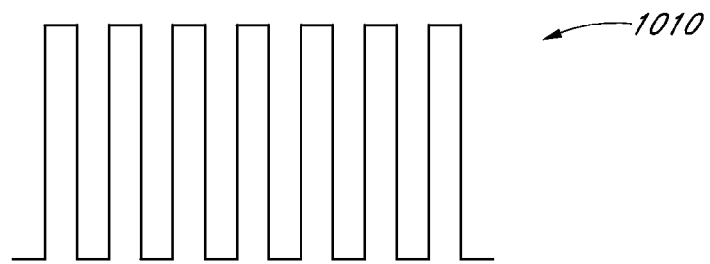
FIG. 29A illustrates one embodiment of a folded heating element.
Figure 29B:
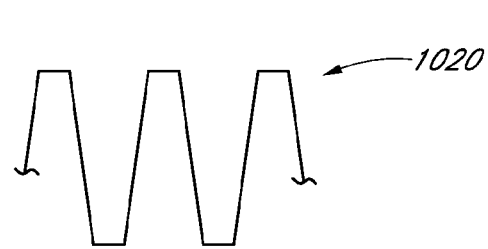
FIG. 29B illustrates a different embodiment of a folded heating element.
Figure 29C:
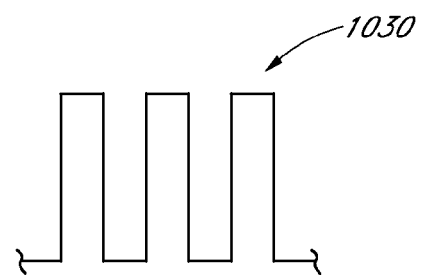
FIG. 29C illustrates another embodiment of a folded heating element.
Figure 30A:
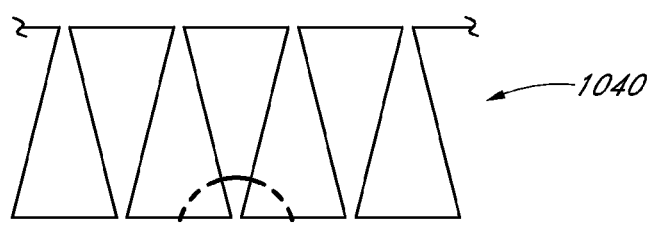
FIG. 30A illustrates yet another embodiment of a folded heating element.

In the embodiment illustrated in FIG. 29A, the depicted heating element 1010 is folded into a generally "square" or "rectangular" configuration with substantially flat ends and sharp bends (e.g., 90°). Such arrangements can be helpful in controlling the spacing between the fins created by the folded arrangement. As shown in FIGS. 29B and 30A, the configuration of FIG. 29A can be modified by either compressing or expanding the heating elements to change the angle between adjacent fins. For example, in FIG. 29B, the spacing between adjacent folds in the heating element 1020 has been increased.

Figure 30B:
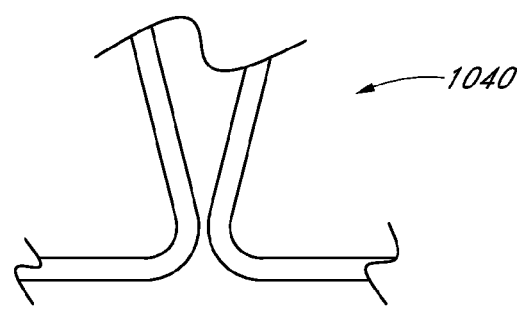
FIG. 30B illustrates a detailed view of a portion of the heating element in FIG. 30A.
Figure 31:
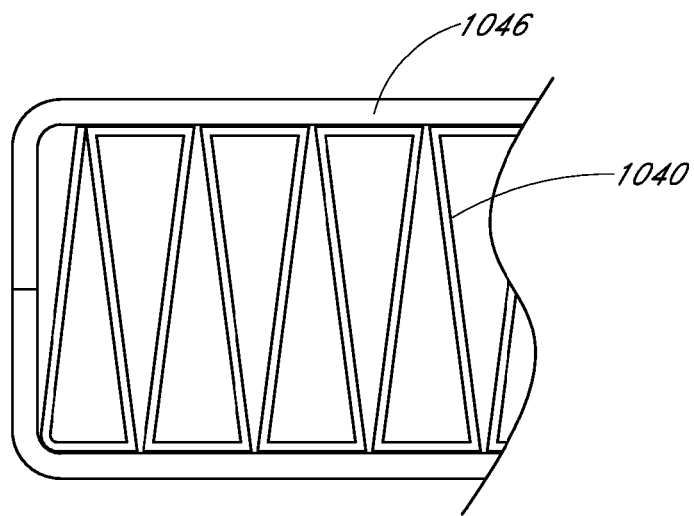
FIG. 31 illustrates one embodiment of a heating element positioned within a housing.

Alternatively, in FIG. 30A, the spacing between adjacent folds has been decreased. In other embodiments, adjacent folds of the heating element can have a different configuration than illustrated or discussed herein. In FIG. 31, a folded heating element 1040 like the one illustrated in FIGS. 30A and 30B is generally positioned within a housing 1046. With continued reference to FIGS. 30A, 30B and 31, if adjacent folds contact or are in close proximity to each other, the incidence of localized hot spots within the heating system can increase. As discussed, this can negatively affect the performance of the heating elements.

Figure 32A:
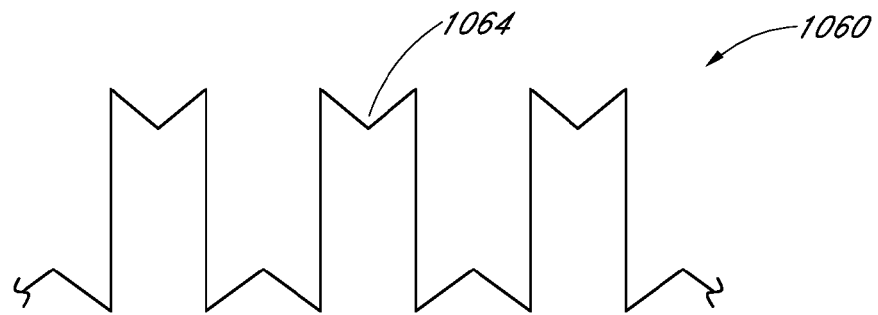
FIG. 32A illustrates a folded heating element according to one embodiment.
Figure 32B:
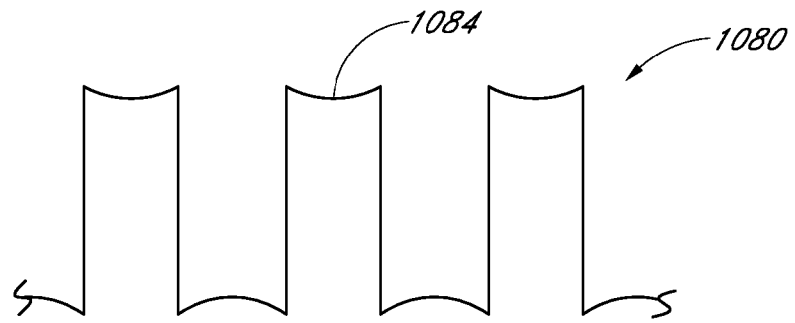
FIG. 32B illustrates a folded heating element according to another embodiment.

Accordingly, FIGS. 32A and 32B illustrate embodiments of heating elements 1060, 1080 in which the ends of the folded portions do not include generally flat portions. In FIG. 32A, the heating element 1060 comprises ends that have been bend inwardly to create a V shape 1064. Likewise, in FIG. 32B, the ends 1084 of the heating element 1080 have a generally concave shape. In other embodiments, the ends of a heating element can be different than illustrated herein. In embodiments like FIGS. 32A and 32B where the ends of the heating element 1060, 1080 are not substantially flat, air or other fluid can be permitted to more easily pass between the ends 1064, 1084 and an adjacent housing wall (not shown). The shape, size, distance from an adjacent housing wall and/or other details of the folded heating element can be varied as desired or required by a particular application or use.

Figure 33A:
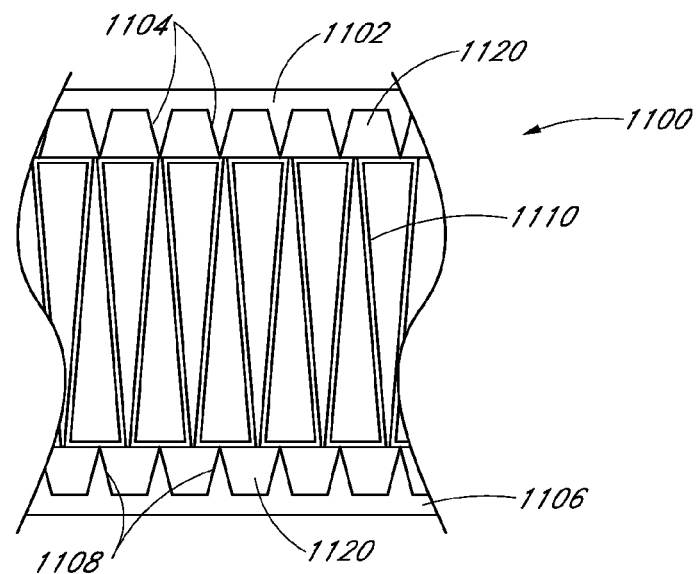
FIG. 33A illustrates a partial side view of a folded heating element within a housing according to one embodiment.
Figure 33B:
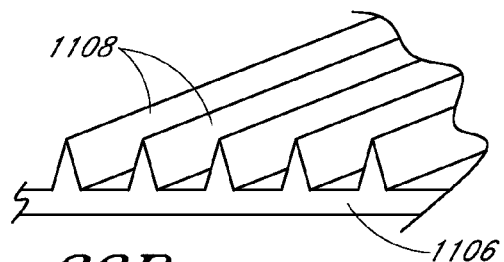
FIG. 33B illustrates a perspective view of the housing wall of FIG. 33A.

Similarly, FIGS. 33A and 33B illustrate an embodiment in which the inner surfaces of the housing wall 1102, 1106 include ridges or recesses 1104, 1108. As shown, such ridges or recesses 1104, 1108 can help create air gaps 1120 between the housing wall 1102, 1006 and the surfaces of the folded heating element 1110. In the illustrated embodiment, the ridges 1104, 1108 comprise spikes or generally pointy members so as to reduce the contact between the ridges 1104, 1108 and the adjacent portions of the heating element 1110. However, in other embodiments, the shape, size, contact area with the heating element and other details of the ridges or recesses 1104, 1108 can vary. For example, in some embodiments, the ridges or recesses 1104, 1108 can have a flatter portion (e.g., frusto-conical shape) so that the contact area between the ridges or recesses 1104, 1108 and housing wall 1102, 1006 is generally increased. The ridges or recesses 1104, 1108 can be formed as a unitary member with the housing wall 1102, 1106. Alternatively, the ridges or recesses 1104, 1108 can be separate members that are subsequently secured to the corresponding portions of the housing wall 1102, 1006.

Figures 34A, 34B:
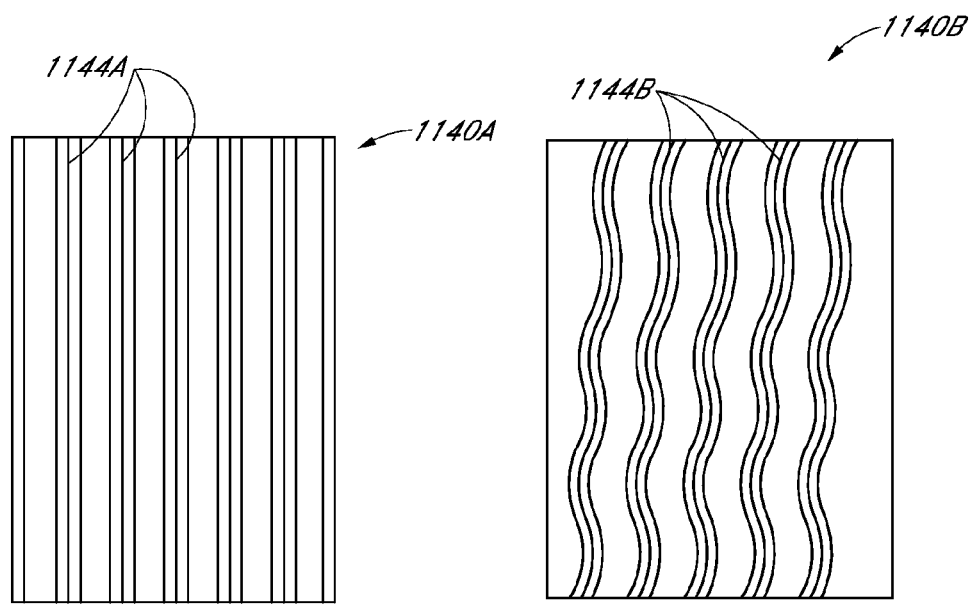
FIG. 34A illustrates a top view of one embodiment of a housing configured to at least partially contain a heating element.
FIG. 34B illustrates a top view of another embodiment of a housing configured to at least partially contain a heating element.

FIGS. 34A and 34B illustrate two embodiments of the inner portion of a housing wall 1140A, 1140B configured to facilitate the creation of air gaps between it and an adjacent folded heating element. In FIG. 34A, the inner portion of a housing wall 1140A includes ridges or recesses 1144A as discussed in relation to FIGS. 33A and 33B. These ridges or recesses 1144A can extend continuously or intermittently along the entire housing. Alternatively, the ridges or recesses 1144A can be included along only selected portions of the housing wall 1140A. In FIG. 34A, the ridges or recesses 1144A are generally straight. However, as illustrated in FIG. 34B, the ridges or recesses 1144B can be non-linear (e.g., wavy, irregular, etc.). In other embodiments, the shape, orientation, pattern relative to a housing surface and/or other details regarding the ridges or recesses can vary.

Embodiments of the housing wall like the one illustrated in FIG. 34B can provide certain advantages over housing walls that have generally straight ridges or recesses. For example, the wavy or curved ridges or recesses 1144B can help ensure that a ridge or recess 1144B does not fall between adjacent folds of a heating element 1140B. This is the case because each end of the folded heating element 1140B is likely to contact at least one ridge or recess 1144B along the depth of that particular fold.

Figure 35:
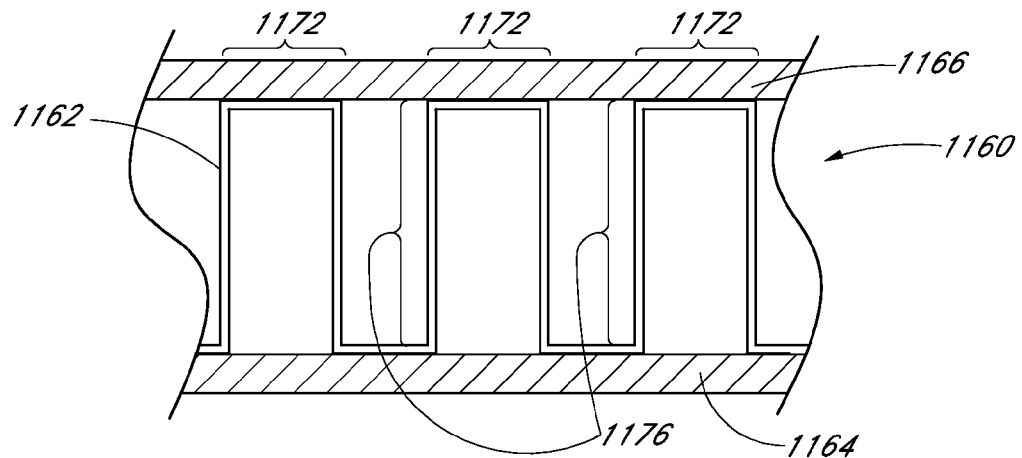
FIG. 35 illustrates a cross-sectional view of a heating system comprising a heating element and a blower according to one embodiment.

FIG. 35 illustrates an embodiment of a heating assembly 1160 that is configured to include a heating element 1162 having portions of varying electrical resistance. In FIG. 35, the portions 1172 of the heating element 1162 that are in contact or close to the housing walls 1164, 1666 can be advantageously configured to comprise a lower electrical resistance than the portions 1176 that generally extend between the housing walls 1164, 1166. Thus, the heat generated at or near the housing walls 1164, 1166 can be reduced when electrical current is supplied to the folded heating element 1162. Accordingly, the main portions 1176 (e.g., the vertical segments as illustrated in FIG. 35) of the heating element 1162 can be configured to produce more thermal energy than the end portions 1172.

With continued reference to FIG. 35, according to some embodiments, the electrical resistance or heat generating capability of the main portions 1176 of the heating assembly 1162 can be approximately two times that of the end portions 1172. In other embodiments, however, the electrical resistance or heat generating capability of the main portions 1176 can be greater or less than two times that of the end portions 1172 and/or any other portion, as desired or required by a particular application.

Figure 36A:
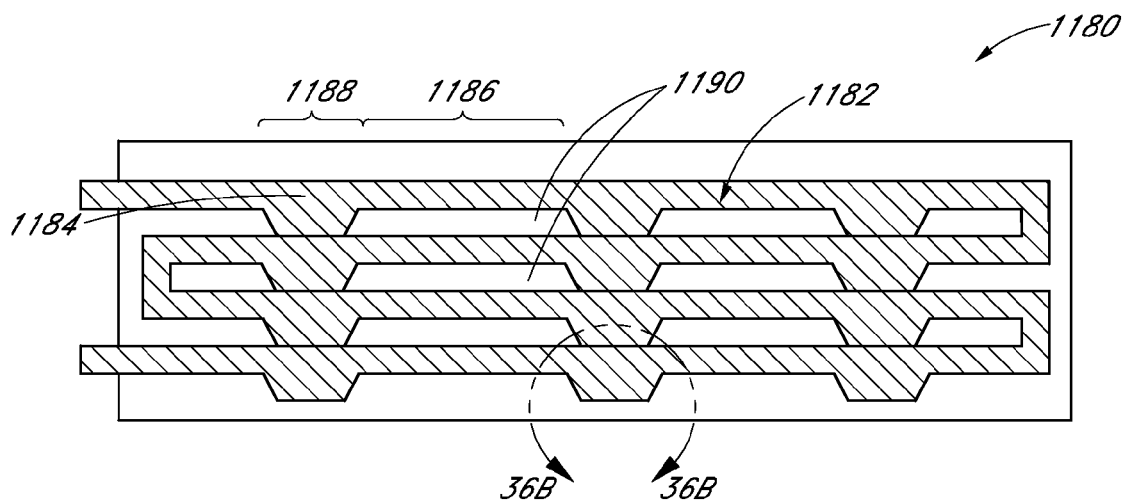
FIG. 36A illustrates a side view of one embodiment of a heating element.
Figure 36B:
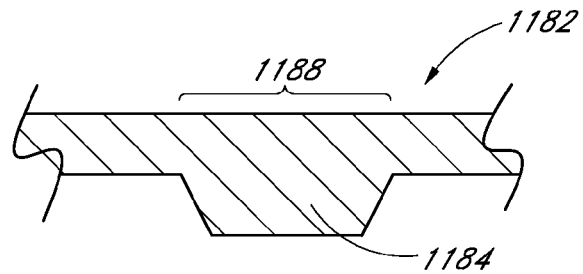
FIG. 36B illustrates a detailed view of the heating element of FIG. 36A.

FIG. 36A illustrates another embodiment of a heating system 1180 having a heating element 1182 of varying electrical resistance. In the illustrated embodiment, the heating element 1182 includes a plurality of protrusions 1184 that help maintain a desired spacing between adjacent folds. As discussed with reference to other embodiments herein, the shape, size, spacing, location and/or other properties of the protrusions 1184 can vary as desired or required.

With continued reference to FIG. 36A, the sections 1188 of the heating element 1182 having the protrusions 1184 or other spacing members can have a lower electrical resistance than the adjacent sections 1186 of the heating elements. Consequently, less heat can be generated along the sections 1188 comprising the protrusions 1184 or other separation members when electrical current is delivered to the heating element 1182. As discussed herein with respect to FIG. 35, less thermal energy generation is desired at or near the protrusions 1184 because of the reduced air or fluid flow occurring at those locations. Instead, more of the electrical energy is converted to heat along the sections 1186 of the heating element 1182 located between the protrusions 1184 or other separation members. Thus, air or other fluid passing through the gaps 1190 located between these sections 1186 of the heating element 1182 can be advantageously heated. The electrical resistance along one or more sections of the heating elements disclosed herein can be adjusted using one or more methods. For example, the types of materials can be varied, the thickness or other physical or chemical properties of the heating element can be varied, the path through which electrical current can be modified and/or the like.

Figure 37A:
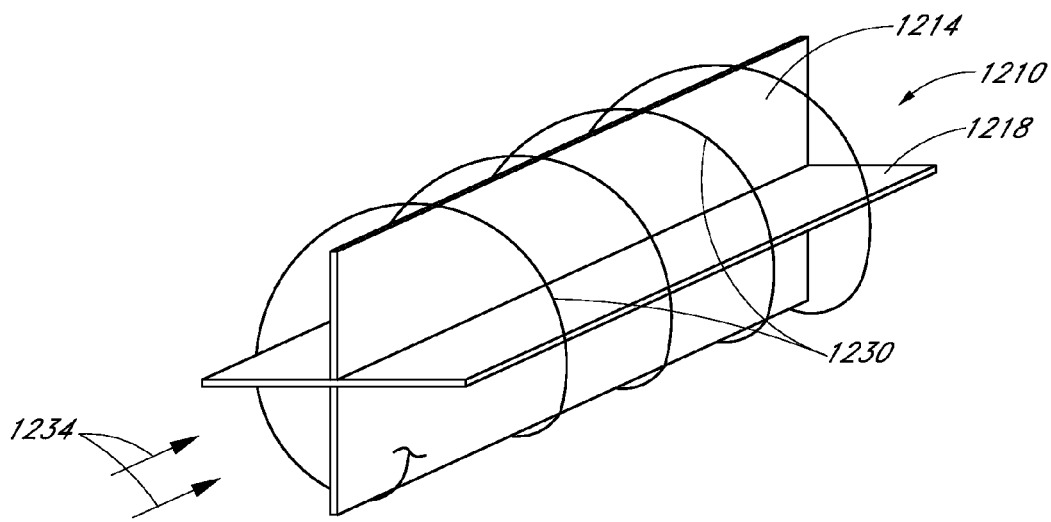
FIG. 37A illustrates a perspective view of one embodiment of a heating system comprising a resistance wire.
Figure 37B:
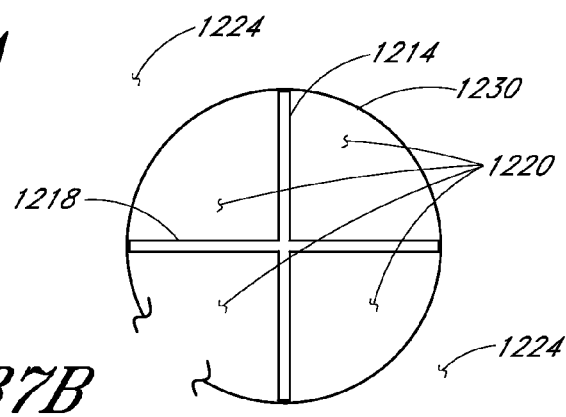
FIG. 37B illustrates a cross-sectional view of the heating system of FIG. 37A.
Figure 37C:
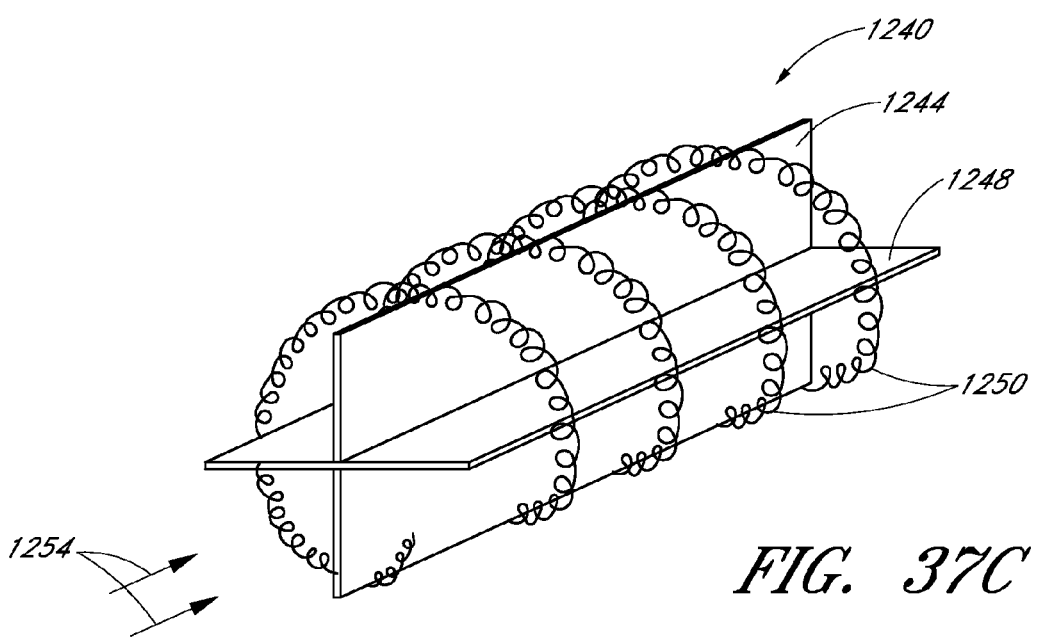
FIG. 37C illustrates a perspective view of another embodiment of a heating system comprising a resistance wire.

FIGS. 37A-37C illustrate additional embodiments of systems 1210, 1240 configured to heat a volume of air or other fluid. In FIG. 37A, two support members 1214, 1218 are secured to each other so as to generally form an "X" or cross shape. In some embodiments, the support members 1214 are separate items that are joined to each other using one or more attachment methods or devices, such as, for example, fasteners, adhesives or the like. Alternatively, the support members can comprise a unitary structure. In other embodiments, the support members 1214, 1218 can include a different shape, size or configuration. In addition, more or fewer support members can be included in a particular heating system. According to some embodiments, the support members 1214, 1218 comprise mica and/or other materials which are relatively poor electrical conductors.

With continued reference to FIG. 37A, a resistance wire 1230 can be wrapped around the outside of the support members 1214, 1218. The wire 1230 can be secured to the support members 1214, 1218 using one or more methods or devices, such as, for example, adhesives, clips, slots, other fasteners and/or the like. As discussed with respect to other embodiments, the resistance wire 1230 can include copper, nickel-chromium and/or the like. The size, thickness (e.g., gauge), alignment relative to the support members, material of construction and/or other properties of the wire 1230 can vary as desired or required by a particular application or use. As electrical current is supplied through the resistance wire 1230, electrical energy is converted to thermal energy. Consequently, air or other fluid passing in the vicinity of the wire 1230 can be advantageously heated. For example, in some embodiments, the heating system 1210 can be configured so that air or other fluid flows in a direction generally represented by arrows 1234. As illustrated in the cross-sectional view of FIG. 37B, heat transfer to the air or other fluid can occur in areas 1220 defined within the boundary of the resistance wire 1230 and/or in areas 1224 outside of the boundary of the wire 1230. An exterior housing (not shown) or similar enclosure can be positioned around any of the various embodiments disclosed herein. For example, a housing can be placed around the heating systems 1210, 1240 illustrated in FIGS. 37A and 37C. Such a housing or other enclosure can help direct the air or other fluid through a specific path and deliver it to a desired location.

FIG. 37C illustrates a variation of the embodiment depicted in FIG. 37A. Specifically, the resistance wire 1250 in the illustrated arrangement is generally coiled. The coiled shape can advantageously increase the effective surface area of the wire 1250, thereby improving heat transfer to the air or other fluid passing in the vicinity of the heating system 1240. In other embodiments, a resistance wire of a different type, shape, size, configuration or the like can be generally wrapped around one or more support members. For example, a resistance wire 1230, 1250, such as the one illustrated in FIGS. 37A and 37C, can be used in lieu of or in addition to a resistance wire that is attached to a carrier material (e.g., Kapton®, another polyimide layer or film, etc.) as described and illustrated in relation to other embodiments disclosed herein.

Figure 38:
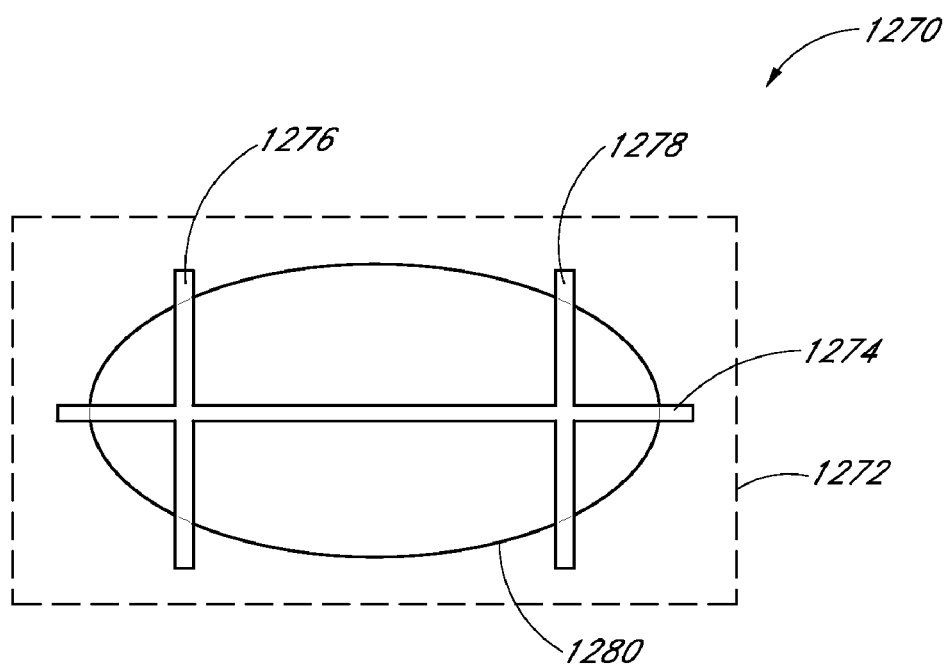
FIG. 38 illustrates a cross-sectional view of one embodiment of a heating system comprising a resistance wire.

FIG. 38 illustrates a cross-sectional view of another embodiment of a heating system 1270. As shown, the heating system 1270 can include an outer housing 1272 that generally encloses one or more support members 1274, 1276, 1278 and one or more resistance wires 1280. The depicted embodiment comprises two vertical support members 1276, 1278 and a horizontal support member 1274. The support members 1276, 1278, 1274 can comprise separate components that are joined to each other using one or more attachment methods or devices. In other embodiments, the support members 1276, 1278, 1274 are part of a unitary structure. The support members can comprise mica and/or any other material.

With continued reference to FIG. 38, the heating system 1270 can include a resistance wire 1280 that is generally positioned around the support structure. As shown in the embodiments of FIGS. 37A and 37C, the wire 1280 can be wrapped multiple times around the length of the support structure. When electrical current is delivered to the resistance wire 1280, the wire can produce thermal energy, which can be used to heat air or other fluid being conveyed within the housing 1272 of the heating system 1270.

Figure 39:
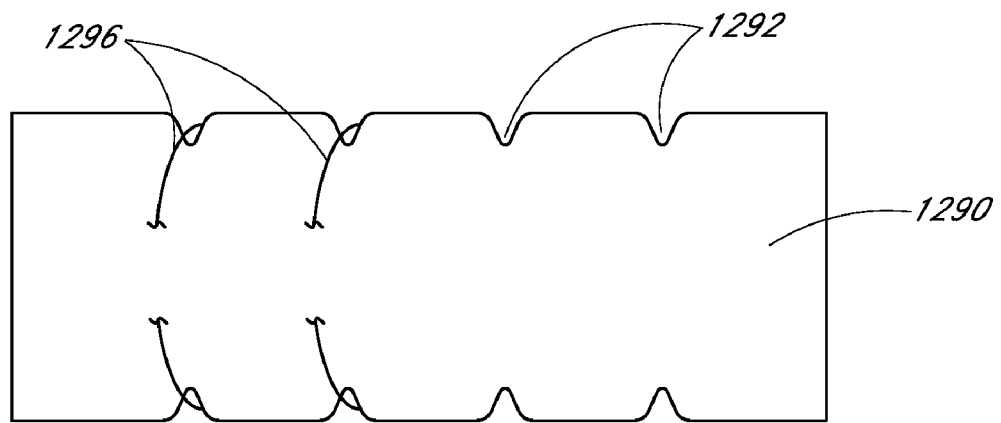
FIG. 39 illustrates one embodiment of a support member for use in a heating system as in FIG. 38.

FIG. 39 illustrates one embodiment of a support member 1290 which is configured to receive a resistance wire 1296 along its upper and lower edges. As illustrated, the support member 1290 can be a generally planar, rectangular member that includes a plurality of notches 1292 or other features along one or more of its edges and/or perimeter surfaces. In other embodiments, the support member 1290 can be non-planar (e.g., curved, fluted, etc.) and/or can include a non-rectangular overall shape (e.g., circular, triangular, irregular, etc.). The notches 1292 or other features can be sized, shaped and otherwise configured to receive and secure a resistance wire 1296. Therefore, the notches 1292 can help ensure that the wire 1296 is not inadvertently moved or otherwise repositioned once placed around a support structure. In some embodiments, the support member 1290 comprises other types of positive or negative features that help receive and secure a wire 1296. For instance, the support member 1290 can include tabs, protrusions, clasps, holes and/or the like. The notches 1292 and/or other features can be spaced and located along the length of the support member 1290 according to the anticipated routing of a resistance wire 1296.

Figure 40:
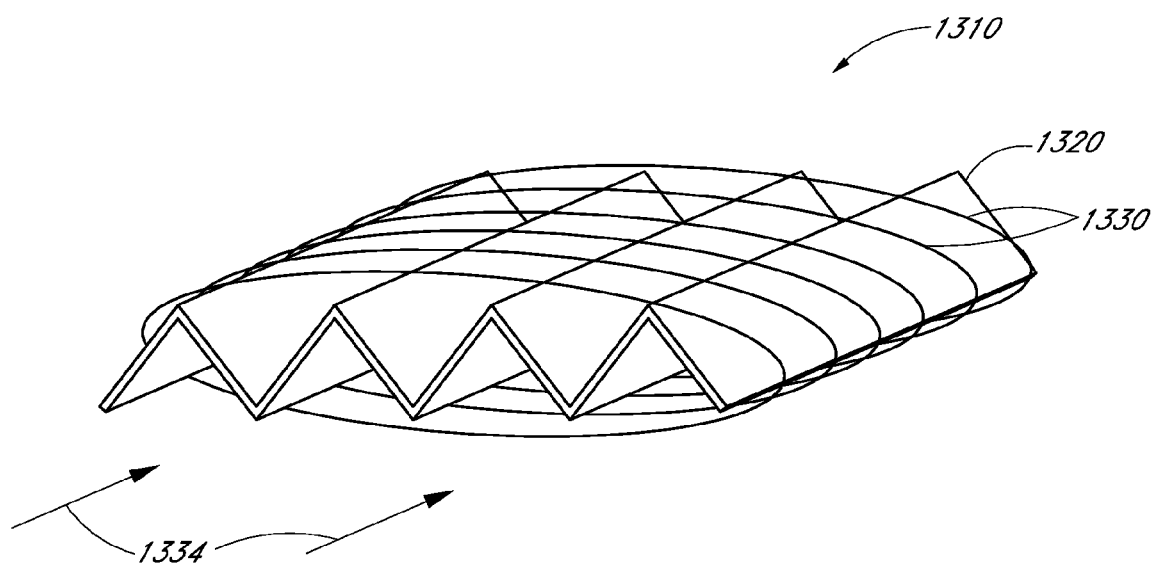
FIG. 40 illustrates a perspective view of yet another embodiment of a heating system comprising a resistance wire.

The embodiment of a heating system 1310 illustrated in FIG. 40 includes a resistance wire 1330 situated around a folded support structure 1320. As with other arrangements disclosed herein, the wire 1330 can be wrapped around the exterior of the support structure 1320 a plurality of times. Air or other fluid directed toward the heating system 1310 (e.g., in a direction generally represented by arrows 1334) can be heated when electrical current is delivered to the resistance wires 1330. As with any of the embodiments disclosed herein, the heating system 1310 can be positioned within a housing (not shown) or other enclosure to provide more efficient heat transfer and to direct the air or other fluid to a desired location.

Figure 41A:
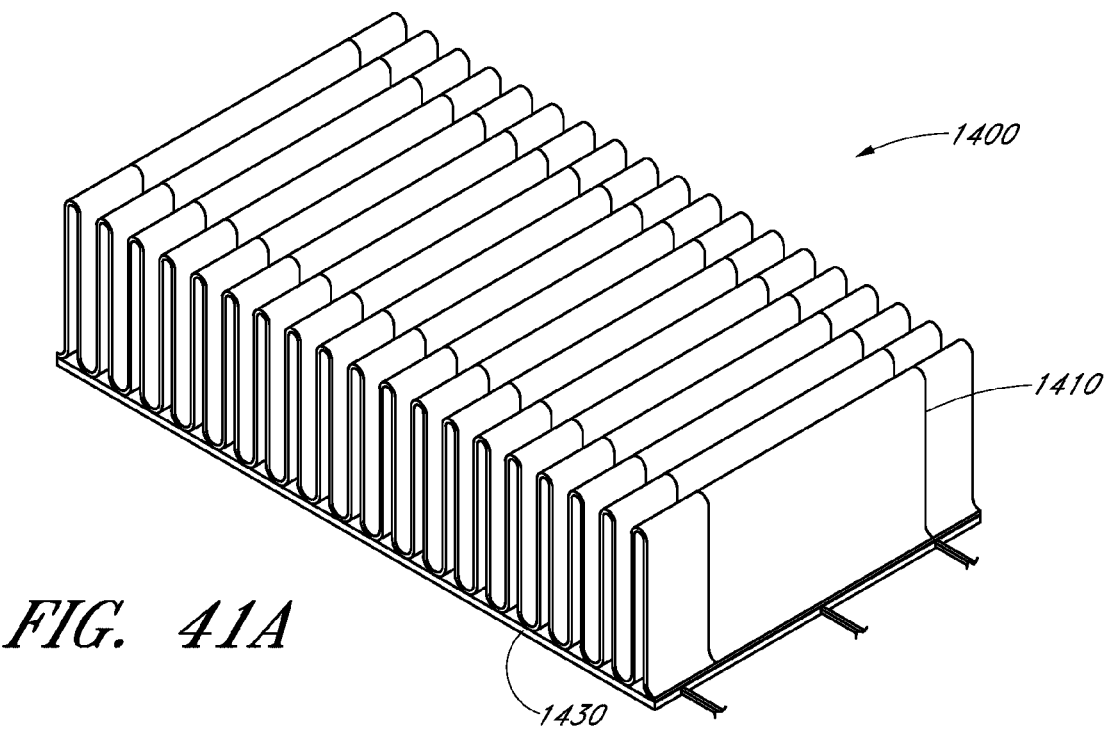
FIG. 41A illustrates a perspective view of a heating system comprising a folded heating element according to one embodiment.
Figure 41B:
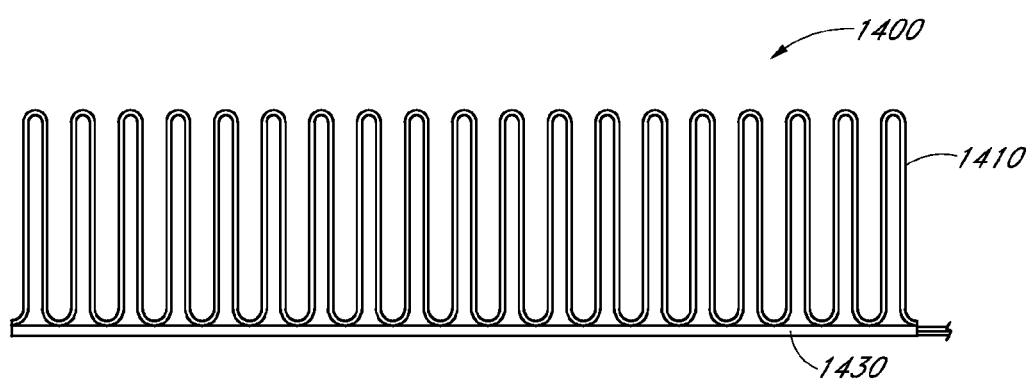
FIG. 41B illustrates a side view of the heating system of FIG. 41A.

Another embodiment of a heating system 1400 is shown in FIGS. 41A and 41B. As illustrated, the heating system 1400 can comprise one or more folded heating elements 1410, a printed circuit board (PCB) 1430 or other base member and/or any other component. The heating element 1410 can be shaped into a desired shape using a plurality of folds. As discussed herein, the folds can have generally rounded bends or any other shape. In addition, a desired spacing between adjacent folds of the heating element 1410 can be maintained using separation members (not shown), such as, for example, tabs, protrusions, fingers, etc. Further, the heating element 1410 can comprise a backing material or any other feature or component to enhance its structural characteristics, to ensure that it maintains its shape and/or for any other purpose.

With continued reference to the embodiment of FIGS. 41A and 41B, the heating element 1410 can be folded into a generally rectangular shape. In some embodiments, the generally rectangular shape of the heating element 1410 is approximately 18.6 mm (7.3 inches) high by 52 mm (20.5 inches) long by 28 mm (11.0 inches) wide. However, the dimensions, shape and/or general configuration of the folded heating element can vary as desired or required by a particular application. As shown, the folded heating element 1410 can be secured to a PCB 1430, a base member and/or any other item or component.

As discussed in greater detail herein, in some embodiments, the PCB 1430 is configured to mechanically support and to supply electrical current to the folded heating element through its conductive pathways. In addition, as discussed in greater detail herein, the PCB 1430 or other base member can include a temperature sensor which can help regulate the amount of heat transferred to a volume of air or other fluid directed into the heating system 1400. The heating element 1410 can be secured to a PCB 1430 using one or more attachment methods or devices. For example, as discussed in relation to FIG. 45A herein, the bent portions 1412 of the folded heating element 1410 can be soldered or otherwise fused to the PCB 1430. In other arrangements, as shown in FIGS. 45B and 45C, other types of permanent or temporary attachment methods can be used between the heating element and the PCB, such as, for example, pins, tabs, other fasteners or adhesives and/or the like.

FIGS. 42A-42E illustrate an embodiment of a base member 1430 configured to attach to a folded heating element, such as those disclosed herein or variations thereof. The base member 1430 can comprise a PCB or the like. In some embodiments, the PCB includes one or more electrical buses 1480 or other electrical conductor strips or members that extend at least partially across its surface. In the illustrated embodiment, the PCB comprises two buses 1480 (e.g., foil members comprising copper, nickel-cadmium, other metals, etc.) that are oriented parallel to each other along the length of the PCB. However, in other embodiments, a PCB or other base member comprises more or fewer electrical buses 1480, foils, strips or other conductive members. In addition, the shape, size, type and other properties of the buses 1480 can be varied as desired or required by a particular application.

As illustrated, a voltage can be delivered across the electrical buses 1480 or other conductive strips through corresponding electrical leads or terminals 1484. As described in greater detail herein, these buses 1480 or other members can be used to advantageously deliver an electrical current through at least a portion of a heating element to create heat. Thus, the buses 1480 can serve as surfaces on which corresponding conductive strips of a folded heating element can electrically attach. In one embodiment, one of the electrical buses 1480 is configured to be supplied with a positive voltage while the other bus 1480 serves as the negative or ground.

Figure 42A:
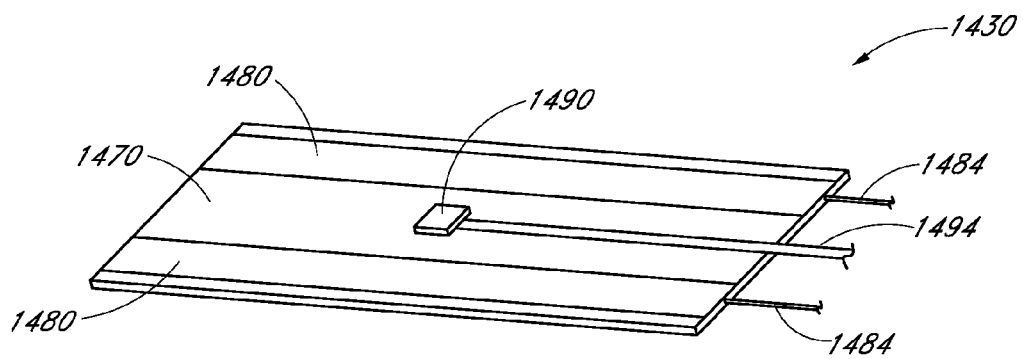
FIG. 42A illustrates a perspective view of a base member for a heating system according to one embodiment.
Figure 42B:
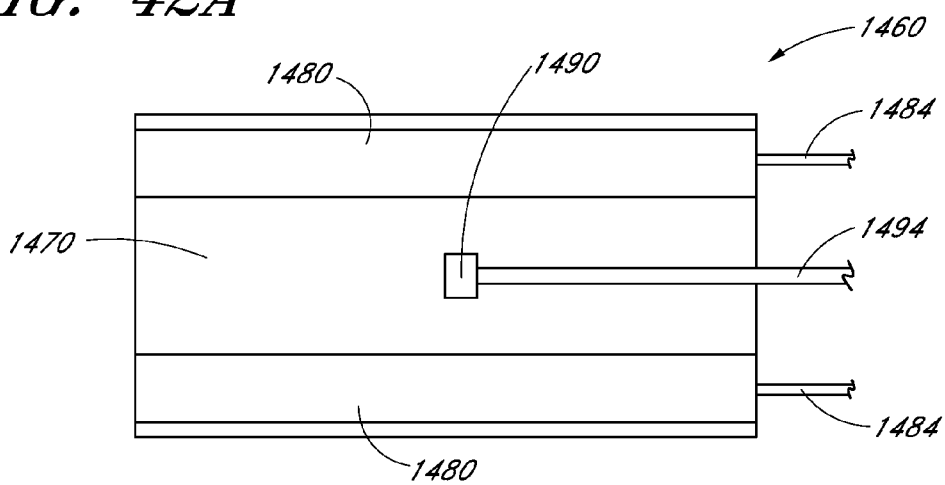
FIG. 42B illustrates a top view of the base member of FIG. 42A.
Figure 42C:
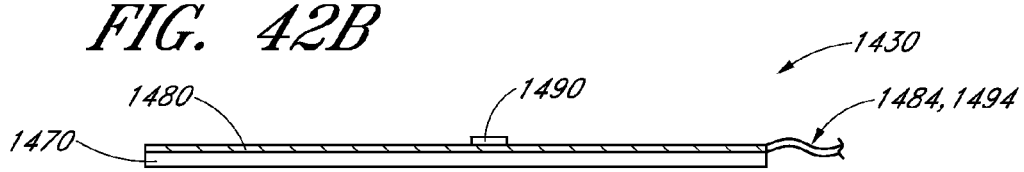
FIG. 42C illustrates a side view of the base member of FIG. 42A.

With continued reference to FIGS. 42A and 42B, the base member 1430 can include a temperature sensor 1490 (e.g., thermistor, thermostat, etc.). The sensor can be configured to detect a temperature within the heating system (e.g., at or near the PCB or other base member, at or near the folded heating element, etc.). The detected temperature can be used by the heating system (e.g., a controller or other control device within or attached to the heating system) to regulate the amount of heat that is produced by the heating element (e.g., the amount of current delivered to the heating element), the base member and/or any other portion of the heating system. The temperature sensor 1490 can be secured to the base member 1430 and/or any other portion of the heating system (e.g., the heating element) using one or more attachment methods or devices, such as, for example, soldering, welding, adhesives, fasteners, snap connections or the like. As with the buses 1480 or other electrically conductive members, the temperate sensor 1490 can be attached to one or more electrical wires or other connections 1494. It will be appreciated that one or more temperature sensors can be used with any of the embodiments disclosed herein.

Figure 42D:
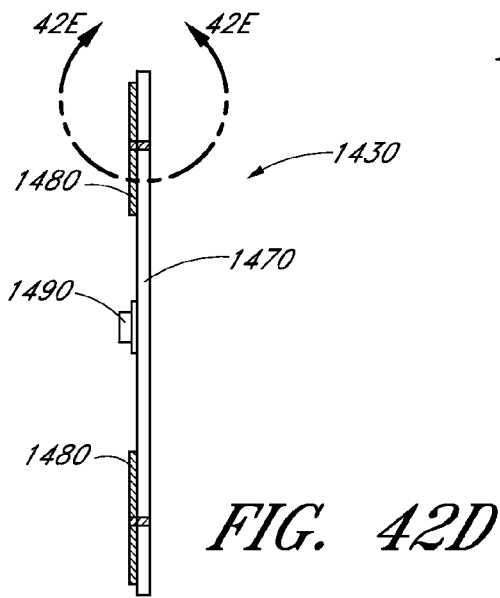
FIG. 42D illustrates a cross-sectional view of the base member of FIG. 42A.
Figure 42E:
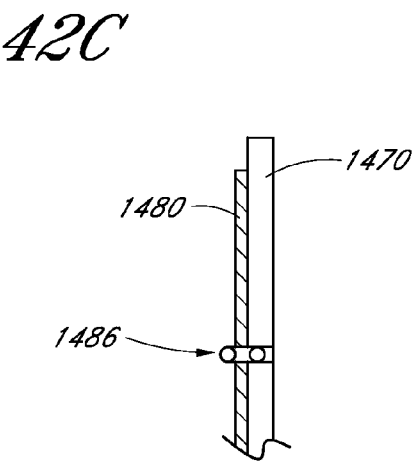
FIG. 42E illustrates a detailed cross-sectional view of the base member of FIG. 42A.

As shown in the cross-sectional views of FIGS. 42D and 42E, the electrical buses 1480 are typically etched directly onto the PCB (e.g., etched copper or other metal directly onto PCB surface). Such etching can be used to secure one or more conductive materials to the surfaces or other portions of any component of a heating element according to any embodiments disclosed herein. However, in other arrangements, buses 1480 or other conductive strips can be secured directly or indirectly to the PCB or any other portion of the base member 1430. For example, the buses 1480 can be attached to the PCB using one or more fasteners. However, in other arrangements, one or more other attachment methods or devices can be used, either in lieu of or in addition to the etching or fasteners. For example, as discussed in greater detail herein, the electrical buses 1480 or other conductive members can be attached to the PCB using adhesive materials, adhesive films or layers (e.g., pressure sensitive adhesive), thermal bonding and/or the like. The buses or other conductive strips etched onto or otherwise secured to a PCB or other base member can be positioned on the top and/or bottom surfaces of such PCB, as desired or required.

According to some embodiments, the electrical buses 1480 of the base member 1430 comprise copper, nickel-cadmium and/or any other conductive metal or material. The location, size (e.g., thickness, width, length, etc.), orientation, spacing and/or any other details regarding the electrical buses 1480 can be customized based on a particular application or use.

Figure 43A:
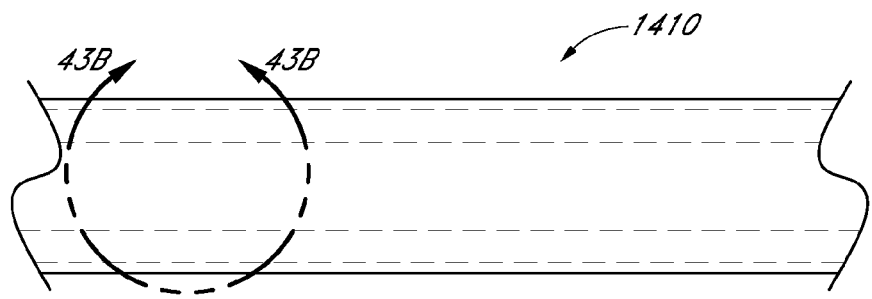
FIG. 43A illustrates an elevation view of a heating element according to one embodiment.

One embodiment of a heating element 1410 before it is folded into a desired shape is illustrated in FIG. 43A. As shown, the heating element 1410 can comprise a carrier member 1420 that includes electrically non-conductive or substantially non-conductive materials (e.g., Kapton®, another polyimide layer or film, etc.). One or more foils or other conductive members 1424 can be secured to the carrier member 1420 using one or more attachment methods or devices. For example, as discussed in greater detail herein, the conductive members 1424 can be secured to the carrier member 1420 using adhesives (e.g., adhesive substances, pressure sensitive adhesives, other types of adhesive films or layers, etc.), thermal bonding and/or the like.

Figure 43B:
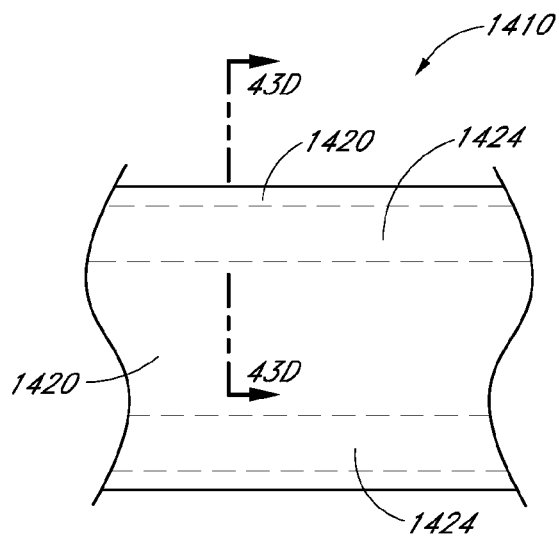
FIG. 43B illustrates a detailed view of the heating element of FIG. 43A.
Figure 43C:
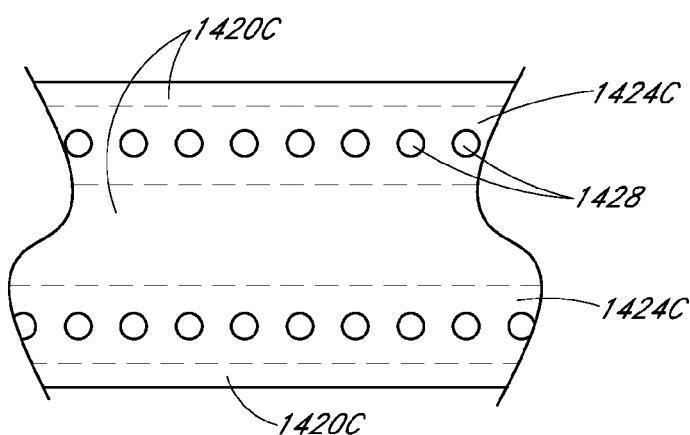
FIG. 43C illustrates a detailed view of a heating element according to another embodiment.

With continued reference to FIGS. 43A-43D, the heating element 1410 can include two foils, strips or other conductive members 1424 (e.g., copper, nickel-cadmium, etc.). As shown, the conductive members 1424 can be situated at or near opposite ends of the carrier member 1420. However, in other embodiments, the quantity, size, shape, orientation and/or other details related to the conductive members 1420 can vary. In some embodiments, as illustrated in FIG. 43C, the carrier member 1420C comprises a plurality of holes 1428, slits or other openings along the location of the underlying conductive members 1424C. As is discussed in greater detail herein, these openings 1428 can advantageously provide access to the conductive members 1424C when electrically connecting them (e.g., using solders, welds, adhesives, etc.) to the electrical buses 1480 of the base member 1430 (FIGS. 42A-42E).

Figure 43D:
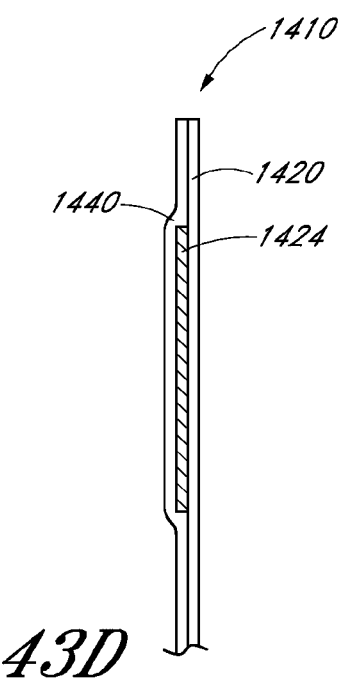
FIG. 43D illustrates a cross-sectional view of the heating element of FIGS. 43A and 43B.

FIG. 43D illustrates a cross-sectional view of the heating element 1410 depicted in FIGS. 43A and 43B. As shown, a conductive member 1424 (e.g., copper or nickel-cadmium strip, foil or other electrical conductor) is generally positioned between a carrier member 1420 (e.g., Kapton®, another polyimide layer or film, etc.) and a conductive layer 1440. In some embodiments, the conductive layer 1440 comprises a carbon-impregnated polymeric material (e.g., HN), carbon-filled binder layer, carbon situated on top of a binder layer, conductive plastics and/or the like. In other arrangements, the carrier member 1420 is configured to be an electrical conductor, either in lieu of or in addition to one or more other layers in contact with the conductive member 1424, such as, for example, the conductive layer 1442. Regardless of its exact configuration, the heating element 1410 preferably includes one or more layers or members capable of conducting an electrical current from one conductive member 1424 to the other conductive member 1424. As current is transmitted across the width or other dimension of the heating element 1410 (e.g., between the conductive members 1424), electrical energy is converted to heat. Thus, in such embodiments, heat can be generated along one or both surfaces of the heating element 1410. As discussed in greater detail herein, the heating element 1410 can be folded so that air or other fluid passed therethrough can be effectively heated.

As discussed herein, one or more other backing members (not shown), layers or the like can be used to further enhance the structural characteristics of the element, to help maintain a desired shape for the folded heating element and/or for any other purpose. In other embodiments, the heating element 1410 comprises fewer or more (e.g., one, two, three, more, etc.) conductive members 1424, non-conductive layers, conductive layers and/or the like.

In some embodiments, one, some or preferably all of the various layers that comprise a heating element 1410 are flexible or substantially flexible. This can advantageously permit the heating element 1410 to be folded or otherwise shaped as required or desired by a particular application or use. Thus, the conductive members 1424 (e.g., copper foil, other metal strip or member, etc.), the carrier member 1420 (e.g., Kapton®, carbon, other electrically insulating materials, etc.), the conductive layer 1440 (e.g., carbon-impregnated material and/or the like) and/or any other layer or component can be folded without undermining the operational and/or structural integrity of the heating element 1410.

In some embodiments, adhesives or other attachment materials, devices and/or methods can be used to secure the different layers, components and members of the heating elements relative to one another. For example, the carrier member 1420 and/or the conductive layer 1440 can comprise adhesives and/or the like. In other embodiments, the various layers and members are attached to one another using mechanical fasteners (e.g., pins, staples, threads, clips, etc.), welds and/or any other connection method or device. In other embodiments, the various layers and members are attached by means of direct mechanical bonding with heat and/or pressure.

Figure 44:
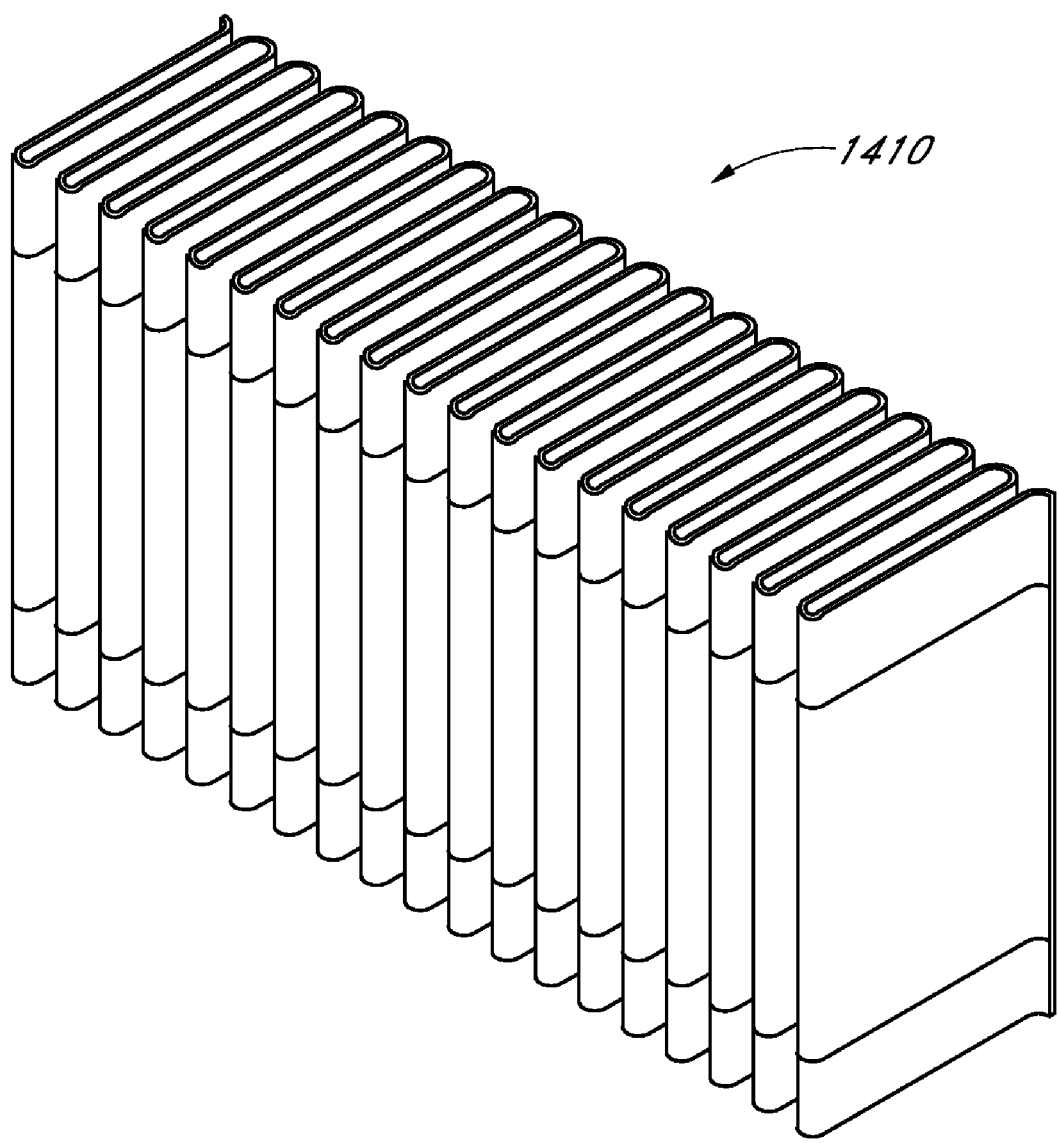
FIG. 44 illustrates a perspective view of a heating system comprising a folded heating element according to one embodiment.

Regardless of its exact configuration, a heating element 1410 can be folded into a desired shape. For example, FIG. 44 illustrates one embodiment of a folded heating element 1410. As discussed herein, the heating element 1410 can comprise a generally rectangular shape. In other arrangements, however, the overall shape of the folded heating element can vary as desired or required by a particular application.

With reference back to FIGS. 41A and 41B, a folded heating element 1410 can be secured to a PCB or other base member 1430. Preferably, the electrical buses 1480 of the base member 1430 are sized, shaped, positioned, spaced and otherwise configured to generally align with the conductive members 1424 of the folded heating element 1410. Thus, when the buses 1480 are electrically connected to the conductive members 1424, electric current can be delivered through at least a portion of the heating element 1410, from one conductive member 1424 to the opposite conductive member 1424, to selectively produce heat along the surface of the heating element 1410. As discussed, one of the electrical buses can be connected to a positive voltage source and the other to a negative or ground, in order to drive the current across the conductive members 1424 of the heating element 1410.

In some embodiments, the conductive members 1424 of the folded heating element 1410 are electrically connected to the corresponding bus 1480 of the PCB or other base member 1430 at the bottom of each fold (e.g., at or near where each fold of the heating element contacts or is relatively close to the base member 1430). In other arrangements, the buses 1480 and the conductive members 1424 are electrically connected at more or less frequent intervals (e.g., every second, third and/or other fold, at intermediate locations and/or the like).

Figure 45A:
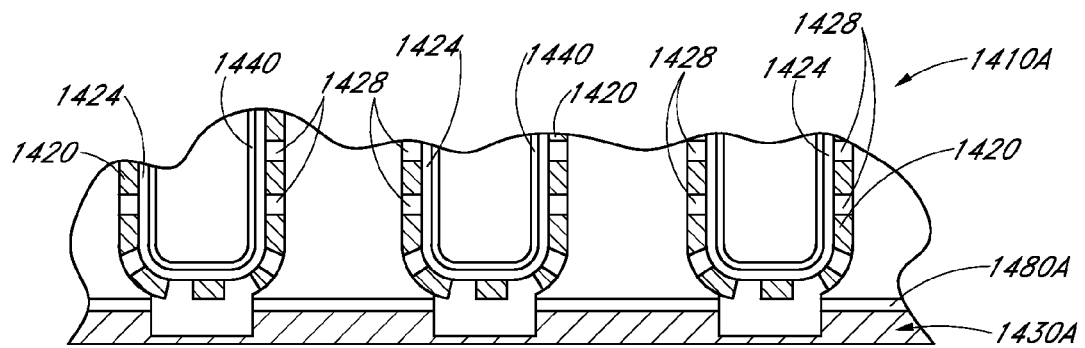
FIG. 45A illustrates a cross sectional view of a folded heating element electrically connected to a base member according to one embodiment.
Figure 45B:
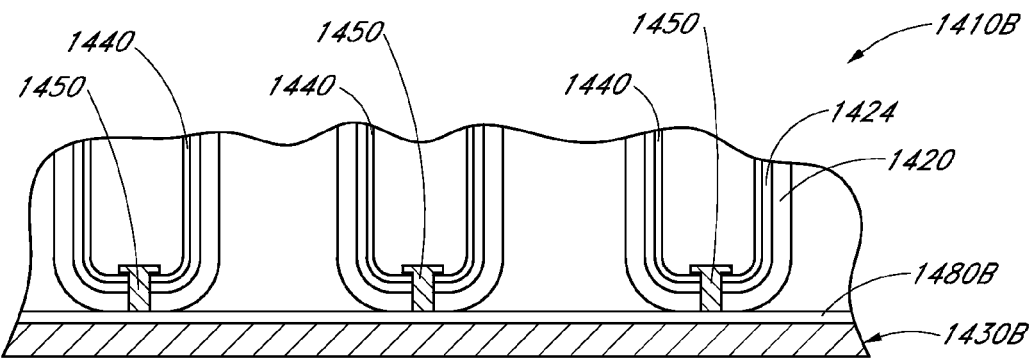
FIG. 45B illustrates a cross sectional view of a folded heating element electrically connected to a base member according to another embodiment.
Figure 45C:
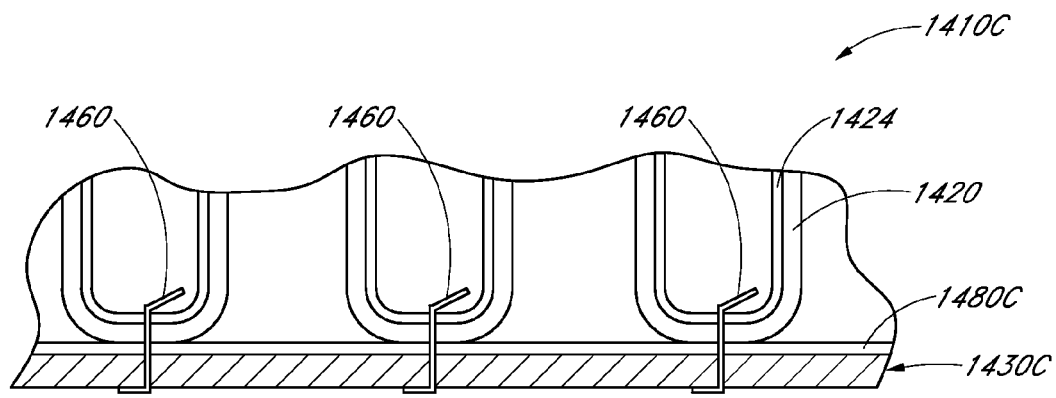
FIG. 45C illustrates a cross sectional view of a folded heating element electrically connected to a base member according to yet another embodiment.

As illustrated in FIG. 45A, a heating element 1410 can be soldered to the PCB or other base member 1430A. In the depicted embodiment, the heating element 1410A comprises conductive members 1424 that are generally situated between a carrier material 1420 and a conductive layer 1440, as discussed herein. The carrier material 1420 can include a plurality of openings 1428 which are regularly spaced along the length of the conductive member 1424 (e.g., copper foil). As discussed, these openings 1428 can expose the conductive member 1424 to facilitate the soldering or other attachment method. In embodiments where the heating element 1410A does not include openings 1428, the conductive members 1424 may need to be exposed in order to solder or otherwise electrically attach them to the bus 1480A of the base member 1430A. In FIG. 45A, the heating element 1410A comprises a total of three layers or components, similar to the embodiment illustrated and discussed herein with reference to FIGS. 43A-43D. However, a heating element can have fewer or more layers or components, as desired or required. In addition, the orientation of the various layers can be different than disclosed herein.

FIGS. 45B and 45C illustrate other embodiments of electrically attaching a heating element 1410B, 1410C to a PCB or other base member 1430B, 1430C. In FIG. 45B, the electrical bus 1480B of the PCB or other base member 1430B comprises a plurality of conductive pins 1450 or other protruding members that can be soldered to or otherwise be electrically connected to the conductive members 1424 of the heating element. For example, in some arrangements, the pins 1450 can be electrically connected to the respective conductive member 1424 by placing them into surface contact with the conductive member 1424, by piercing through the conductive member 1424 and/or the like. Any openings in the conductive members 1424 can be made when the conductive members 1424 are manufactured and/or at the time the heating system is being assembled.

With reference to FIG. 45C, a conductive pin 1460 or other elongated member can be passed through both the electrical bus 1480C of the PCB or other base member 1430C and the adjacent conductive member 1424 of the heating element 1410. Accordingly, the bus 1480C can be placed in electrical communication with the conductive member 1424 to create the desired current flow across the heating element 1410C, as disclosed herein. As shown in FIG. 45C, once routed through both the base member 1430C and the heating element 1410C, the pin 1460 can be bent, crimped or otherwise deformed to ensure that it is secured in place. It will be appreciated that one or more other ways of electrically connecting the buses and the corresponding conductive members can be used.

Figure 46A:
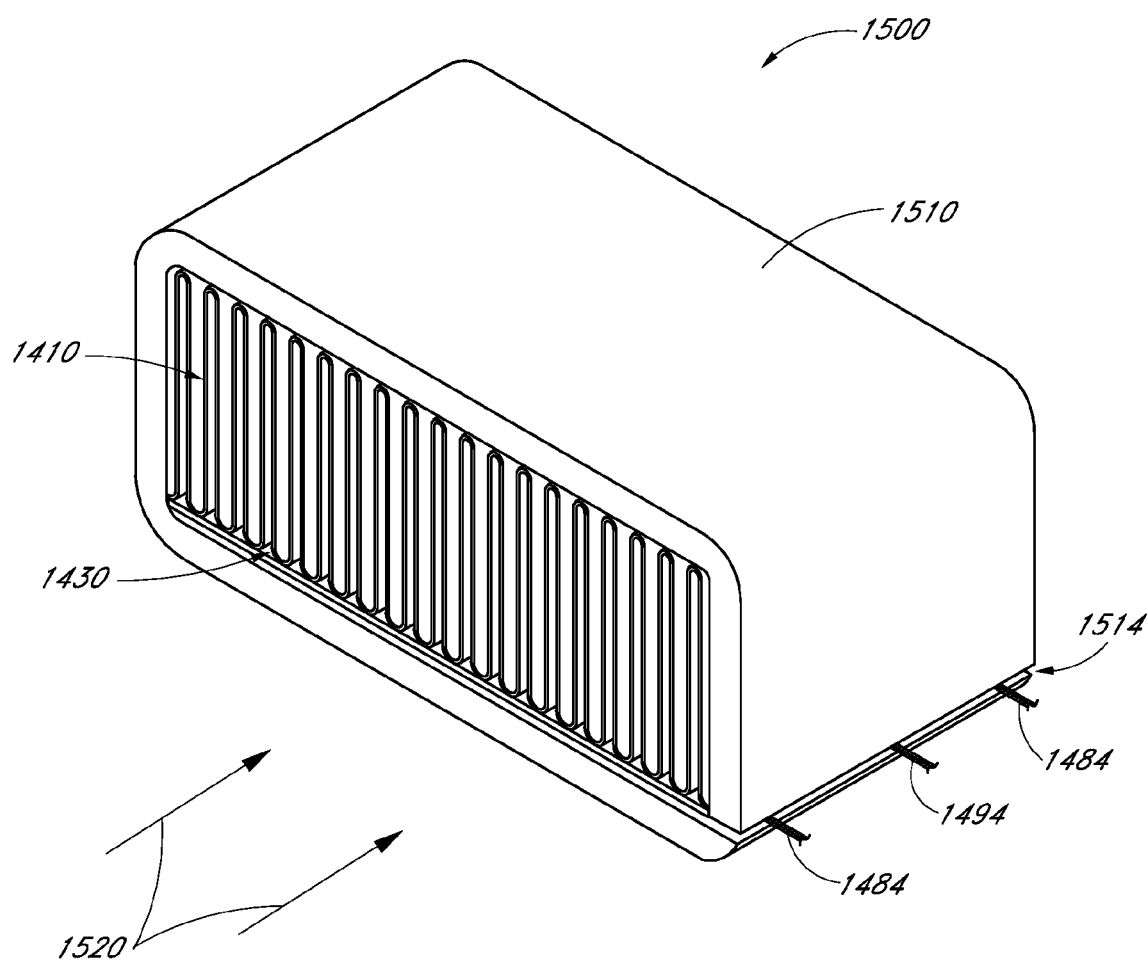
FIG. 46A illustrates a perspective view of a heating system comprising a folded heating element according to one embodiment.
Figure 46B:
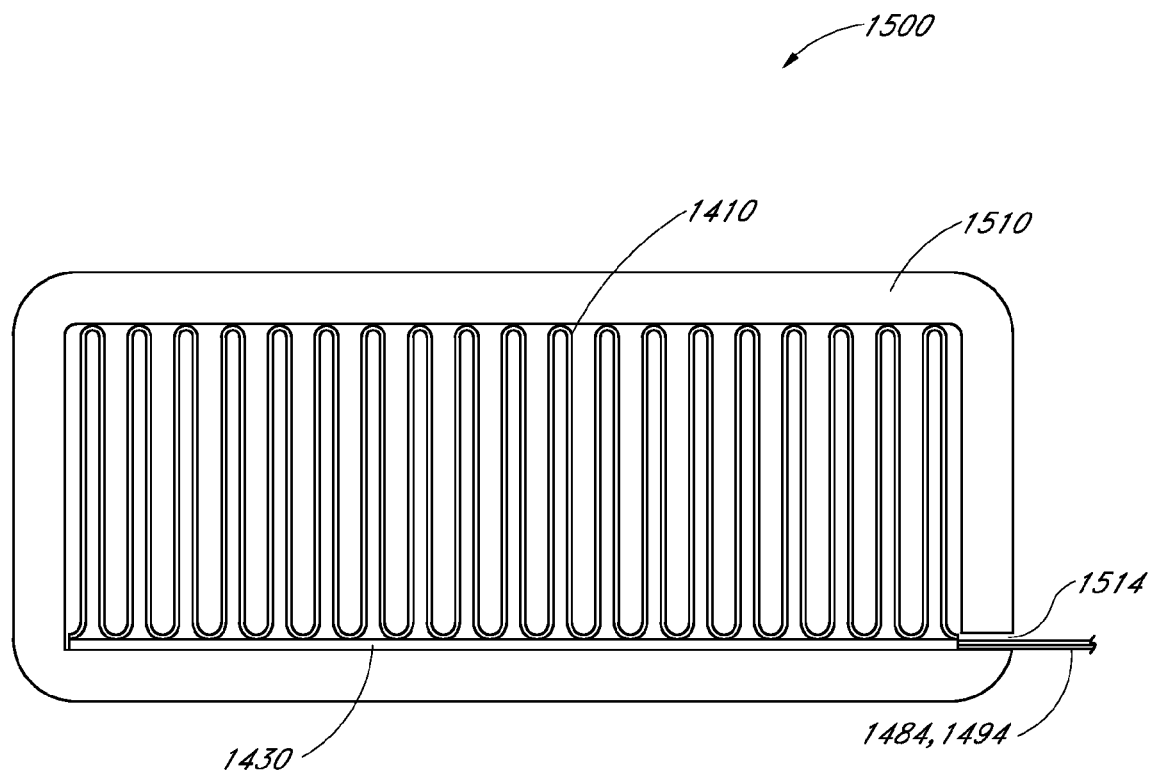
FIG. 46B illustrates a side view of the heating system of FIG. 46A.

FIGS. 46A and 46B illustrate one embodiment of a heating system 1500 that includes a folded heating element 1410 and a base member 1430. The heating element 1410 and the base member 1430 can be attached to each other as discussed herein. In addition, as shown, the heating system 1500 can comprise an outer housing 1510 configured to at least partially enclose the folded heating element 1410, the PCB or other base member 1430 and/or any other component of the heating system 1500. In some embodiments, the housing 1510 includes a slot 1514 or other opening through which one or more electrical leads 1484, 1494, wires or other connections may pass.

With continued reference to FIGS. 46A and 46B, the heating system 1500 can be configured so that air or other fluid can enter an open side of the housing 1510, pass between the folds of the heating element 1410 and exit through an opposite end of the housing 1510. Thus, in the illustrated embodiment, air or other fluid can be conveyed through the heating system 1500 for thermal conditioning in the direction generally represented by arrows 1520. Air or other fluid can be conveyed into the open end of the housing 1510 using a duct or other channeling device.

Figure 47A:
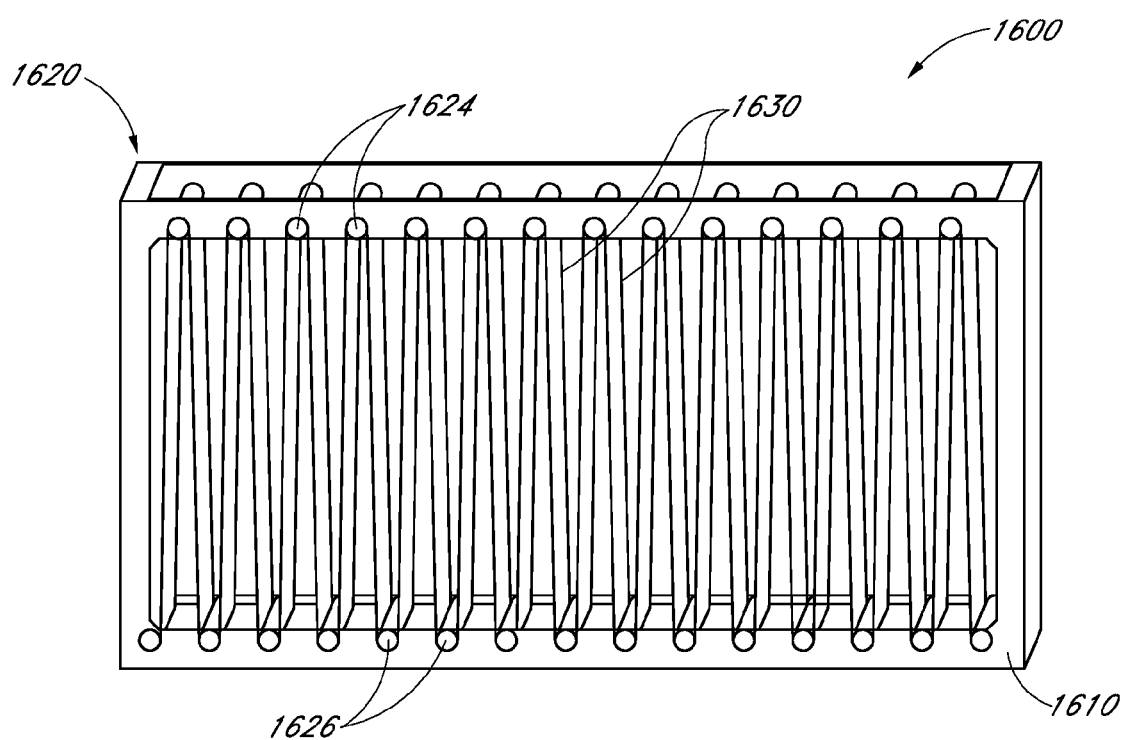
FIGS. 47A and 47B illustrate side views of a heating system comprising a folded heating element according to another embodiment.
Figure 47B:
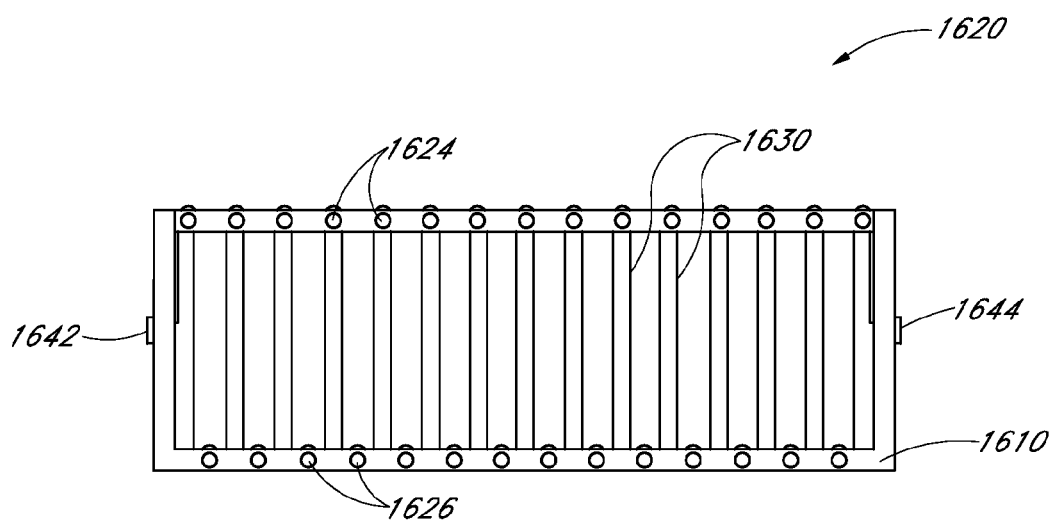

FIGS. 47A and 47B illustrate another embodiment of a heating system 1600 configured to thermally condition a volume of air or other fluid. The illustrated embodiment comprises an outer housing 1610 having open front and back ends that permit air or other fluids to pass therethrough. The system 1600 can include a support structure 1620 that is at least partially enclosed within the housing 1610. According to some embodiments, a plurality of upper and lower rods, clamps or other members 1624, 1626, generally extend across the width of the support structure 1620. These clamps 1624, 1626 can be used to support one or more layers of a heating element 1630. In addition, the clamps 1624, 1626 can be configured to maintain a desired spacing between adjacent folds of the heating element 1630.

In some embodiments, the heating element 1630 is sequentially positioned around each clamp 1624, 1626 to form a folded design, as illustrated in FIGS. 47A and 47B. As with other arrangements disclosed herein, the heating element 1630 can comprise a resistance material (e.g., copper, nickel-cadmium, other metals, etc.) secured to a carrier material (e.g., Kapton®, carbon, other electrically insulating materials, etc.). Alternatively, as with any other embodiment disclosed herein, the heating element 1630 can comprise a printed resistive layer. Regardless of its exact configuration and design, the heating element 1630 is preferably configured to produce thermal energy when electrical current is delivered through it. As shown in FIG. 47B, the heating element 1630 can be routed through and/or secured to slots 1642, 1644 located on either side of the support structure 1620.

As discussed herein with reference to the embodiment of FIGS. 41A-45C, conductive members of the heating element 1630 can be electrically connected to electrical buses or the like in order to selectively create a current across at least a portion of the heating element 1630. This can advantageously convert electric current into heat to temperature condition air or other fluids passing through or near the folded heating element 1630. In some embodiments, the clamps 1624, 1626 are configured to electrically connect conductive members and/or resistive materials situated on or within the heating element to a positive or negative voltage source or ground. Thus, in some embodiments, the clamps 1624, 1626 contact one or more conductive members or elements of a heating element 1630.

In some embodiments, such as, for example, those illustrated in FIGS. 41A through 46B, as well as any others disclosed herein, heating systems comprising a folded heating element can be configured to use approximately 67, 68, 69 or 70 watts of power. Further, in some arrangements, the electrical resistance of a heating element is approximately 2.7Ω. In other embodiments, however, the electrical characteristics of a heating system can vary, as desired or required by a particular application or use. For example, in some embodiments, a heating system is configured to use more than 70 watts or less than 67 watts. In other embodiments, the resistance of a heating element or other portion of a heating system is less than or greater than 2.7Ω.

In addition, as discussed, a heater element need not include a backing member, a carrier material, a laminate, an electrically insulating film and/or the like. In such arrangements, as illustrated in FIGS. 48A and 48B, a heating element 1700 can be simply folded or otherwise formed into a desired shape (e.g., generally serpentine shaped). Alternatively, a heating element can include one or more other components or features as desired or required by a particular application or use.

With reference to FIG. 48A, a folded heating element 1700 can comprise a main body 1710 that includes a generally serpentine or alternating shape. In some embodiments, the main body 1710 comprises one or more metals or other conductive materials (e.g., copper, nickel-chromium, other metals or alloys, etc.). Thus, electrical current can be directed from one end or terminal 1714, 1718 of the main body 1710 to another terminal 1718, 1714. Electrical resistance through the metal or other conductive material can convert the electrical current into heat. Accordingly, such a simple embodiment can be used to selectively create heat along the surface of a heating element 1700 without the need for carrier members, separate conductive layers, backing members and/or the like.

As illustrated in FIG. 48B, the main body 1710 of the heating element 1700 can be folded into a desired shape. Air or other fluid can be advantageously heated by being directed through and/or near the folded heating element 1700. As discussed herein with respect to other embodiments, the folded heating element 1700 can be positioned within a housing (not shown) and/or can have any other component or feature (e.g., temperature sensor, insulation, etc.), as desired or required.

As discussed, a number of the embodiments of a folded heating element discussed herein are particularly well suited to provide heated air to one or more portions of automobile seats (e.g., neck portion, headrest region, seat portion, back portion etc.). However, it will be appreciated that a folded heating element, fluid transfer systems making use of such folded heating elements (e.g., blowers, fans, etc.) and other thermal conditioning features described herein may be incorporated into other types of seat assemblies, including recliner chairs, sofas, beds, office chairs, airplane seats, stadium seats, benches, wheelchairs, outdoor furniture, massage chairs and the like. In addition, a folded heating element can be used for spot heating or otherwise delivering a volume of heated and/or otherwise conditioned air to a desired location in a car, office or the like.

Figure 49A:
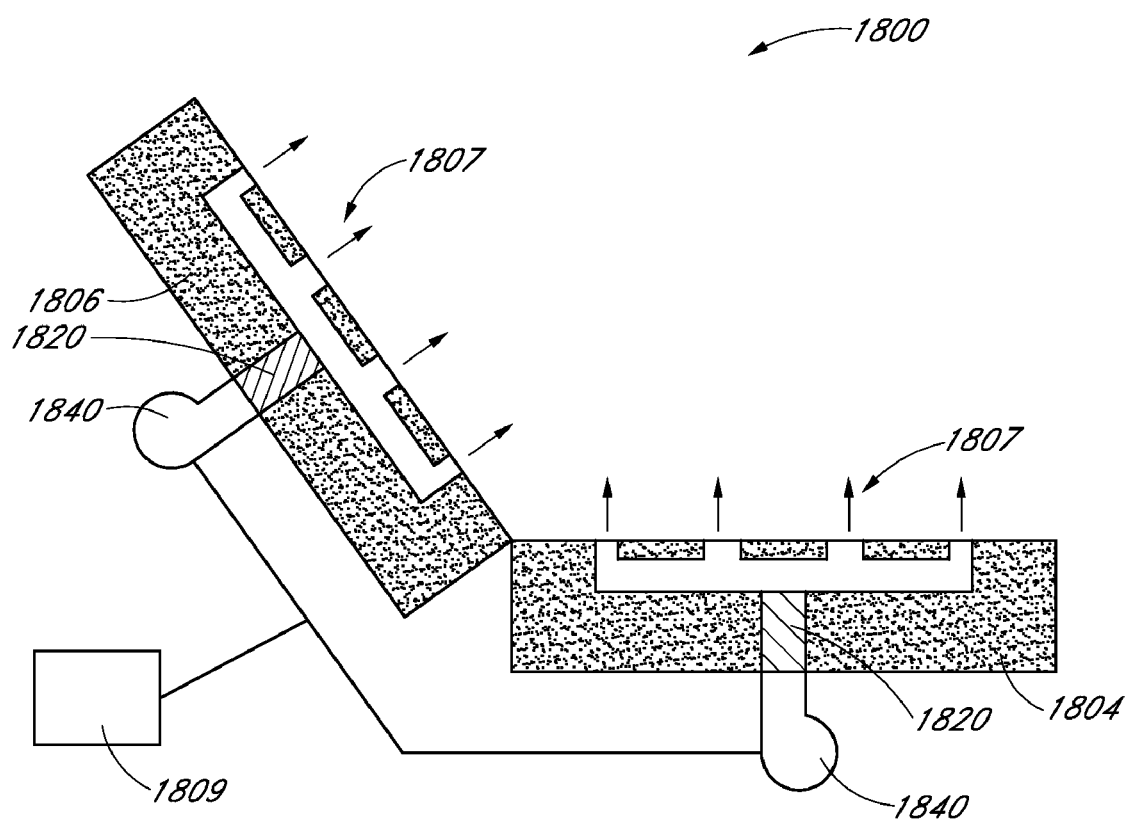
FIG. 49A schematically illustrates a climate controlled seating assembly comprising a heating system according to one embodiment.

FIG. 49A illustrates an embodiment of a folded heating element 1820 positioned upstream of a distribution system 1807 that can be generally disposed within the seat back portion 1804 and/or seatback portion 1806 of a seat assembly 1800. The folded heating element 1820 can be configured in accordance with any of the embodiments discussed and/or illustrated herein. In some embodiments, the heating element 1820, which may be positioned within a housing (not shown), is placed within a portion of a fluid distribution system 1807. In another embodiment, the heating element 1820 is positioned directly within a distribution system 1807 of the seat assembly 1800. In yet another embodiment, the heating element 1820 is positioned outside of a fluid distribution system 1807, either upstream or downstream from a fluid module 40 (e.g., blower, fluid transfer device, etc.).

With continued reference to FIG. 49A, the fluid distribution system 1807 can comprise any of a variety of passages and/or channels positioned in the seat bottom and/or back portions 1804, 1806. Thus, air or other fluid can be distributed by a blower or other fluid transfer device 1840 to the front and/or top portions of the seat and/or back portions 1804, 1806, respectively, as desired or required. In addition to the channels and passages, the seat assembly 1800 can comprise additional elements, such as, for example, foam inserts, films, spacer fabrics, scrims, and/or trim porous coverings as is known in the art to facilitate the movement of fluids and/or to enhance the look and feel of the distribution system 1807.

In some embodiments, the folded heating element 1820 is activated to heat the surfaces of the backrest portion 1806 and the seat bottom portion 1804. While the thermal elements (e.g., resistive materials) on the folded heating element 20 are activated, one or more fluid modules 1840 (e.g., fluid transfer devices) can selectively provide a fluid flow to the surfaces of the backrest portion 1806 and seat bottom portion 1804. The fluid can be conditioned (e.g., heated, cooled, etc.) or unconditioned (e.g., ambient, not heated, etc.). Consequently, the air or other fluid can be heated by heat transfer occurring at or near the adjacent folded heating element 1820. The heated fluid can then be transmitted to one or more locations of the seat assembly 1800, such as, for example, the surfaces of the backrest portion 1806 and/or the seat bottom portion 1804, a neck warmer (not shown) and/or the like.

With continued reference to FIG. 49A, a controller 1809 can be provided for controlling and/or providing power to the fluid module 1840, the folded heating element 1820 and/or any other components of the temperature control system. In one embodiment, the controller 1809 is configured so that the heating element can be operated at a low, medium or hot setting. More of fewer setting can be included, as desired or required. In other embodiments, the heating element 1820 can be set at a particular temperature setting and can be used in combination with a temperature sensor and feedback loop as discussed herein. The controller 1809 can also be configured to provide a cooling mode in which the heating elements 1820 are turned off (or turned substantially off) while the fluid modules 1840 (e.g., fluid transfer devices) are operated to either deliver air to the seat surfaces or withdraw air away from the seat surfaces. In this manner, providing fluid to and/or removing fluid from or around the seat surface through the distribution system 1807 can provide a cooling affect to an occupant. Thus, a low cost climate control system can be provided. In such a system, the heating elements 1820 can be used to selectively temperature condition (e.g., heat, ventilate, etc.) the surfaces of a seat assembly 1800.

As discussed, the embodiments described and/or illustrated herein can be extended to beds, wheel chairs, sofas, chairs and/or any other type of devices where a heating and cooling affect is desired.

Figure 49B:
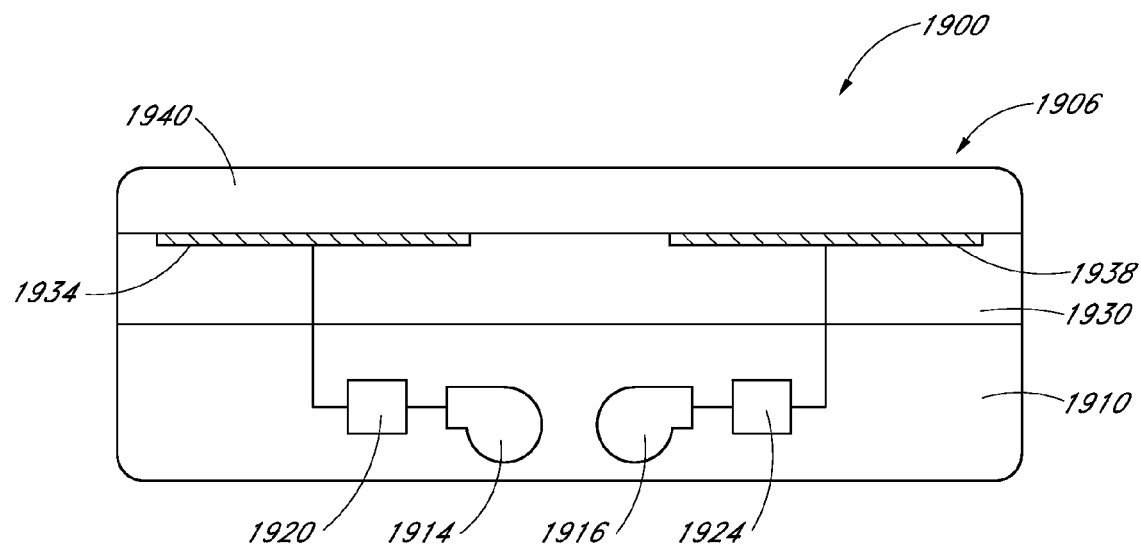
FIG. 49B schematically illustrates a climate controlled bed comprising a heating system according to another embodiment.

FIG. 49B schematically illustrates one embodiment of a climate-controlled bed 1900 comprising two heating elements 1920, 1924 that can be selectively used to provide heated air or other fluid along an upper surface 1906 of the assembly. In the depicted arrangement, two fluid transfer devices 1914, 1916 (e.g., blowers, fans, etc.) are positioned within a lower portion 1910 of the bed 1900. As shown, a heating element 1920, 1924, which may be configured in accordance with any of the embodiments disclosed herein, can be placed in fluid communication with each fluid transfer device 1914, 1916. In the illustrated embodiment, the heating elements 1920, 1924 are positioned downstream of the respective fluid transfer device 1914, 1916. Alternatively, as discussed herein, the heating elements 1920, 1924 can be located upstream and/or within the fluid transfer devices 1914, 1916. In other embodiments, a climate controlled bed 1900 or other seating assembly can include more or fewer fluid transfer devices 1914, 1916 and/or heating elements 1920, 1924, as desired or required. Further, such components can be positioned at any other interior or exterior portion of the bed or other seating assembly.

With further reference to FIG. 49B, the bed 1900 or other seating assembly (e.g., vehicle seat, sofa, chair, stadium seat, wheelchair, etc.) can include one or more fluid distribution devices 1934, 1938 that are adapted to receive heated air or other fluid from the fluid transfer devices 1914, 1916. In the illustrated embodiment, each fluid distribution device 1934, 1938 is in fluid communication with a single fluid transfer device 1914, 1916. However, in other arrangements, fluid distribution devices 1934, 1938 are in fluid communication with two or more fluid transfer devices 1914, 1916.

Figure 49C:
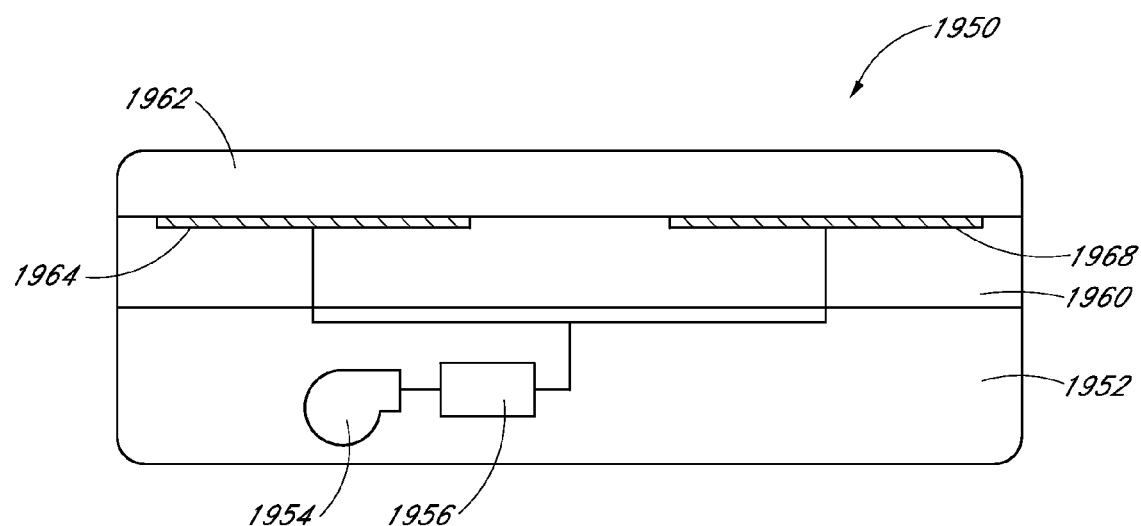
FIG. 49C schematically illustrates a climate controlled bed comprising a heating system according to yet another embodiment.

FIG. 49C schematically illustrates another embodiment of a bed assembly 1950 that comprises a single heating element 1956. As shown, a fluid transfer device 1954 (e.g., blower, fan, etc.) can transfer air or other fluid through or in the vicinity of the heating element 1956. Accordingly, heated air or other fluid can be delivered to one or more portions of the bed 1950. In the depicted arrangement, heated fluid is routed to two fluid distribution members 1964, 1968 located within or near an upper portion 1960 of the bed 1950. However, in other embodiments, a bed 1950 or other seat assembly can include more (e.g., three, four or more) or fewer (e.g., none or one) distribution members 1964, 1968. As shown, the bed 1960 can include a topper member 1962 and/or any other component or feature, as desired or required. In other embodiments, heated air or other fluid can be directed to one or more spot heating locations (e.g., neck, head, feet, etc.), in lieu of or in addition to one or more fluid distribution members.

With continued reference to the embodiment illustrated in FIG. 49C, the fluid transfer device 1954 and the heating element 1956 are positioned within a lower portion 1952 of the bed assembly 1950. However, in other arrangements, these and/or other components of the heating system can be positioned within one or more other interior or exterior portions of the bed 1950. In addition, a bed 1900, 1950, 1970 or other seating assembly can include one or more topper members 1940, 1962, 1982 that may be configured to enhance comfort, provide improved heated fluid distribution and/or any other benefits.

In some embodiments, the size of a heating element 1956 can be increased when positioned within a bed 1950 or any other relatively large seating assembly. However, those of skill in the art will appreciate that the heating elements, fluid transfer devices, fluid distribution members, fluid conduits and/or any other component or feature of the heating system used in a particular seating assembly can be customized according to any desired design or configuration.

Figure 49D:
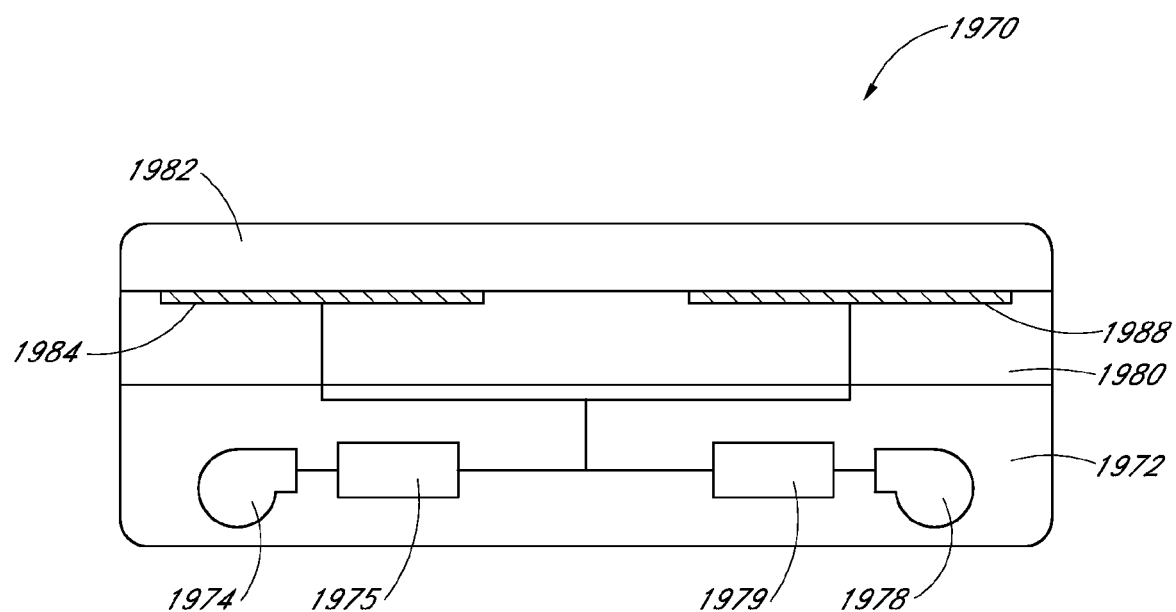
FIG. 49D schematically illustrates a climate controlled bed comprising a heating system according to still another embodiment.

FIG. 49D schematically illustrates another embodiment of a bed assembly 1970 comprising one or more heating elements 1975, 1979 as disclosed herein. As shown, each heating element 1975, 1979 is positioned downstream of a fluid transfer device 1974, 1978. In some embodiments, the fluid transfer devices 1974, 1978 and the heating elements 1975, 1979 are arranged in a parallel configuration. Thus, as shown, heated air or other fluid exiting the heating elements 1975, 1979 can be combined into a single fluid line that feeds one or more fluid distribution members 1984, 1988. Further, according to some arrangements, such parallel heating systems comprising appropriately sized heating elements (e.g., heating elements with an adequate and/or comparatively large heat transfer ability) can be used for beds, other large seating assemblies and/or generally in applications that require a relatively large amount of heating.

As discussed herein with reference to FIG. 49A, a vehicle seat, bed and/or other seating assembly that includes a heating system can be provided with a controller and/or any other control feature or component. In some embodiments, the controller permits a user to selectively regulate the amount of heat generated by one or more heating elements included in the heating system. In other arrangements, a seating assembly is configured to permit a user to adjust the rate at which air or other fluid is conveyed through or in the vicinity of a heating element. Further, the seating assembly can be adapted to permit a user to selectively control one or more other aspects of the heating system.

Heating systems such as the ones disclosed herein, or variations thereof, can include one or more temperature sensors (e.g., thermistors, thermostats, etc.). In some embodiments, the temperature sensors are positioned on or near a heating element and/or a housing that encloses the heating element. Alternatively, temperature sensors can be positioned within a fluid duct or another portion that is in thermal communication with the heated air or other fluid exiting the heating system. Fluid temperature data acquired by the sensors can be transmitted, either through hard-wired or wireless connections, to a controller, control unit, processor and/or any control device. In some arrangements, such fluid temperature information can be used to automatically regulate the operation of the heating system. For example, the electrical current delivered to the heating element can be increased or decreased, the rate at which the fluid transfer device delivers air or other fluid past the heating element can be increased or decreased and/or any other property or feature can be adjusted to maintain a desired temperature setting or range or a particular comfort level.

In one embodiment, the heating element, the fluid transfer device and/or other components or features of the heating system are regulated by a closed loop control system. Thus, temperature data retrieved by sensors can be continuously, substantially continuously or intermittently transmitted to the control system for selectively adjusting the operation of the heating system. In other arrangements, the heating system can be controlled manually, allowing a user to adjust one or more components or aspects of the heating system.

In any of the embodiments disclosed herein, the heating system can include a resettable thermal fuse, such as, for example, a polymeric positive temperature coefficient device (PPTC), another type of passive electronic component, non-linear thermistor, PolySwitch and/or the like. Such fuses can help protect against over-current faults or other electrical failures. In some embodiments, resettable fuses can terminate the supply of electrical current to a heating element and/or another component of the heating system if an operating temperature of the heating element or another component of the heating system rises above a threshold level. In other arrangements, such thermal fuses can replace one or more controllers or other control units. Therefore, if and when the temperature of a heating element and/or another component of the heating system exceeds a particular level, the thermal fuses can terminate the operation of the heating system, either in whole or in part. The heating system can be configured to be re-activated once the operating temperature falls below a desired level. In such embodiments, the fuses act as automatic thermostats or controllers to selectively activate and/or deactivate a particular heating system.

In other embodiments, a thermal fuse can be used as a backup protection measure for over-temperature control. Thus, a heating system can include such backup fuses either in lieu of or in addition to other temperature control components or features, such as, for example, closed loop control systems, other types of control systems, resettable thermal fuses and/or the like. Such backup fuses can be configured to break or open an electrical circuit if the temperature exceeds a particular level.

Figure 50:
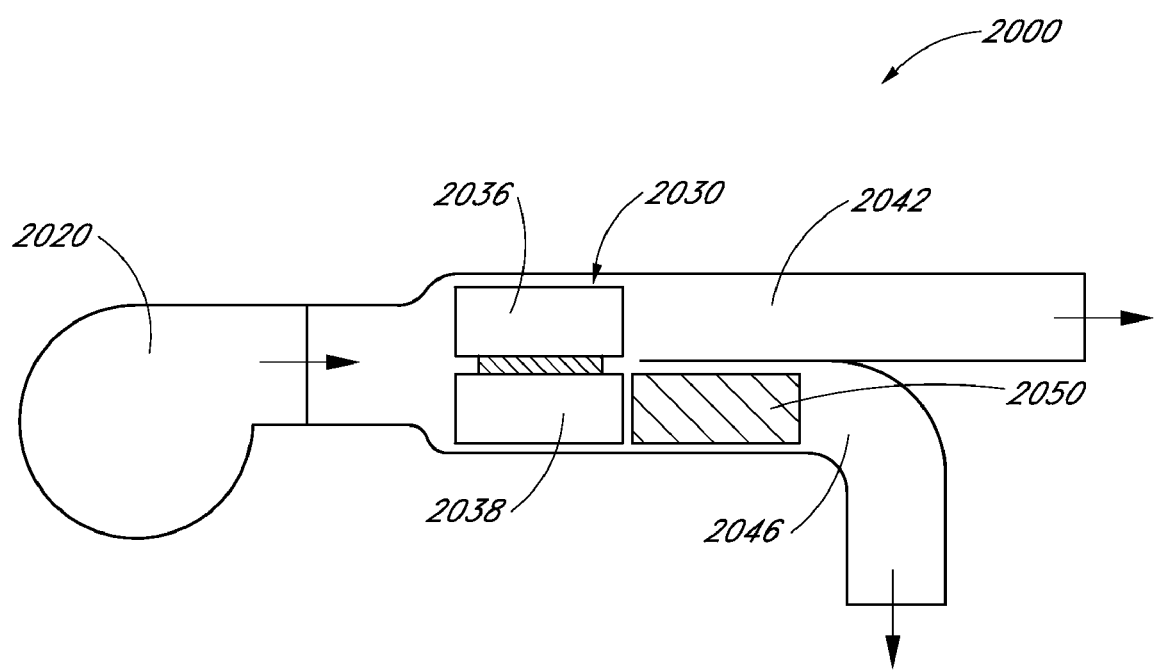
FIG. 50 schematically illustrates a heating system comprising a folded heating element and a fluid transfer device according to one embodiment.

FIG. 50 schematically illustrates one embodiment of a climate control system 2000 for thermally conditioning a volume of air or other fluid. As shown, the system 2000 can include a fluid transfer device 2020 (e.g., a blower, fan, etc.) configured to deliver a volume or air or other fluid through one or more ducts or other conduits. In some embodiments, the system 2000 comprises a thermoelectric device 2030 (e.g., Peltier circuit). As shown, the thermoelectric device 2030 can include heat transfer members 2036, 2038 (e.g., fins) that are configured to facilitate in the heat transfer to and/or from the air or other fluid passing through the duct.

With continued reference to FIG. 50, the air or other fluid transferred by the fluid transfer device 2020 can be delivered into two or more downstream conduits 2042, 2046. As illustrated in the depicted embodiment, air or other fluid passing through a heat transfer member 2036 positioned on a first side of the thermoelectric device 2030 enters a first conduit 2042. Likewise, air or other fluid passing through a heat transfer member 2038 positioned on a second side of the thermoelectric device 2030 enters a separate second conduit 2046. In other embodiments, the first and second conduits 2042, 2046 are part of a single passage that includes a partition or other flow separating member.

In some embodiments, the conduit 2046 that is configured to deliver a volume of air or other fluid toward the occupant (e.g., through a fluid distribution device) is referred to as the main-side conduit and the other conduit 2042 is referred to as the waste-side conduit. Thus, depending on the direction of electrical current being supplied to the thermoelectric device 2030, the air or other fluid passing through or near the heat transfer member 2038 of the main-side conduit can be heat and/or cooled. In other embodiments, where the thermoelectric device 2030 is not included or not activated, air or other fluid passing through or near the heat transfer members 2036, 2038 is not thermally conditioned.

As illustrated in FIG. 50, the climate control system 2000 can comprise a heating device 2050 for selectively heating a volume of air or other fluid being delivered to the seating assembly (e.g., into a fluid distribution device, toward an occupant, etc.). In some embodiments, the heating device 2050 comprises a folded heating element in accordance with one or more of the arrangements disclosed herein, or a variation thereof.

FIG. 51A illustrates an embodiment of climate control system 2100 comprising a heating device 2150 which is in fluid communication with the main-side conduit 2146. In some embodiments, as shown, air or other fluid entering the main-side conduit 2146 can be configured to be thermally-conditioned (e.g., heated, cooled, etc.) using a thermoelectric device 2132 and/or any other device. For example, air or other fluid entering the main-side conduit 2146 can pass through or near one or more heat exchange members 2138.

With continued reference to FIG. 51A, once within the main-side conduit 2146, air or other fluid can be selectively directed through one or more heating devices 2150. The conduit 2146 can comprise a flow diversion system 2160 that permits a user to selectively direct all, some or none of the air or other fluid toward the heating device 2150. According to some embodiments, the flow diversion system 2160 includes a flow diverter member 2170 that can be selectively moved between a first and a second position (generally represented in FIG. 51A as 2171 and 2172, respectively). For example, when the diverter member 2170 is in a first position 2171, air or other fluid is prevented or substantially prevented from passing through or in the vicinity of the heating device 2150. Consequently, air or other fluid moves through the conduit 2146 in a direction generally represented by arrow 2180.

Alternatively, when the diverter member 2170 is in the second position 2172, air or other fluid can be directed toward the heating device 2150 (generally represented by arrow 2182) where it can undergo a desired level of thermal conditioning. In other embodiments, the diverter member 2170 can be selectively moved between the first position 2170 and the second position 2172 so that air or other fluid can be simultaneously directed both through and around the heating device 2150. Such a flow distribution feature can permit a user to control the level of thermal conditioning that occurs within the main-side conduit 2146. In some embodiments, the position of the diverter member 2170 can be automatically regulated by a controller and/or other control system so as to maintain a target temperature or target temperature range or setting (e.g., "HIGH," "MEDIUM," "LOW," etc.) for the air or other fluid.

FIG. 51B illustrates another embodiment of a climate control system 2200 comprising one or more heating devices 2250. As discussed in relation to FIG. 51A, the main-side conduit 2246 can include one or more flow diverter members 2270 or similar devices. The flow diverter member 2270 in FIG. 51B is generally positioned downstream of the heating device 2250. The diverter member 2270 can be configured to automatically or manually move between a first position 2271 and a second position 2272 in order to maintain a desired temperature or temperature range for the air or other fluid existing the main-side conduit 2246. In other embodiments, one or more other devices or methods of diverting air or other fluid toward and/or through a heating device 2150, 2250 can be used.

As discussed, the heating device 2150, 2250 can include a folded heating element as described and/or illustrated herein. In some embodiments, the heating element comprises a PCB, base member, housing and/or any other component. Air or other fluid thermally conditioned by a thermoelectric device 2130, 2230, a heating device 2150, 2250 (e.g., a folded heating element) and/or any other device can be delivered to a fluid distribution member or any other portion of a climate controlled seating assembly.

Figure 52A:
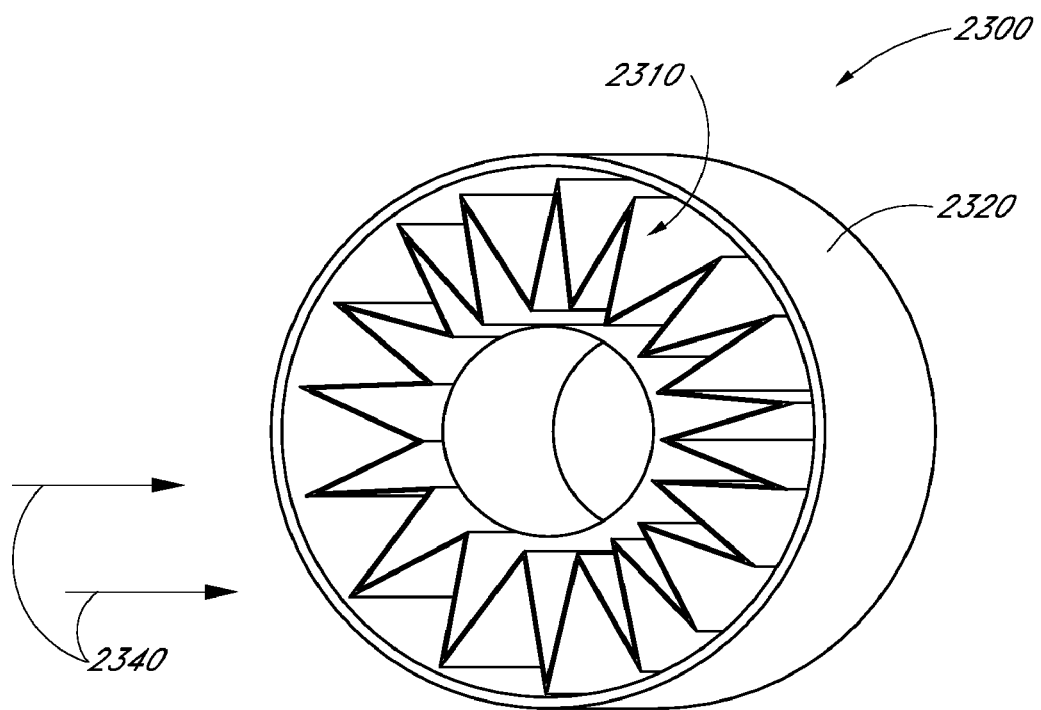
FIG. 52A illustrates a perspective view of a heating system comprising a radially shaped folded heating element according to one embodiment.

FIG. 52A illustrates another embodiment of a heating system 2300 comprising a folded heating element 2310. In the illustrated embodiment, the heating element 2310 has a generally annular shape. As with other arrangements described and/or illustrated herein, the heating element 2310 is at least partially positioned within an outer housing 2320. In such an arrangement, air or other fluid can be directed into an open end of the housing 2320 (e.g., in a direction generally represented by arrows 2340) and pass through and/or in the vicinity of the folded heating element 2310. Thus, the air or other fluid can be selectively heated before being conveyed to one or more portions of a climate controlled seating assembly. In other embodiments, the housing 2320, and thus the heating system 2300, can include one or more other shapes or configurations as desired or required by a particular application.

Figure 52B:
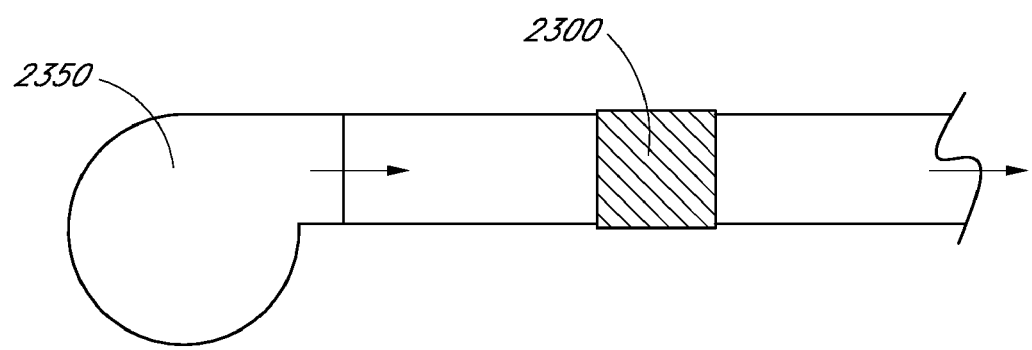
FIG. 52B schematically illustrates the heating system of FIG. 52A included downstream of a fluid transfer device according to one embodiment.

With reference to FIG. 52B, the heating system 2300 can be placed in fluid communication with a blower, fan or other fluid transfer device 2350. In some embodiments, as illustrated in FIG. 52B, the heating system 2300 is positioned downstream of the fluid transfer device 2350. Alternatively, the heating system 2300 can be placed upstream of the fluid transfer device 2350.

Figure 53:
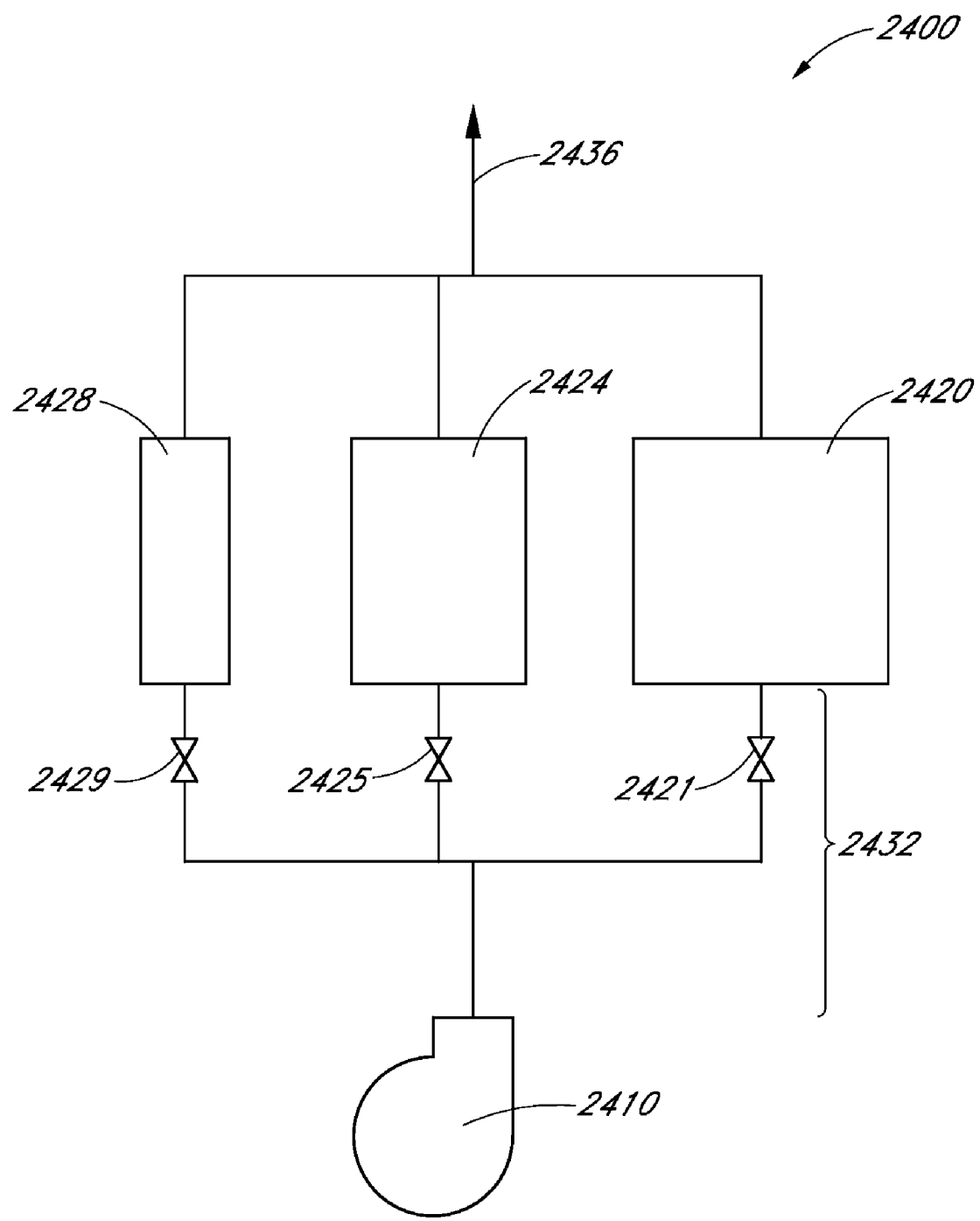
FIG. 53 schematically illustrates a heating system comprising a plurality of heating elements according to one embodiment.

FIG. 53 schematically illustrates a heating system 2400 that comprises a number of separate heating elements 2420, 2424, 2428. The heating elements 2420, 2424, 2428, which can be configured according to any of the embodiments disclosed herein, or variations thereof, may be different from each other. For example, the size, shape, heating capacity and/or other details of the heating elements 2420, 2424, 2428 can vary. As shown, the fluid transfer device 2410 (e.g., a blower, fan, etc.) can be used to deliver air or other fluid to or in the direction of the heating elements 2420, 2424, 2428.

In one embodiment, as depicted in FIG. 53, a fluid transfer device 2410 is placed in fluid communication with each of the heating elements 2420, 2424, 2428 using a fluid inlet system 2432. The inlet system 2432 can comprise a number of fluid conduits or other lines arranged in a parallel or series configuration, as desired or required by a particular application. In addition, the inlet system 2432 can include one or more valves 2421, 2425, 2429 or other flow regulating devices upstream and/or downstream of each heating element 2420, 2424, 2428. This can advantageously permit air or other fluid to be selectively delivered through or near one or more heating elements 2420, 2424, 2428.

With further reference to FIG. 53, heated air or other fluid exiting the heating elements 2420, 2424, 2428 can be directed to one or more desired portions of a seating assembly (e.g., vehicle seat, chair, bed, sofa, stadium seat, etc.) using an outlet system 2436 (e.g., one or more channels, conduits, fluid lines, etc.).

The embodiment illustrated in FIG. 53 can be used to regulate how a heating system 2400 is controlled. For example, a heating system 2400 can be designed so that the various heating elements 2420, 2424, 2428 included therein comprise a varying relative heating output or capacity. In one embodiment, as depicted in FIG. 53, a heating system 2400 includes three heating elements 2420, 2424, 2428. A first heating element 2420 can be configured to provide approximately one-half of the total maximum heating output or capacity desired for a particular application. Further, smaller heating elements 2424, 2428 can be configured to provide approximately one-third and one-sixth of the total maximum heating output or capacity, respectively. Thus, when all three heating elements 2420, 2424, 2428 are activated, the heating system 2400 can advantageously attain approximately all of the desired heating output or capacity. It will be appreciated that the heating system can comprise more or fewer heating elements, the heating characteristics of which may be different than disclosed herein.

With further reference to FIG. 53, the heating elements 2420, 2424, 2428 can be configured to receive a substantially constant electrical current when activated. Thus, one or a combination of two or more heating elements 2420, 2424, 2428 can be activated and/or deactivated to achieve a desired heating output or effect. For example, in the illustrated embodiment, if full or near full heating capacity is desired, air or other fluid can be simultaneously delivered through, past or in the vicinity of all three heating elements 2420, 2424, 2428 while they electrically activated. Alternatively, if only about one-half of the heating output is desired, air or other fluid can be delivered to one of the heating elements 2420. In such an arrangement, this particular heating element 2420 would need to be electrically activated in order to provide the necessary heat transfer to the air or other fluid being directed to it or in its vicinity. In yet other embodiments, another heating element 2420, 2424, 2428, either by itself or in combination with one or more other heating elements, can be electrically activated to selectively heat air or other fluid conveyed by the fluid transfer device 2410.

Accordingly, the level of heating generated by the heating system 2400 can be advantageously controlled without varying the voltage applied across a heating element 2420, 2424, 2428. Instead, heating elements 2420, 2424, 2428 are either activated or deactivated to produce a desired heating effect. Such a control scheme can offer a simpler and less expensive alternative to varying the amount of voltage applied to a heating element. In some embodiments, in order to provide a more enhanced level of control, one or more of the heating elements 2420, 2424, 2428 of a multi-heating element system 2400, such as the one discussed and illustrated herein with reference to FIG. 53, can be configured to receive varying levels of electrical current (e.g., not simply "on"/"off" heating elements).

As discussed, air or other fluid flow can be directed to one or more heating elements 2420, 2424, 2428 using valves 2421, 2425, 2429 or other flow diversion members. Thus, as illustrated in FIG. 53, the heating elements 2420, 2424, 2428 can be separated from each other. However, in other arrangements, the heating elements 2420, 2424, 2428 of a particular system 2400 can be included within the same housing or enclosure. Accordingly, the desired level of fluid heating can be accomplished by directing air or other fluid from the fluid transfer device 2410 to a single housing or enclosure that includes one, two, three or more different heating elements. In the illustrated embodiments, the heating system 2400 includes a total of three heating elements 2420, 2424, 2428 that vary in size, shape and/or heating capacity from each other. However, it will be appreciated that a heating system can include more or fewer heating elements, as desired or required. In addition, the relative size, shape, heating output, electrical characteristics and/or any other properties of the heating elements 2420, 2424, 2428 can vary.

In other embodiments, where two, three, four or more heating elements are used in a particular heating system, a Wheatstone bridge or other device or method can be used to verify that each heating element is operating properly. In some embodiments, the multiple heating elements themselves become the legs of the Wheatstone bridge. For example, in a heating system that comprises four heating elements, if one of the heating elements comprises a relatively low electrical resistance, then the voltage measurement on the Wheatstone bridge or other regulating device can move away from a "null" or "nominal" measurement. Conversely, if one of the heating elements comprises a relatively high electrical resistance, then the voltage measurement on the Wheatstone bridge or other regulating device can also move away from "null". Therefore, any variation from a nominal heater resistance can be advantageously detected. Thus, the heating element can be configured to alert a control system (e.g., through an error code and/or the like) that there is a potential problem with a heating element and/or a particular portion of a heating element. This can be particularly helpful in heating systems having multiple heating elements or segmented heating elements with two or more electrically distinct portions.

The control characteristics, advantages and features discussed and illustrated herein, such as those related to the disclosure for FIG. 53, can be applied to any of the embodiments of a heating element or system disclosed herein.

To assist in the description of the disclosed embodiments, words such as upward, upper, bottom, downward, lower, rear, front, vertical, horizontal, upstream, downstream have been used above to describe different embodiments and/or the accompanying figures. It will be appreciated, however, that the different embodiments, whether illustrated or not, can be located and oriented in a variety of desired positions.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A heating element comprising:
a chamber having and an inlet and an outlet and defining a flow direction that extends from the inlet to the outlet;
a resistive material positioned on at least one substrate, wherein a combination of the resistive material and the at least one substrate are folded into a plurality of folds that extend substantially parallel to the flow direction; the resistive material disposed on the substrate, wherein adjacent folds of the combination of the resistive material and the substrate define a plurality of gaps through which at least a portion of air entering the inlet passes; and
at least one electrical lead operatively coupled to the resistive material such that an electrical current can be delivered through the resistive material;
wherein the resistive material is configured to produce heat when electrically energized; and
wherein heat transfer is configured to occur between heat generated along the folded substrate and air passing through the plurality of gaps.

2. The folded heating element of claim 1, wherein the plurality of folds comprise a series of folds in which a fold direction of adjacent folds are opposite to each other.

3. The folded heating element of claim 1, wherein at least a portion of the resistive material comprises a Positive Temperature Coefficient (PTC) material.

4. The folded heating element of claim 1, wherein at least a portion of the resistive material comprises a coiled resistance wire.

5. The folded heating element of claim 1, further comprising at least one spacer positioned between at least two adjacent folded portions.

6. The folded heating element of claim 1, wherein a portion of the resistive material comprises at least one of copper, nickel-chromium, stainless steel or conductive carbon.

7. The folded heating element of claim 1, wherein at least a portion of the resistive material comprises a flexible and formable material.

8. The folded heating element of claim 1, further comprising a backing member, the backing member being configured to help the folded heating element maintain a desired folded shape.

9. The folded heating element of claim 1, wherein the heating element comprises first and second conductive members and a conductive layer electrically connecting the first and second conductive members, the heating element generally positioned on a base member comprising first and second electrical buses, the first electrical bus being in electrical communication with the first conductive member of the heating element, and the second electrical bus being in electrical communication with the second conductive member of the heating element;
wherein an electrical voltage difference applied across the first and second electrical buses causes current to flow from the first conductive member to the second conductive member through the conductive layer; and
wherein such current flow is configured to generate heat along a surface of the heating element to selectively heat a volume of fluid passing thereby.

10. A heating element comprising:
a housing defining a chamber, said housing comprising an inlet and an outlet and defining a flow direction that extends from the inlet to the outlet;
a resistive material positioned within the chamber, wherein the resistive material is generally folded into a plurality of folds that extend substantially parallel to the flow direction; and
at least one electrical lead operatively coupled to the resistive material such that an electrical current can be delivered through the resistive material;
wherein the resistive material is configured to generate heat when electrical current is delivered therethrough; and wherein at least a portion of the heat generated by the resistive material can be transferred to a fluid passing through the chamber.

11. A climate controlled assembly comprising:
- a heating element comprising a resistive material positioned on a substrate configured to receive an electrical current, wherein the substrate and the resistive material positioned thereon are generally folded into a plurality of folds, and wherein the heating element is configured to produce heat when an electrical current is delivered through the resistive material;
- wherein a plurality of gaps are defined between adjacent folds of the heating element;
- a fluid transfer device configured to selectively transfer fluids through or in the vicinity of the gaps; and
- a control system configured to control the operation of at least one of the heating element and the fluid transfer device;
- wherein fluids transferred toward and past the heating element are selectively heated via a transfer of heat from the heating element to said fluids before being directed to an occupant of the assembly.

12. The assembly of claim 11, wherein the heating element is positioned downstream or upstream of the fluid transfer device.

13. The assembly of claim 11, wherein heated fluids are conveyed to at least one fluid distribution member positioned on or within a cushion of the assembly.

14. The assembly of claim 11, wherein the fluid transfer device comprises a blower or fan.

15. The assembly of claim 11, wherein the resistive material comprises at least one of copper, nickel-chromium, stainless steel or conductive carbon.

16. The assembly of claim 11, wherein the heating element is positioned within a housing.

17. The assembly of claim 11, wherein the assembly comprises a vehicle seat.

18. The assembly of claim 11, wherein the assembly comprises a bed.

19. The assembly of claim 11, wherein the heating element further comprises at least one temperature sensor, the temperature sensor configured to measure a temperature of the heating element or a heated fluid in the vicinity of the temperature sensor.

* * * * *